US011130827B2

(12) United States Patent
Li et al.

(10) Patent No.: US 11,130,827 B2
(45) Date of Patent: Sep. 28, 2021

(54) POLYETHYLENE COMPOSITIONS AND ARTICLES MADE THEREFROM

(71) Applicant: ExxonMobil Chemical Patents Inc., Baytown, TX (US)

(72) Inventors: Dongming Li, Houston, TX (US); Jian Yang, Houston, TX (US); Kevin A. Stevens, Houston, TX (US); Yan Jiang, Houston, TX (US); Gregory J. Smith-Karahalis, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 16/410,504

(22) Filed: May 13, 2019

(65) Prior Publication Data

US 2019/0263953 A1  Aug. 29, 2019

Related U.S. Application Data

(63) Continuation-in-part of application No. 16/182,856, filed on Nov. 7, 2018.

(60) Provisional application No. 62/585,629, filed on Nov. 14, 2017.

(51) Int. Cl.
*C08F 210/16* (2006.01)
*C08F 4/6592* (2006.01)
*C08J 5/18* (2006.01)
*H01B 3/30* (2006.01)
*B32B 27/08* (2006.01)
*C08F 4/659* (2006.01)

(52) U.S. Cl.
CPC ............ *C08F 210/16* (2013.01); *B32B 27/08* (2013.01); *C08F 4/65927* (2013.01); *C08J 5/18* (2013.01); *H01B 3/307* (2013.01); C08F 4/65912 (2013.01); C08F 4/65916 (2013.01); C08F 2500/04 (2013.01); C08F 2500/07 (2013.01); C08F 2500/08 (2013.01); C08F 2500/12 (2013.01); C08F 2500/17 (2013.01); C08J 2323/08 (2013.01)

(58) Field of Classification Search
CPC .......................... C08F 210/16; C08F 4/65927
See application file for complete search history.

(56) References Cited

U.S. PATENT DOCUMENTS

| | | | |
|---|---|---|---|
| 6,242,545 B1 | 6/2001 | Jejelowo et al. | 526/160 |
| 6,248,845 B1 | 6/2001 | Loveday et al. | 526/113 |
| 6,376,407 B1 | 4/2002 | Burkhardt et al. | 502/103 |
| 6,376,408 B1 | 4/2002 | Burkhardt et al. | 502/103 |
| 6,376,409 B1 | 4/2002 | Burkhardt et al. | 502/103 |
| 6,376,410 B1 | 4/2002 | Burkhardt et al. | 502/103 |
| 6,376,411 B1 | 4/2002 | Burkhardt et al. | 502/103 |
| 6,376,412 B1 | 4/2002 | Burkhardt et al. | 502/103 |
| 6,376,413 B1 | 4/2002 | Kuchta et al. | 502/103 |
| 6,376,627 B1 | 4/2002 | Burkhardt et al. | 526/127 |
| 6,380,120 B1 | 4/2002 | Burkhardt et al. | 502/103 |
| 6,380,121 B1 | 4/2002 | Kuchta et al. | 502/103 |
| 6,380,123 B1 | 4/2002 | Kuchta et al. | 502/103 |
| 6,380,124 B1 | 4/2002 | Burkhardt et al. | 502/103 |
| 6,380,330 B1 | 4/2002 | Burkhardt et al. | 526/127 |
| 6,380,331 B1 | 4/2002 | Kuchta et al. | 526/127 |
| 6,380,334 B1 | 4/2002 | Kuchta et al. | 526/160 |
| 6,399,723 B1 | 6/2002 | Burkhardt et al. | 526/127 |
| 6,414,095 B1 | 7/2002 | Burkhardt et al. | 526/127 |
| 6,528,597 B2 | 3/2003 | Loveday et al. | 526/113 |
| 6,784,305 B2 | 8/2004 | Schulte et al. | 556/53 |
| 6,825,372 B2 | 11/2004 | Burkhardt et al. | 556/22 |
| 6,888,017 B2 | 5/2005 | Kuchta et al. | 556/11 |
| 6,894,179 B2 | 5/2005 | Kuchta et al. | 556/22 |
| 6,903,229 B2 | 6/2005 | Burkhardt et al. | 556/11 |
| 6,936,675 B2 | 8/2005 | Szul et al. | 526/348.2 |
| 6,956,088 B2 | 10/2005 | Farley et al. | 526/113 |
| 7,119,153 B2 | 10/2006 | Jensen et al. | 526/113 |
| 7,157,531 B2 | 1/2007 | Szul et al. | 526/79 |
| 7,172,816 B2 | 2/2007 | Szul et al. | 428/523 |
| 7,179,876 B2 | 2/2007 | Szul et al. | 526/348.2 |

(Continued)

FOREIGN PATENT DOCUMENTS

| | | | |
|---|---|---|---|
| EP | 0849273 | 6/1998 | ............. C07F 17/00 |
| JP | 2011-137146 | 7/2011 | ............. C08F 10/02 |

(Continued)

OTHER PUBLICATIONS

Spaleck, W. et al. (1995) "Stereospecific Metallocene Catalysts: Scope and Limits of Rational Catalyst Design," *Macromolecular Symposia*, v.89(1), pp. 237-247.

Pérez-Camacho, O. et al. (1999) "Si$_2$Me$_4$-bridged Zirconocene Dichlorides: Crystal and Molecular Structure of Meso-Si$_2$Me$_4$(3-SiMe$_3$—C$_9$H$_5$)$_2$rCl$_2$," *Journal of Organometallic Chemistry*, v.585(1), pp. 18-25.

\* cited by examiner

*Primary Examiner* — Caixia Lu

(57) ABSTRACT

This invention relates to a polyethylene composition, and films therefrom, comprising at least 65 wt % ethylene derived units and from 0.1 to 35 wt % of $C_3$-$C_{12}$ olefin comonomer derived units, where the polyethylene composition has: a) an RCI,m of less than 85 kg/mol; b) a $Tw_1$-$Tw_2$ value of from −15 to −40° C.; and c) an $Mw_1/Mw_2$ value of less than 1.5 where the film has a) a heat seal initiation temperature of X ° C. or less at 5 N of force, where X=0.0015×Y(psi)+62.6 (where Y is the average 1% Secant modulus ((MD+TD)/2)) of the film; b) a dart drop impact of 300 g/mil or more; c) an MD Elmendorf tear of 230 g or more; and d) average 1% Secant modulus ((MD+TD)/2) of 20,000 psi or more.

26 Claims, 3 Drawing Sheets

(56) References Cited

U.S. PATENT DOCUMENTS

| | | | |
|---|---|---|---|
| 7,381,783 B2 | 6/2008 | Loveday et al. | 526/352 |
| 7,405,261 B2 | 7/2008 | Schulte et al. | 526/170 |
| 7,547,754 B2 | 6/2009 | McDaniel et al. | 526/352 |
| 7,572,875 B2 | 8/2009 | Jensen et al. | 526/348 |
| 7,625,982 B2 | 12/2009 | Martin et al. | 525/240 |
| 7,728,086 B2 | 6/2010 | Ciaccia | 526/161 |
| 7,842,764 B2 | 11/2010 | Nifant'ev et al. | 526/160 |
| 8,058,461 B2 | 11/2011 | Voskoboynikov et al. | 556/53 |
| 8,247,065 B2 | 8/2012 | Best et al. | 428/220 |
| 8,378,043 B2 | 2/2013 | Graham et al. | 526/170 |
| 8,383,754 B2 | 2/2013 | Yang et al. | 526/348.5 |
| 8,476,392 B2 | 7/2013 | Kolb et al. | 526/328 |
| 8,609,793 B2 | 12/2013 | Buck et al. | 526/113 |
| 8,691,715 B2 | 4/2014 | Yang et al. | 502/152 |
| 8,722,567 B2 | 5/2014 | Slawinski | 502/232 |
| 8,846,841 B2 | 9/2014 | Yang et al. | 526/348.5 |
| 8,865,848 B2 | 10/2014 | Castro et al. | 526/160 |
| 8,940,842 B2 | 1/2015 | Yang et al. | 526/61 |
| 9,006,367 B2 | 4/2015 | McDaniel et al. | C08F 210/14 |
| 9,040,643 B2 | 5/2015 | Buck et al. | C08F 4/65927 |
| 9,096,745 B2 | 8/2015 | Lam et al. | C08L 23/06 |
| 9,115,229 B2 | 8/2015 | Slawinski | C08F 110/02 |
| 9,181,369 B2 | 11/2015 | Tso et al. | C08F 210/16 |
| 9,181,370 B2 | 11/2015 | Sukhadia et al. | C08F 210/16 |
| 9,217,049 B2 | 12/2015 | Yang et al. | C08F 210/16 |
| 9,290,593 B2 | 3/2016 | Cho et al. | C08F 210/14 |
| 9,334,350 B2 | 5/2016 | McDaniel et al. | C08F 210/16 |
| 9,447,265 B2 | 9/2016 | Lam et al. | C08L 23/06 |
| 9,988,410 B2 | 6/2018 | Yang et al. | C01F 17/00 |
| 10,927,202 B2 | 2/2021 | Lue et al. | C08F 210/16 |
| 10,927,203 B2 | 2/2021 | Lue et al. | C08F 210/16 |
| 2003/0088038 A1 | 5/2003 | Vaughan et al. | 526/114 |
| 2009/0156764 A1 | 6/2009 | Malakoff et al. | 526/170 |
| 2012/0088890 A1 | 4/2012 | Buck et al. | 526/64 |
| 2012/0232229 A1 | 9/2012 | Buck et al. | 526/64 |
| 2014/0057777 A1 | 2/2014 | Buck et al. | 502/117 |
| 2014/0100343 A1* | 4/2014 | Ker | C08F 4/65927 526/147 |
| 2014/0107301 A1 | 4/2014 | Buck et al. | 526/64 |
| 2015/0291748 A1 | 10/2015 | Malakoff et al. | C08J 5/18 |
| 2018/0237554 A1 | 8/2018 | Holtcamp et al. | C08F 4/65927 |
| 2019/0127502 A1 | 5/2019 | Holtcamp et al. | C08F 210/02 |
| 2019/0144571 A1 | 5/2019 | Yang et al. | C08F 10/02 |

FOREIGN PATENT DOCUMENTS

| | | | |
|---|---|---|---|
| JP | 2015-172037 | 10/2015 | C07F 19/00 |
| KR | 2015-065084 | 4/2017 | C07F 17/00 |
| WO | 2002-002576 | 1/2002 | C07F 17/00 |
| WO | 2005-058916 | 6/2005 | C08F 10/08 |
| WO | 2006-097497 | 9/2006 | C07F 17/00 |
| WO | 2009-027075 | 3/2009 | C08F 4/656 |
| WO | 2013-151863 | 10/2013 | C08F 210/16 |
| WO | 2015/123164 | 8/2015 | C08F 210/02 |
| WO | 2016-172099 | 10/2016 | C08F 110/02 |
| WO | 2017-011073 | 1/2017 | B01J 31/16 |
| WO | 2019/027587 | 2/2019 | C08F 210/16 |
| WO | 2019/099250 | 5/2019 | C08F 4/6592 |

POLYETHYLENE COMPOSITIONS AND ARTICLES MADE THEREFROM

STATEMENT OF RELATED APPLICATIONS

This application is a continuation-in-part of U.S. Ser. No. 16/182,856, filed Nov. 7, 2018 which claims priority to and the benefit of U.S. Ser. No. 62/585,629, filed Nov. 14, 2017.

FIELD OF THE INVENTION

The present disclosure relates to polyethylene (PE) compositions made from mixed metallocene catalyst systems and articles, such as films, made therefrom.

BACKGROUND OF THE INVENTION

Olefin polymerization catalysts are of great use in industry to produce polyolefin polymers and these polymers have revolutionized virtually every aspect of the modern world. Hence, there is strong interest in finding new catalyst systems to use in polymerization processes that increase the commercial usefulness of the catalyst systems and allow the production of polyolefin polymers having improved properties or a new combination of properties.

In particular, much effort has been placed in understanding how the comonomer is distributed along the polymer carbon chain or simply polymer chain of a polyolefin polymer. For example, the composition distribution of an ethylene alpha-olefin copolymer refers to the distribution of comonomer (short chain branches) among the molecules that comprise the polyethylene polymer. When the amount of short chain branches varies among the polymer carbon chain, the polymer or resin is said to have a Broad Composition Distribution (BCD). When the amount of comonomer per about 1,000 carbons is similar among the polyethylene molecules of different polymer chain lengths or molecular weights, the composition distribution is said to be "narrow" or have a Narrow Composition Distribution (NCD).

The composition distribution is known to influence the properties of copolymers, for example, extractables content, environmental stress crack resistance, heat sealing, dart drop impact resistance, and tear resistance or strength. The composition distribution of a polyolefin may be readily measured by methods known in the art, for example, Temperature Raising Elution Fractionation (TREF) or Crystallization Analysis Fractionation (CRYSTAF). See, for example, U.S. Pat. No. 8,378,043, Col. 3 and Col. 4.

Ethylene alpha-olefin copolymers may be produced in a low pressure reactor, utilizing, for example, solution, slurry, and/or gas phase polymerization processes. Polymerization takes place in the presence of activated catalyst systems such as those employing a Ziegler-Natta catalyst, a chromium based catalyst, a vanadium catalyst, a metallocene catalyst, a mixed catalyst (i.e., two or more different catalysts co-supported on the same carrier such as a bimodal catalyst), other advanced catalysts, or combinations thereof. In general, these catalysts when used in a catalyst system all produce a variety of polymer chains in a polyolefin polymer composition that vary in molecular weight and comonomer incorporation. In some cases, this variation becomes a "signature" to the catalyst itself.

For example, it is generally known in the art that a polyolefin's composition distribution is largely dictated by the type of catalyst used. For example, Broad Composition Distribution or BCD refers to polymers in which the length of the molecules would be substantially the same but the amount of the comonomer would vary along the length, for example, for an ethylene-hexene copolymer, hexene distribution varies from low to high while the molecular weight is roughly the same or the Polydispersity Index (PDI) is narrow.

Polymers made with Zeigler Natta catalysts are considered to be "conventional" in which the composition distribution is broad but the high molecular weight fractions are higher density (i.e., less comonomer) than the lower molecular weight fraction (high comonomer).

In contrast, metallocene catalysts typically produce a polyolefin polymer composition with an NCD. A metallocene catalyst is generally a metal complex of a transitional metal, typically, a Group 4 metal, and one or more cyclopentadienyl (Cp) ligands or rings. As stated above, NCD generally refers to the comonomer being evenly distributed or not vary much along the polymer chain.

More recently, a third distribution has been described for a polyolefin polymer composition having a Broad Orthogonal Composition Distribution (BOCD) in which the comonomer is incorporated predominantly in the high molecular weight chains. A substituted hafnocene catalyst has been noted to produce this type of distribution. See, for example, U.S. Pat. Nos. 6,242,545, 6,248,845, 6,528,597, 6,936,675, 6,956,088, 7,172,816, 7,179,876, 7,381,783, 8,247,065, 8,378,043, 8,476,392; U.S. Patent Application Publication No. 2015/0291748; and 2018/0237554, filed Feb. 20, 2017, entitled Supported Catalyst Systems and Processes for Use Thereof. This distribution has been noted for its improved physical properties, for example, ease in fabrication of end-use articles as well as stiffness and toughness in multiple applications such as films that can be measured by dart drop impact resistance and tear resistance or strength.

As taught by U.S. Pat. No. 8,378,043, BOCD refers to incorporating the comonomer predominantly in the high molecular weight chains. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

In another patent, U.S. Pat. No. 9,290,593 (593 patent) teaches that the term "BOCD" is a novel terminology that is currently developed and relates to a polymer structure. The term "BOCD structure" means a structure in which the content of the comonomer such as alpha olefins is mainly high at a high molecular weight main chain, that is, a novel structure in which the content of a short chain branching (SCB) is increased as moving toward the high molecular weight. The '593 patent also teaches a BOCD Index. The BOCD Index may be defined by the following equation:

BOCD Index=(Content of SCB at the high molecular weight side−Content of SCB at the low molecular weight side)/(Content of SCB at the low molecular weight side)

wherein the "Content of SCB at the high molecular weight side" means the content of the SCB (the number of branches/1000 carbon atoms) included in a polymer chain having a molecular weight of $M_w$ of the polyolefin or more and $1.3 \times M_w$ or less, and the "Content of SCB at the low molecular weight side" means the content of the SCB (the number of branches/1000 carbon atoms) included in a polymer chain having a molecular weight of $0.7 \times M_w$ of the polyolefin or more and less than Mw. The BOCD Index defined by equation above may be in the range of 1 to 5, preferably 2 to 4, more preferably 2 to 3.5. See, also, FIGS. 1 and 2 of the '593 patent (characterizing BOCD polymer structures using GPC-FTIR data).

BOCD behavior in a polymer composition has been associated with a good balance of mechanical and optical properties and has been an important goal in the development of new polymer products. For example, Linear Low Density Polyethylene (LLDPE) film applications and products strive for a good balance of stiffness, toughness, optical properties (e.g., haze and gloss) and processability. For some LLDPE film applications, sealing performance is also important. Sealing performance is affected mainly by density, it improves as density gets lower, but density has the opposite effect on stiffness. Therefore, to achieve a balanced performance, there is usually a trade-off between stiffness and sealing performance. Thus, to improve sealing performance while maintaining good stiffness remains a challenge. Past efforts have shown that namely molecular weight distribution and comonomer distribution interdependence (MWDxCD) has a strong effect on sealing performance, with narrow CD resin by metallocene catalyst outperforming broad CD resin by conventional catalysts.

Catalysts for olefin polymerization are often based on transition metal compounds, e.g., metallocenes, as catalyst precursors, which are activated either with alumoxane or an activator containing a non-coordinating anion.

WO 2002/002576 discloses metallocene compositions and their use in the preparation of catalyst systems for olefin polymerization, particularly propylene polymerization. The bridged bis (2-$R^3$-4-phenyl-indenyl) metallocenes described therein include those having at least one phenyl ring substituted at the 3' and 5' positions by butyl groups which may be the same or different, e.g., tert-butyl.

U.S. Publication No. 2014/0057777; U.S. Publication No. 2014/0107301; WO 2013/151863; and EP 0849273 B1 disclose $(Me_2Si)_2(Indenyl)_2ZrCl_2$.

WO 2017/011073 discloses substituted $(Me_2Si)_2(Indenyl)_2ZrCl_2$ compounds, such as tetramethylenedisilylene bis(4-(3',5'-di-tert-butylphenyl)-indenyl) zirconium dichloride.

U. S. Publication No. 2003/0088038 discloses $Me_2Si-O-SiMe_2(indenyl)_2ZrCl_2$.

Perez-Camacho, O. et al. (1999) "$Si_2 Me_4$-bridged Zirconocene Dichlorides: Crystal and Molecular Structure of meso-$Si_2Me_4(3-SiMe_3-C_9H_5)_2ZrCl_2$," *Journal of Organometallic Chemistry*, v.585(1), pp. 18-25, discloses $Si_2Me_4$-bridged zirconocene dichlorides, such as meso-$(Me_2Si)_2(Indenyl)_2ZrCl_2$ and meso-$Si_2Me_4(3-SiMe_3-C_9H_5)_2ZrCl_2$.

U.S. Publication No. 2012/0088890A1 discloses metallocene compositions and their use in catalyst systems for olefin polymerization. The bridged metallocenes described therein include $((Me_2Si)_2(Indenyl)(Cp)ZrCl_2$.

Spaleck, W. et al. (1995) "Stereospecific Metallocene Catalysts: Scope and Limits of Rational Catalyst Design," *Macromolecular Symposia*, v.89(1), pp. 237-247, discloses bridged zirconocenes: rac-$(Me_2Si)_2(Indenyl)_2ZrCl_2$, rac-$(Me_2Si)_2(2-Me-4-Ph-Indenyl)_2ZrCl_2$, rac-$(Me_2Si)_2(2-Me-4,5-Benzo-Indenyl)_2ZrCl_2$.

U.S. Pat. No. 9,988,410 discloses substituted bis indenyl metallocene catalyst compounds comprising —Si—Si— bridges and their use in catalyst systems for olefin polymerization.

U.S. Pat. No. 9,040,643 disclose various $(Me_2Si)_2$ bridged catalyst compounds, such as $(Me_2Si)_2(Cp)(3-(3-phenylpropyl)-Indenyl)ZrCl_2$; $(Me_2Si)_2(Cp)(3-Allyl-Indenyl)ZrCl_2$; $(Me_2Si)_2(Me_4Cp)(3-Allyl-Indenyl)ZrCl_2$; and $(Me_2Si)_2(Cp)(3,8-di-tBu-Fluorenyl)ZrCl_2$.

EP 0849273A1 discloses $(Me_2Si)_2$ bridged catalyst compounds containing a seven membered ring fused with a cyclopentadienyl group.

KR 2015065084 discloses bis (substituted-fluorenyl) ($Me_2Si-CH_2$) bridged catalyst compounds.

U.S. Pat. Nos. 7,842,764 and 8,865,848 discloses bridged metallocenes, such as $(Me_2Si)_2(Indenyl)_2ZrCl_2$. The bridged metallocenes described therein have $C^6$ and $C^7$ of each indenyl ligand joined to form a saturated cyclic 5-membered ring.

U.S. Pat. No. 7,728,086 discloses bridged metallocene compositions having two indenyl ligands, such as $(Me_2Si)_2(Indenyl)_2ZrCl_2$.

JP 2015/172037 discloses bridged metallocene compositions such as $(Me_2Si)_2(Indenyl)(Cp)ZrCl_2$. The bridged metallocene compositions described therein consist of a hydrogen atom at $C^8$ of the indenyl ligand.

Other references of interest include: WO 2009/027075; JP 2011-137146A; WO 1998/403331; and U.S. Pat. Nos. 8,609,793; 8,058,461; 7,405,261; 7,157,531; 6,936,675; 6,903,229; 6,894,179; 6,888,017; 6,825,372; 6,784,305; 6,414,095; 6,399,723; 6,380,334; 6,380,331; 6,380,330; 6,380,124; 6,380,123; 6,380,121; 6,380,120; 6,376,627; 6,376,413; 6,376,412; 6,376,411; 6,376,410; 6,376,409; 6,376,408; and 6,376,407; US 2009/0156764 and U.S. Pat. Nos. 7,119,153, 7,547,754, 7,572,875, 7,625,982, 8,383, 754, 8,691,715, 8,722,567, 8,846,841, 8,940,842, 9,006,367, 9,096,745, 9,115,229, 9,181,369, 9,181,370, 9,217,049, 9,334,350, WO 2015/123164, 9,447,265; U.S. Ser. No. 16/152,470, filed Oct. 5, 2018, and U.S. Ser. No. 16/152,458, filed Oct. 5, 2018.

Thus, there is a need for polyethylene compositions that can produce LLDPE film products or other useful articles with a good balance of one or more of high stiffness, toughness and sealing performance, as well as good processability.

SUMMARY OF THE INVENTION

In a class of embodiments, the invention provides for a polyethylene composition comprising at least 65 wt % ethylene derived units and from 0.1 to 35 wt % of $C_3$-$C_{12}$ olefin comonomer derived units, based upon the total weight of the polyethylene composition; wherein the polyethylene composition has:

a) an RCI,m of less than 85 kg/mol;
b) a $Tw_1$-$Tw_2$ value of from −15 to −40° C.; and
c) an $Mw_1$/$Mw_2$ value of less than 1.5, such as 0.6 to 1.2; and one or more of the following:
d) a density of from 0.890 g/cm$^3$ to 0.940 g/cm$^3$;
e) a melt index (MI) of from 0.1 g/10 min to 30 g/10 min;
f) a melt index ratio (I21/I2) of from 12 to 90 (such as 14 to 55, or 15 to 45, or 15 to 35);
g) an $M_w$/$M_n$ of from 2 to 10 (such as 2.5 to 6, or 2.5 to 5, or 2.8 to 4);
h) an $M_z$/$M_w$ of from 1.5 to 5.0;
i) an $M_z$/$M_n$ of from 3 to 50; and
j) a g'(vis) of 0.90 or greater.

In another class of embodiments, the invention provides for articles (such as films) made from the polyethylene composition and processes for making the same.

This invention also relates to films, preferably prepared from the polyethylene composition above, having:
  a) a heat seal initiation temperature of X° C. or less at 5 N of force, where X=0.0015×Y(psi)+62.6 (where Y is the average 1% Secant modulus ((MD+TD)/2)) of the film;
  b) a dart drop impact of 300 g/mil or more;
  c) an MD Elmendorf tear of 230 g or more;
  d) average 1% Secant modulus ((MD+TD)/2) of 20,000 psi or more.

This invention also relates to a process to prepare the above polyethylene composition comprising contacting ethylene and $C_3$-$C_{12}$ olefin comonomer with a catalyst system comprising support, activator, and a catalyst compound represented by formula (I):

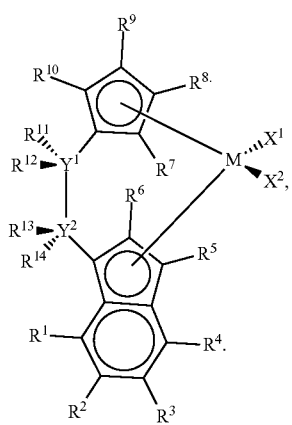

(I)

wherein:
M is a group 4 metal;
$Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si;
$X^1$ and $X^2$ are independently hydrogen, halide, hydroxyl, or $C_1$-$C_{50}$ substituted or unsubstituted hydrocarbyl, amide, alkoxide, sulfide, phosphide, halide, or a combination thereof, or $X^1$ and $X^2$ are joined together to form a metallocycle ring, or $X^1$ and $X^2$ are joined to form a chelating ligand, or an alkylidene;
each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsatu- rated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I). Preferably the catalyst composition is a blend of rac and meso isomers.

DETAILED DESCRIPTION

Figure 1:
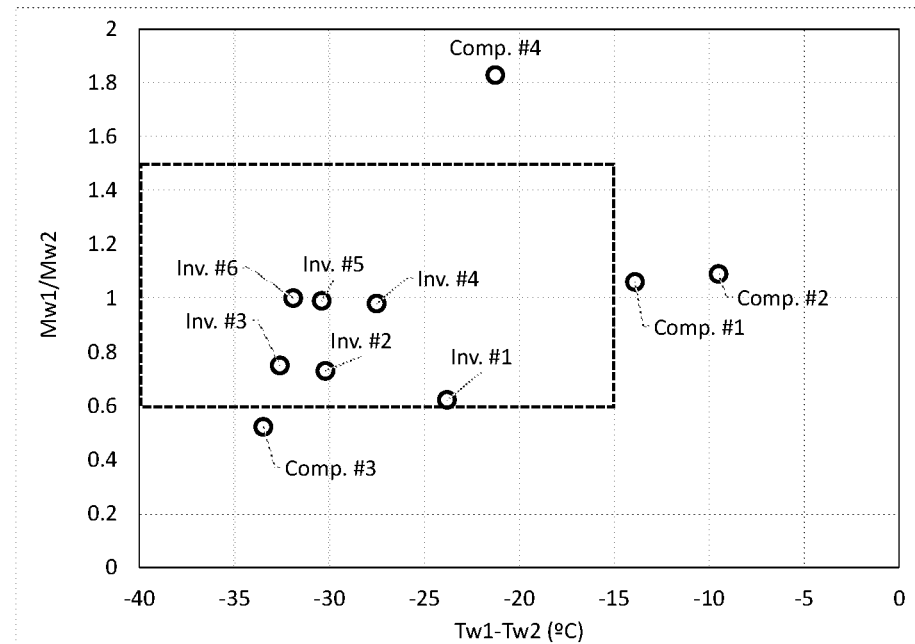
FIG. 1 is a graph of $Mw_1/Mw_2$ versus $Tw_1$-$Tw_2$ for the examples in Table B.
Figure 2:
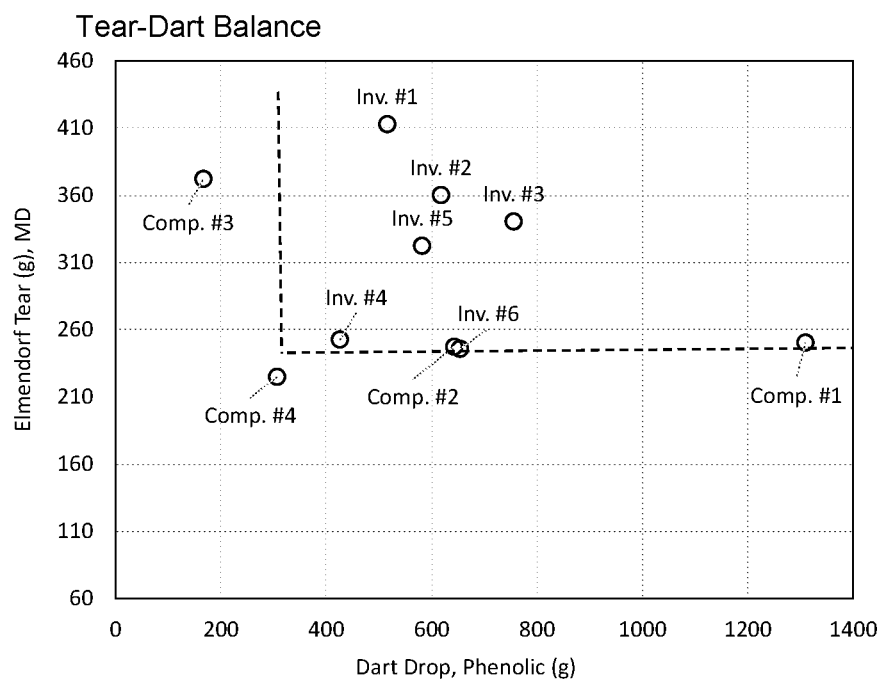
FIG. 2 is a graph of Elmendorf Tear (MD) versus Dart Drop for the examples in Table B.
Figure 3:
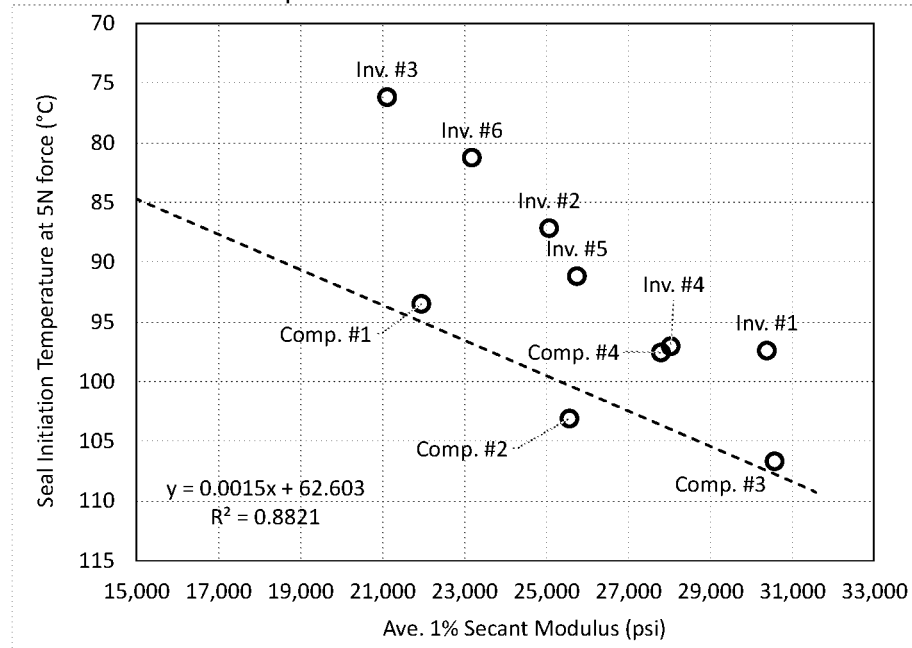
FIG. 3 is a is a graph of seal initiation temperature at 5N force versus average 1% Secant modulus for the examples in Tables B and C.
Figure 4:
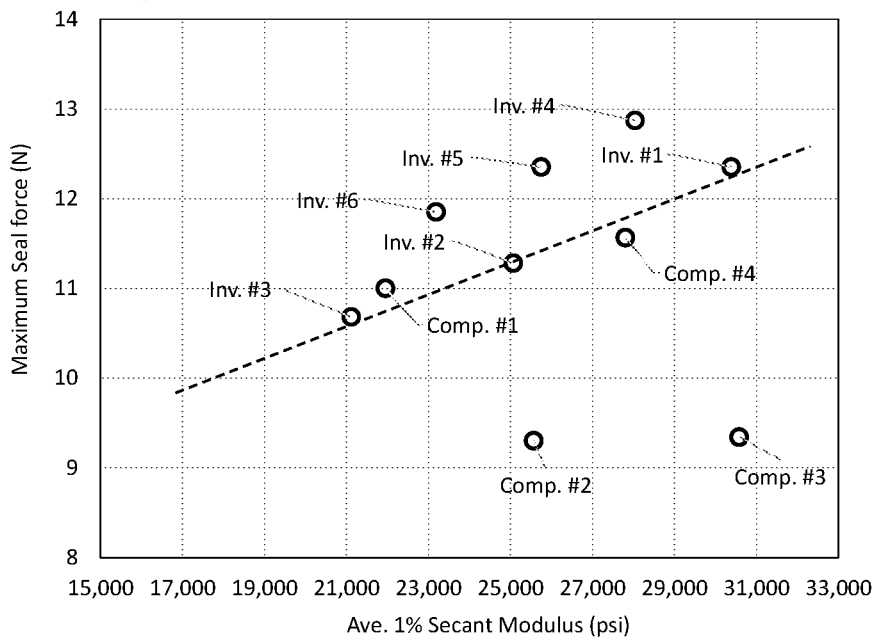
FIG. 4 is a graph of maximum seal force versus average 1% Secant modulus for the examples in Table B.

Before the present compounds, components, compositions, and/or methods are disclosed and described, it is to be understood that unless otherwise indicated this invention is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

In several classes of embodiments of the invention, the present disclosure is directed to catalyst systems and their use in polymerization processes to produce polyolefin polymers such as polyethylene polymers and polypropylene polymers. In another class of embodiments, the present disclosure is directed to polymerization processes to produce polyolefin polymers from catalyst systems comprising the product of the combination of one or more olefin polymerization catalysts, at least one activator, and at least one support.

In particular, the present disclosure is directed to a polymerization process to produce a polyethylene polymer, the process comprising contacting a catalyst system comprising the product of the combination of one or more metallocene catalysts, at least one activator, and at least one support, with ethylene and one or more $C_3$-$C_{10}$ alpha-olefin comonomers under polymerizable conditions.

Definitions

For purposes herein, the numbering scheme for the Periodic Table Groups used herein is the new notation as described in CHEMICAL AND ENGINEERING NEWS, 63(5), (1985) pg. 27. Therefore, a "group 4 metal" is an element from group 4 of the Periodic Table, e.g., Hf, Ti, or Zr.

As used herein, "olefin polymerization catalyst(s) refers to any catalyst, typically an organometallic complex or compound that is capable of coordination polymerization addition where successive monomers are added in a monomer chain at the organometallic active center.

The specification describes transition metal complexes. As used herein, the term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

For purposes of this invention and claims thereto, unless otherwise indicated, the term "substituted" means that a hydrogen group has been replaced with a heteroatom, or a heteroatom containing group (such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring), or a hydrocarbyl group, except that substituted hydrocarbyl is a hydrocarbyl in which at least one hydrogen atom of the hydrocarbyl has been substituted with at least one heteroatom or heteroatom containing group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The terms "hydrocarbyl radical," "hydrocarbyl," "hydrocarbyl group," "alkyl radical," and "alkyl" are used interchangeably throughout this document. Likewise, the terms "group," "radical," and "substituent," are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues.

As used herein, and unless otherwise specified, the term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$,—$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e., $C_1$-$C_{12}$ alkylene) in length and meaning the alkylene moiety is attached to the rest of the molecule at both ends of the alkyl unit. For example, alkylenes include, but are not limited to, —$CH_2$—, —$CH_2CH_2$—, —$CH(CH_3)CH_2$—, —$CH_2CH_2CH_2$—, etc. The alkylene group may be linear or branched.

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —CH═CH—,—CH═CHCH$_2$—, —CH═CH═CH—, —CH$_2$CH$_2$CH═CHCH$_2$—, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompasses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —C≡CCH$_2$—, —C≡CCH$_2$CH$_2$C≡C—, —CH$_2$CH$_2$C≡CCH$_2$—. The alkynylene group may be linear or branched.

As used herein, and unless otherwise specified, the term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like. Preferably, the term "alkoxy" refers to —O-alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

The term "aryl" or "aryl group" includes a $C_4$-$C_{20}$ aromatic ring, such as a six carbon aromatic ring, and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

For any particular compound disclosed herein, any general or specific structure presented also encompasses all conformational isomers, regioisomers, and stereoisomers (e.g., diastereomers or enantiomers) that may arise from a particular set of substituents, unless stated otherwise. Similarly, unless stated otherwise, the general or specific structure also encompasses all enantiomers, isomers, and other optical isomers whether in enantiomeric or racemic forms, as well as mixtures of stereoisomers.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "hydroxyl" refers to an —OH group.

As used herein, "oxygenate" refers to a saturated, unsaturated, or polycyclic cyclized hydrocarbon radical containing from 1 to 40 carbon atoms and further containing one or more oxygen heteroatoms.

As used herein, "aluminum alkyl adducts" refers to the reaction product of aluminum alkyls and/or alumoxanes with quenching agents, such as water and/or methanol.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are distinct or different from each other. A "terpolymer" is a polymer having three mer units that are distinct or different from each other. "Distinct" or "different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, ethylene shall be considered an α-olefin.

"Polymerizable conditions" refer those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer through typically coordination polymerization.

The term "continuous" means a system that operates without interruption or cessation. For example a continuous process to produce a polymer would be one where the reactants are continually introduced into one or more reactors and polymer product is continually withdrawn.

A "catalyst composition" or "catalyst system" is the combination of at least one catalyst compound, a support material, an activator, and an optional co-activator. For the purposes of this invention and the claims thereto, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

Coordination polymerization is an addition polymerization in which successive monomers are added to or at an organometallic active center to create and/or grow a polymer chain.

The terms "cocatalyst" and "activator" are used herein interchangeably and are defined to be any compound which can activate any one of the catalyst compounds herein by converting the neutral catalyst compound to a catalytically active catalyst compound cation.

As used herein, the metallocene catalyst may be described as a catalyst precursor, a pre-catalyst compound, metallocene catalyst compound or a transition metal compound, and these terms are used interchangeably. A polymerization catalyst system is a catalyst system that can polymerize monomers to polymer. The terms activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

A metallocene catalyst is defined as an organometallic compound with at least one n-bound cyclopentadienyl moiety (or substituted cyclopentadienyl moiety, such as indene, fluorene or indacene).

For purposes of this invention and the claims thereto, when R groups are described as able to join and form a cyclic group (such as a substituted cyclic ring), this cyclic group can include its own groups that join to become a cyclic ring, e.g., the substituted cyclic ring can form multinuclear cyclic groups.

The term "contact product" or "the product of the combination of" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another or react in the manner as theorized. Similarly, the term "contacting" is used herein to refer to materials which may be blended, mixed, slurried, dissolved, reacted, treated, or otherwise contacted in some other manner.

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and 8,476,392, Col. 16, line 54.

In some embodiments, "high molecular weight" is defined as a number average molecular weight (Mn) value of 100,000 or more and "low molecular weight" is defined as an Mn value of less than 100,000 g/mol.

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In a class of embodiments, the polymers as described herein may be characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, 25.0 or greater, 30.0 or greater, 35.0 or greater, 40.0 or greater, or 45.0 or greater, wherein $T_{25}$ is the temperature at which 25% of the eluted polymer is obtained and $T_{75}$ is the temperature at which 75% of the eluted polymer is obtained in a TREF experiment as described herein.

The polymers as described herein may further have an $M_{60}/M_{90}$ value of 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, and Cy is cyclohexyl.

DESCRIPTION

This invention further relates to a process to produce a film comprising:

I) preparing a polyethylene composition by a process comprising contacting ethylene and C$_3$-C$_{12}$ olefin comonomer with a catalyst system comprising support, activator, and a metallocene catalyst compound having two or more isomers present (such as a rac/meso catalsyt compound);

II) obtaining a polyethylene composition comprising at least 65 wt % ethylene derived units and from 0.1 to 35 wt % of C$_3$-C$_{12}$ olefin comonomer derived units, based upon the total weight of the polyethylene composition; wherein the polyethylene composition has:

a) an RCI,m of less than 85 kg/mol;

b) a Tw$_1$-Tw$_2$ value of from −15 to −40° C.; and c) an Mw$_1$/Mw$_2$ value of less than 1.5, such as 0.6 to 1.2;
and one or more of the following:

d) a density of from 0.890 g/cm$^3$ to 0.940 g/cm$^3$;

e) a melt index (MI) of from 0.1 g/10 min to 30 g/10 min;

f) a melt index ratio (I21/I2) of from 12 to 90 (such as 14 to 55, or 15 to 45, or 15 to 35);

g) an M$_w$/M$_n$ of from 2 to 10 (such as 2 to 8, or 2.5 to 6, or 2.5 to 5, or 2.8 to 4);

h) an M$_z$/M$_w$ of from 1.5 to 5.0 (such as 1.8 to 5.0, or 2.0 to 5.0);

i) an M$_z$/M$_n$ of from 3 to 50 (such as 3.5 to 30, 3.8 to 20, or 4.0 to 16); and j) a g'(vis) of 0.90 or greater (such as 0.94 or greater or 0.95 or greater); and III) converting the polyethylene composition to a film having:

a) a heat seal initation temperature of X° C. or less at 5 N of force, where X=0.0015×Y(psi)+62.6 (where Y is the average 1% Secant modulus ((MD+TD)/2)) of the film;

b) a dart drop impact of 300 g/mil or more;

c) an MD Elmendorf tear of 230 g or more;

d) average 1% Secant modulus ((MD+TD)/2) of 20,000 psi or more.

This invention further relates to a process to produce a film comprising:

I) preparing a polyethylene composition by a process comprising contacting ethylene and C$_3$-C$_{12}$ olefin comonomer with a catalyst system comprising support, activator, and a catalyst compound represented by formula (I):

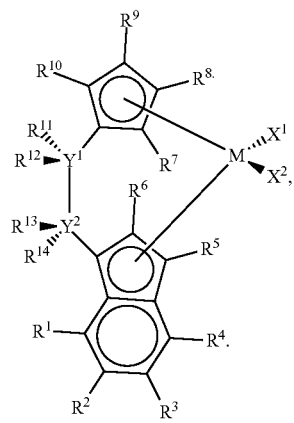

wherein:

M is a group 4 metal;

Y$^1$ and Y$^2$ are independently Si, Ge, or C, where at least one of Y$^1$ and Y$^2$ is not C, preferably at least one of Y$^1$ and Y$^2$ is Si, preferably Y$^1$ and Y$^2$ are Si;

X$^1$ and X$^2$ are independently hydrogen, halide, hydroxyl, or C$_1$-C$_{50}$ substituted or unsubstituted hydrocarbyl, amide, alkoxide, sulfide, phosphide, halide, or a combination thereof, or X$^1$ and X$^2$ are joined together to form a metallocycle ring, or X$^1$ and X$^2$ are joined to form a chelating ligand, or an alkylidene;

each of R$^1$, R$^2$, R$^3$, R$^5$, R$^6$, R$^7$, R$^9$, R$^{10}$, R$^{11}$, R$^{12}$, R$^{13}$, R$^{14}$ is independently hydrogen, halogen, C$_1$-C$_{50}$ hydrocarbyl or C$_1$-C$_{50}$ substituted hydrocarbyl, halocarbyl, silylcarbyl, alkoxyl, siloxyl, or one or more of R$^1$ and R$^2$, R$^2$ and R$^3$, R$^5$ and R$^6$, and R$^9$ and R$^{10}$, are joined to form a saturated cyclic ring, substituted saturated cyclic ring, or an unsubstituted unsaturated cyclic ring; R$^4$ is hydrogen, halogen, silylcarbyl, substituted silylcarbyl, C$_1$-C$_{10}$ hydrocarbyl, substituted C$_1$-C$_{40}$ hydrocarbyl, C$_6$-C$_{10}$ aryl, substituted C$_6$-C$_{10}$ aryl, fluorenylidenyl, substituted fluorenylidenyl, or —NR'2, —SR', —OR, —OSiR'3, —PR'2, where each R' is hydrogen, halogen, C$_1$-C$_{10}$ alkyl, or C$_6$-C$_{10}$ aryl, or R$^3$ and R$^4$, are joined to form a saturated cyclic ring, substituted saturated cyclic ring, a substituted unsaturated cyclic ring, or an unsubstituted unsaturated cyclic ring, wherein: 1) if R$^4$ is hydrogen, then R$^2$ and R$^3$ are joined to form a saturated cyclic ring, substituted saturated cyclic ring, or an unsubstituted unsaturated cyclic ring, preferably R$^8$ and R$^9$ do not form a saturated seven membered ring; 2) if R$^4$ is hydrogen and R$^2$ and R$^3$ are not joined to form a saturated cyclic ring, substituted saturated cyclic ring, or an unsubstituted unsaturated cyclic ring, then at least one of R$^8$ and R$^9$ is not hydrogen; 3) if R$^4$ is hydrogen and R$^2$ and R$^3$ are not joined to form a saturated cyclic ring, substituted saturated cyclic ring, or an unsubstituted unsaturated cyclic ring, then R$^7$, R$^8$, R$^9$ and/or R$^{10}$ are not the same; or 4) if R$^4$ is hydrogen and R$^2$ and R$^3$ are not joined to form a saturated cyclic ring, substituted saturated cyclic ring, or an unsubstituted unsaturated cyclic ring, then at least one of R$^8$ and R$^9$ is not hydrogen and R$^7$, R$^8$, R$^9$ and/or R$^{10}$ are not the same; and R$^8$ is hydrogen, halogen, C$_1$-C$_{40}$ hydrocarbyl, substituted C$_1$-C$_{40}$ hydrocarbyl, silylcarbyl, silyl, substituted silylcarbyl, C$_6$-C$_{10}$ aryl, substituted C$_6$-C$_{10}$ aryl, —NR'2, —SR', —OR, —OSiR'3, —PR'2, where each R' is hydrogen, halogen, C$_1$-C$_{10}$ alkyl, or phenyl, or R$^8$ and R$^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I), wherein the catalyst composition, preferably comprises two or more isomers, such as a blend of rac and meso isomers;

II) obtaining a polyethylene composition comprising at least 65 wt % ethylene derived units and from 0.1 to 35 wt % of $C_3$-$C_{12}$ olefin comonomer derived units, based upon the total weight of the polyethylene composition; wherein the polyethylene composition has:
a) an RCI,m of less than 85 kg/mol;
b) a $Tw_1$-$Tw_2$ value of from −15 to −40° C.; and
c) an $Mw_1/Mw_2$ value of less than 1.5, such as 0.6 to 1.2; and one or more of the following:
d) a density of from 0.890 g/cm³ to 0.940 g/cm³;
e) a melt index (MI) of from 0.1 g/10 min to 30 g/10 min;
f) a melt index ratio (I21/I2) of from 12 to 90 (such as 14 to 55, or 15 to 45, or 15 to 35);
g) an $M_w/M_n$ of from 2 to 10 (such as 2 to 8, or 2.5 to 6, or 2.5 to 5, or 2.8 to 4);
h) an $M_z/M_w$ of from 1.5 to 5.0 (such as 1.8 to 5.0, or 2.0 to 5.0);
i) an $M_z/M_n$ of from 3 to 50 (such as 3.5 to 30, 3.8 to 20, or 4.0 to 16); and
j) a g'(vis) of 0.90 or greater (such as 0.94 or greater or 0.95 or greater); and III) converting the polyethylene composition to a film having:
a) a heat seal initation temperature of X° C. or less at 5 N of force, where X=0.0015×Y(psi)+62.6 (where Y is the average 1% Secant modulus ((MD+TD)/2)) of the film;
b) a dart drop impact of 300 g/mil or more;
c) an MD Elmendorf tear of 230 g or more; and
d) average 1% Secant modulus ((MD+TD)/2) of 20,000 psi or more.

In embodiments of this invention, the catalyst compound may comprise two or more isomers, such as diastereomers, such as rac and meso diastereomers. In embodiments of this invention, the catalyst compound comprises two (such as 2, 3, 4, 5, or 6) or more isomers, preferably diastereomers. In embodiments of this invention, the catalyst compound comprises rac and meso diastereomers.

The process, polyethylene compositions, and products (such as films) are further described below.

Olefin Polymerization Catalysts

This invention further relates to a process to produce a polyethylene composition (which is preferably converted into a film) comprising ethylene and $C_3$-$C_{12}$ olefin comonomer with a catalyst system comprising support, activator, and a metallocene catalyst compound having two or more isomers (such as diastereomers) present, preferably a rac/meso metallocene catalyst compound.

The catalyst system useful herein is preferably a metallocene catalyst system comprising one or more, preferably one, metallocene catalyst compound having two or more isomers (such as diastereomers) present, at least one activator, and at least one support.

In embodiments herein, the polyethylene composition described herein is prepared using one or more, preferably one, bridged metallocene transition metal complexes having at least one indenyl ligand substituted at the 4-position, a Cp ligand with particular combinations of substituents (typically at least one substitution), and bridged with a —Si— Si—, —Si—C—, —Ge—Ge—, —Ge—C—, or —C—C— group. In some preferred embodiments, the $R^4$ position is $C_6$-$C_{10}$ aryl (such as phenyl or naphthyl) or fluorenylidenyl. The $C_6$-$C_{10}$ aryl and fluorenylidenyl can be substituted.

In embodiments herein, the present disclosure relates to polyethylene compositions prepared using a catalyst systems comprising activator, and a metallocene catalyst compound, represented by the formula (I):

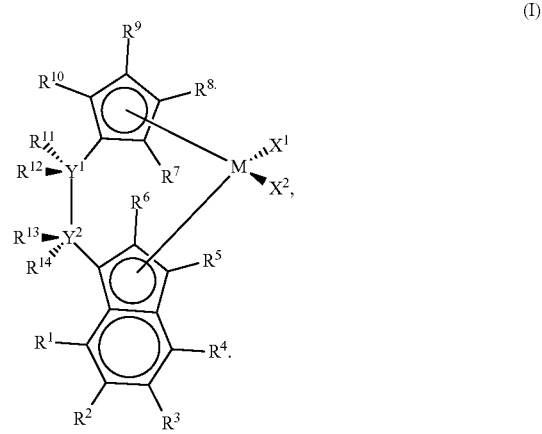

wherein:
M is a group 4 metal;
$Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si;
$X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene;
each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring;
$R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'2, —SR', —OR, —OSiR'3, —PR'2, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I). Preferably formula (I) represents a compound having at least two or more isomers (such as diastereomers).

Alternately, the present disclosure relates to polyethylene compositions prepared using a catalyst systems comprising activator, and a metallocene catalyst compound, represented by the formula (I), wherein:

M is a group 4 metal;

$Y^1$ and $Y^2$ are independently Si, Ge, or C;

$X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene;

each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring;

$R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl;

wherein if $R^4$ is hydrogen, $R^2$ and $R^3$ are joined to form a saturated cyclic ring, substituted saturated cyclic ring, or an unsubstituted unsaturated cyclic ring, and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl.

Preferably $R^8$ and $R^9$ do not form a cyclic ring, preferably $R^8$ and $R^9$ do not form an aromatic cyclic ring, preferably $R^8$ and $R^9$ do not form a mononuclear aromatic six membered cyclic ring. Preferably $R^8$ and $R^9$ do not cyclize to form indene (substituted or unsubstituted) with the five membered cyclopentadienyl ring.

Preferably $R^9$ and $R^{10}$ do not form a cyclic ring, preferably $R^9$ and $R^{10}$ do not form an aromatic cyclic ring, preferably $R^9$ and $R^{10}$ do not form a mononuclear aromatic six membered cyclic ring. Preferably $R^9$ and $R^{10}$ do not cyclize to form indene (substituted or unsubstituted) with the five membered cyclopentadienyl ring.

Preferably adjacent $R^7$, $R^8$, $R^9$ and/or $R^{10}$ groups do not cyclize to form a benzene group (substituted or unsubstituted) fused with the cyclopentadienyl ring group shown below:

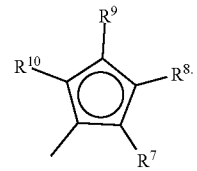

Preferably $R^3$ and $R^4$ do not form a cyclic ring, preferably $R^3$ and $R^3$ do not form an aromatic or saturated cyclic ring, preferably $R^3$ and $R^4$ do not form a mononuclear saturated five membered cyclic ring. Preferably $R^3$ and $R^4$ do not cyclize to form a-indacene or as-indacene (substituted or unsubstituted) with the indene group.

Preferably $R^1$, $R^2$, $R^3$ and/or $R^4$ do not cyclize to form a benzene group (substituted or unsubstituted) fused with the indenyl group of formula (I) shown below:

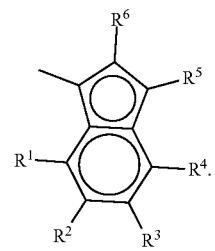

Preferably, when $R^8$ is not hydrogen, then $R^7$ and $R^{10}$ are hydrogen.

Preferably, when $R^8$ is not hydrogen, then $R^7$, $R^9$, and $R^{10}$ are hydrogen.

In at least one embodiment, $X^1$ and $X^2$ are independently halide, $C_1$-$C_{10}$ hydrocarbyl, or $C_1$-$C_{10}$ substituted hydrocarbyl.

In at least one embodiment, $R^4$ is halogen, $C_6$-$C_{10}$ aryl, substituted $C_6$-$C_{10}$ aryl, fluorenylidenyl, or substituted fluorenylidenyl, such as $C_6$-$C_{10}$ aryl or substituted $C_6$-$C_{10}$ aryl.

In at least one embodiment, $R^8$ is $C_1$-$C_{20}$ hydrocarbyl or substituted $C_1$-$C_{20}$ hydrocarbyl, such as substituted or unsubstituted methyl, ethyl, propyl, iso-propyl, n-butyl, iso-butyl, or tert-butyl.

In at least one embodiment, $R^2$ and $R^3$ combine to form a cyclobutyl ring, a cyclopentyl ring, or cyclohexyl ring, such as a cyclopentyl ring.

In at least one embodiment, $R^6$ is hydrogen, methyl, ethyl, propyl, iso-propyl, n-butyl, iso-butyl, or tert-butyl, such as hydrogen or methyl.

In at least one embodiment, M is preferably Ti, Hf, or Zr, preferably Zr.

In at least one embodiment, the catalyst represented by formula (I) is at least one of:

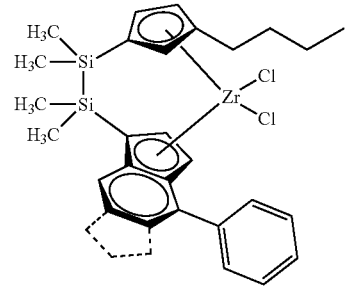

-continued

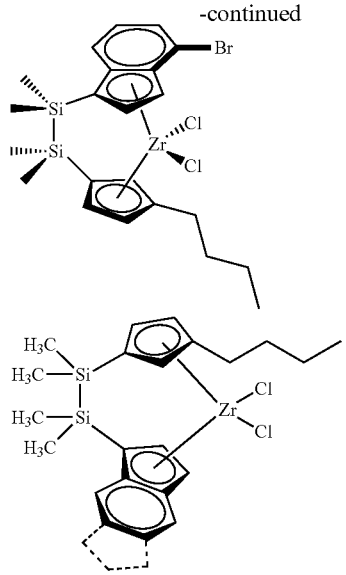

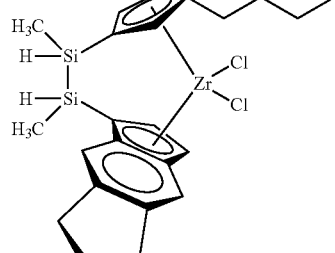

Likewise, while the dichloro-substituted compounds are enumerated above, the compounds where each of the chlorides are replaced with methyl groups (e.g., —Zr((CH$_3$)$_2$) are also expressly disclosed. And while the complexes are substituted at the 2-position of the Cp ring, and the indenyl ring is substituted at the 2-position and 4-position, and the 5 and 6-positions are joined to form a cyclic ring, analogs wherein the substitution occurs instead, and in addition, at other positions of the indene ring are also envisioned. Also, while the disilyl bridge of the compounds are enumerated above, analogs wherein some or each methyl is replaced with hydrogen or phenyl is expressly disclosed.

Catalyst compounds useful herein include those represented by the formulas below (including isomers thereof), where the Zr in each formula is optionally replaced by Hf:

| Structure |
|---|
| 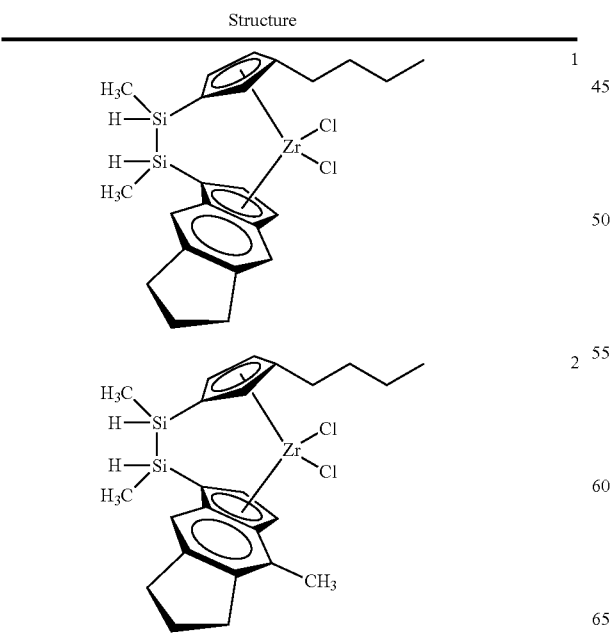 |

-continued

| Structure |
|---|
| 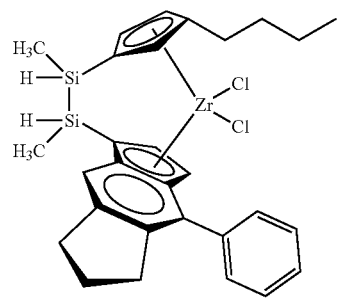 |
| 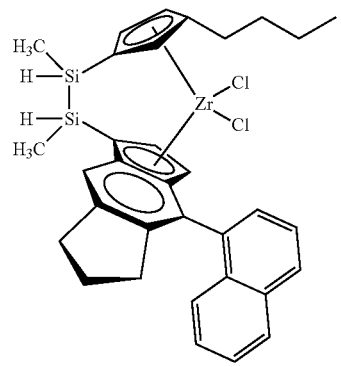 |
| 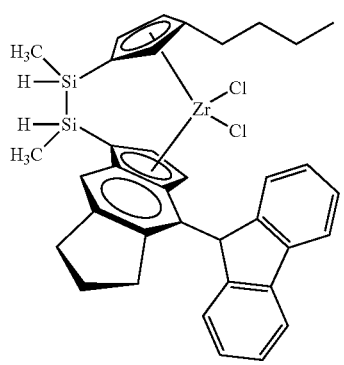 |
| 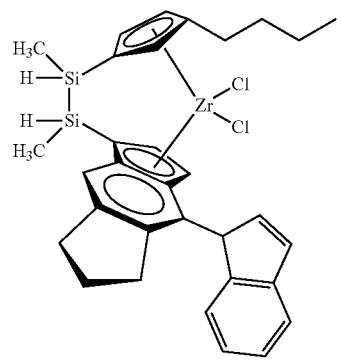 |

| Structure | |
|---|---|
| 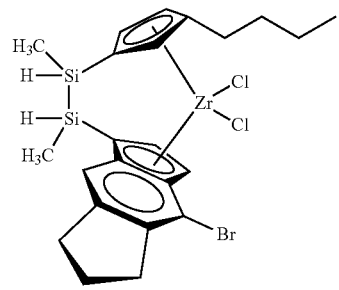 | 7 |
| 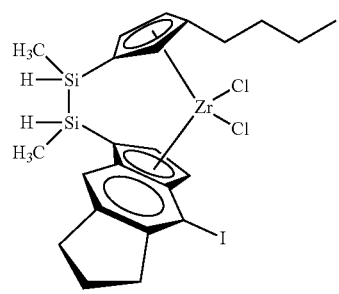 | 8 |
| 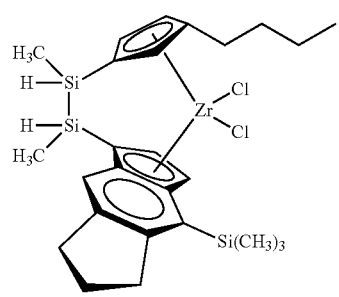 | 9 |
| 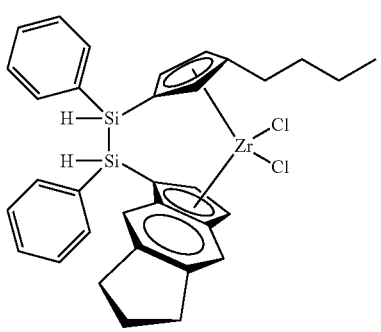 | 10 |
| 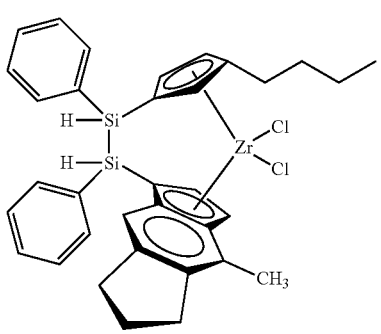 | 11 |
| Structure | |
|---|---|
| 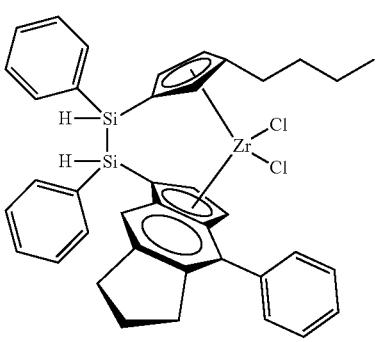 | 12 |
| 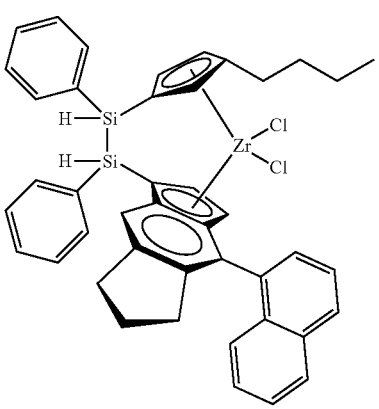 | 13 |
| 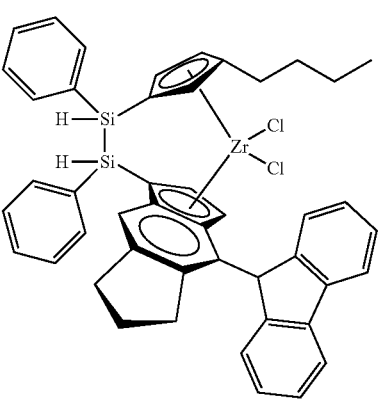 | 14 |
| 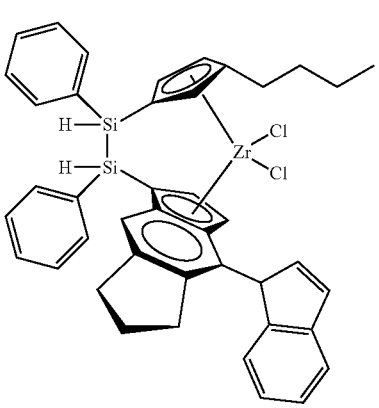 | 15 |

| | |
|---|---|
| 16 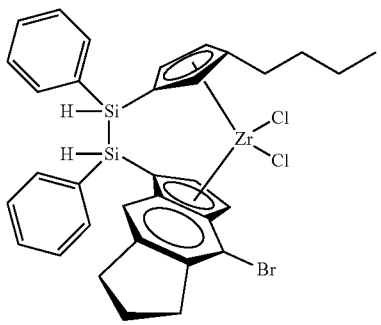 | 21 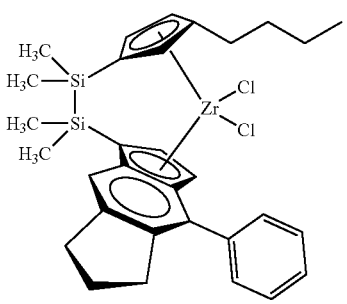 |
| 17 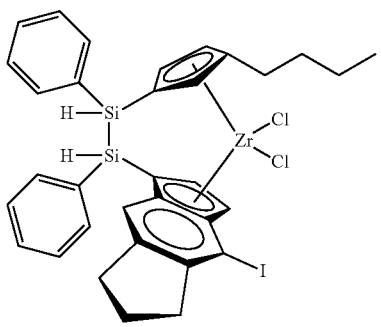 | 22 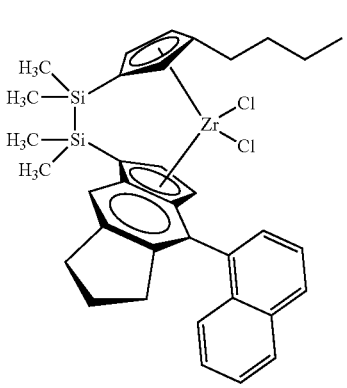 |
| 18 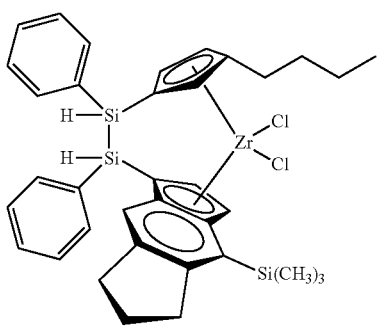 | 23 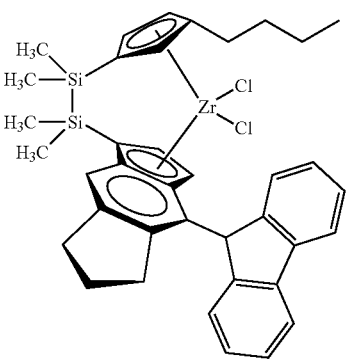 |
| 19 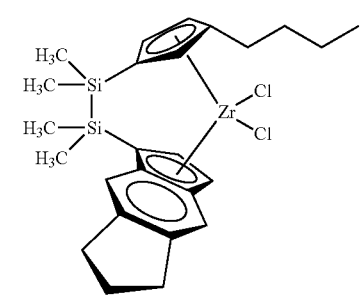 | 24 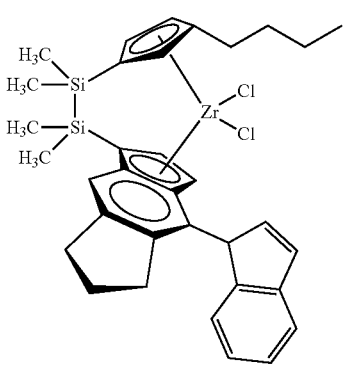 |
| 20 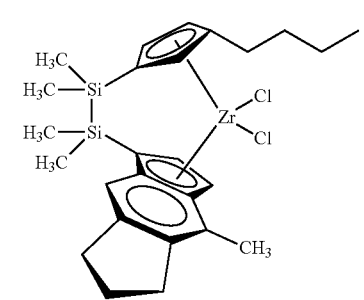 | |

| Structure | |
|---|---|
| 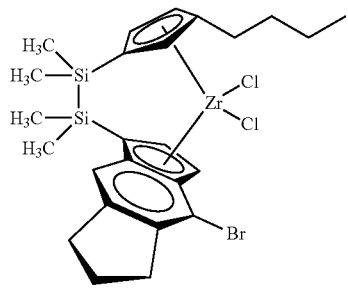 | 25 |
| 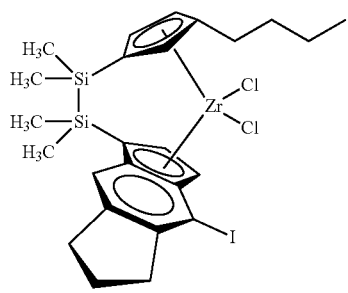 | 26 |
| 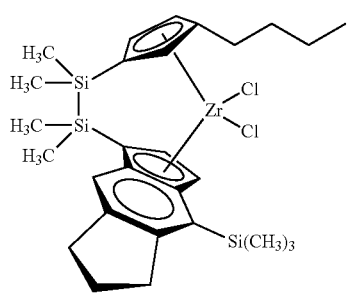 | 27 |
| 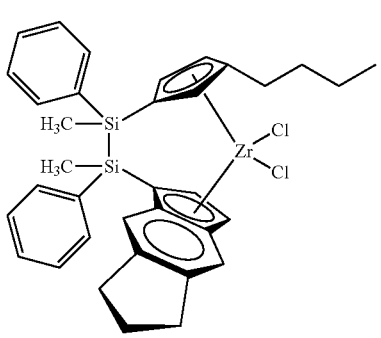 | 28 |
| 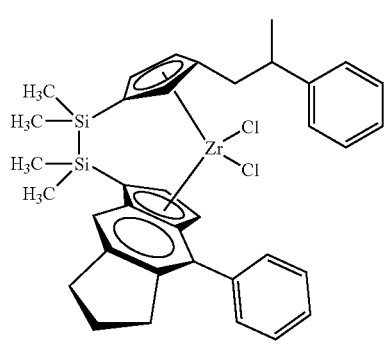 | 29 |
| 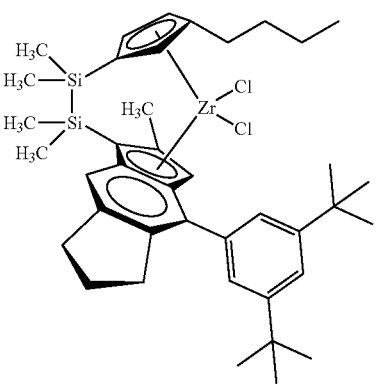 | 30 |
| 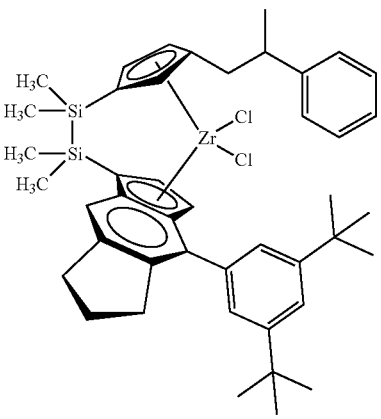 | 31 |
| 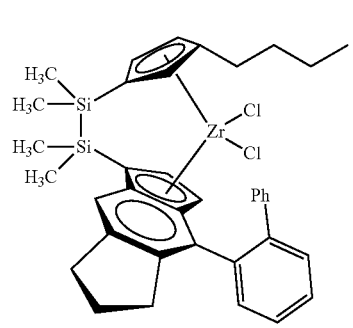 | 32 |
| 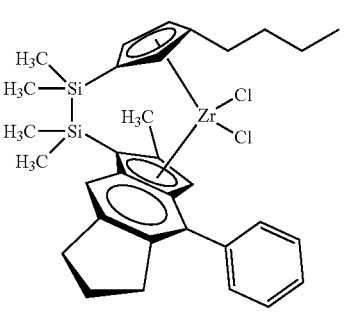 | 33 |

-continued
| Structure |
|---|
| 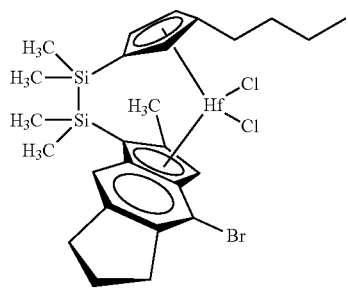 34 |
| 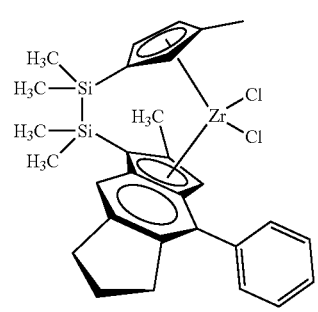 35 |
| 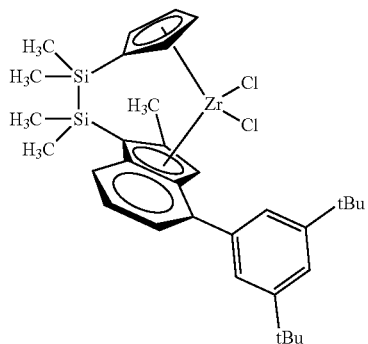 36 |
| 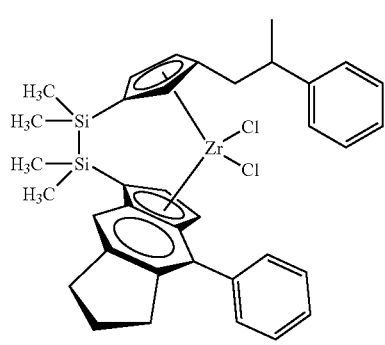 37 |
-continued
| Structure |
|---|
| 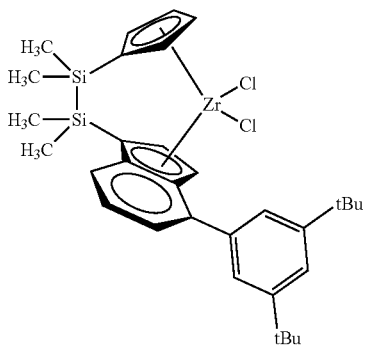 38 |
| 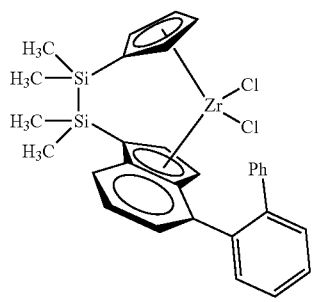 39 |
| 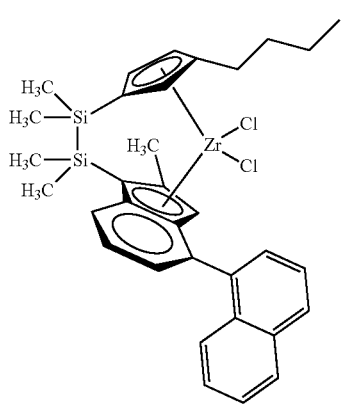 40 |
| 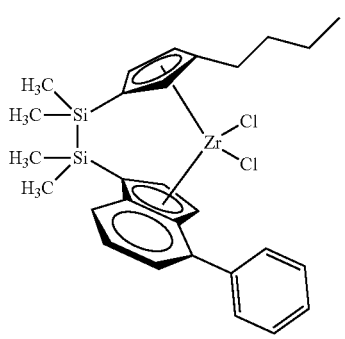 41 |

| Structure | |
|---|---|
| 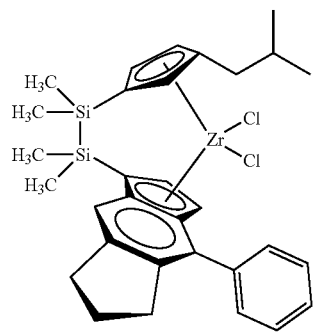 | 42 |
| 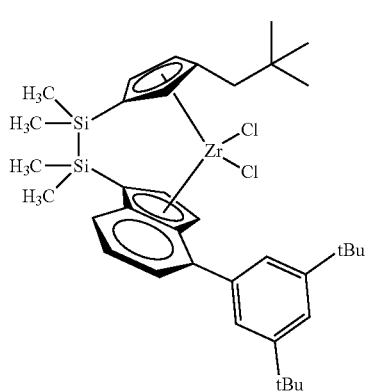 | 43 |
| 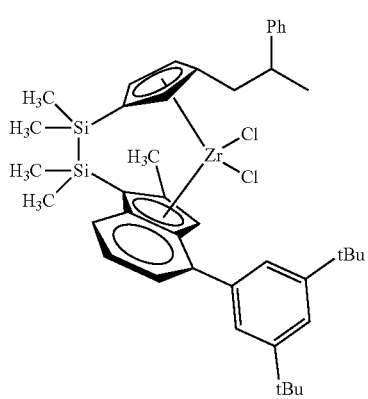 | 44 |
| 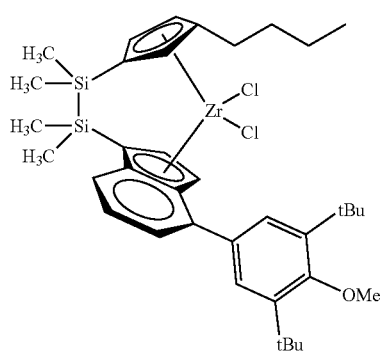 | 45 |
| Structure | |
|---|---|
| 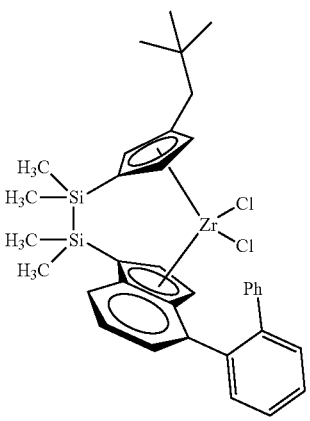 | 46 |
| 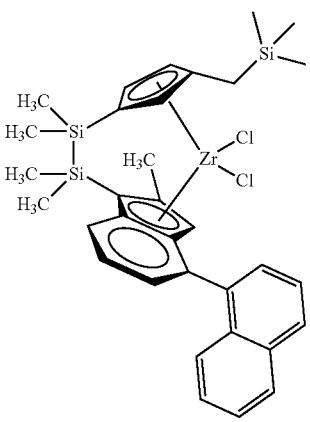 | 47 |
| 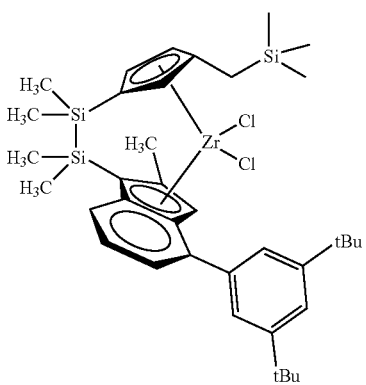 | 48 |

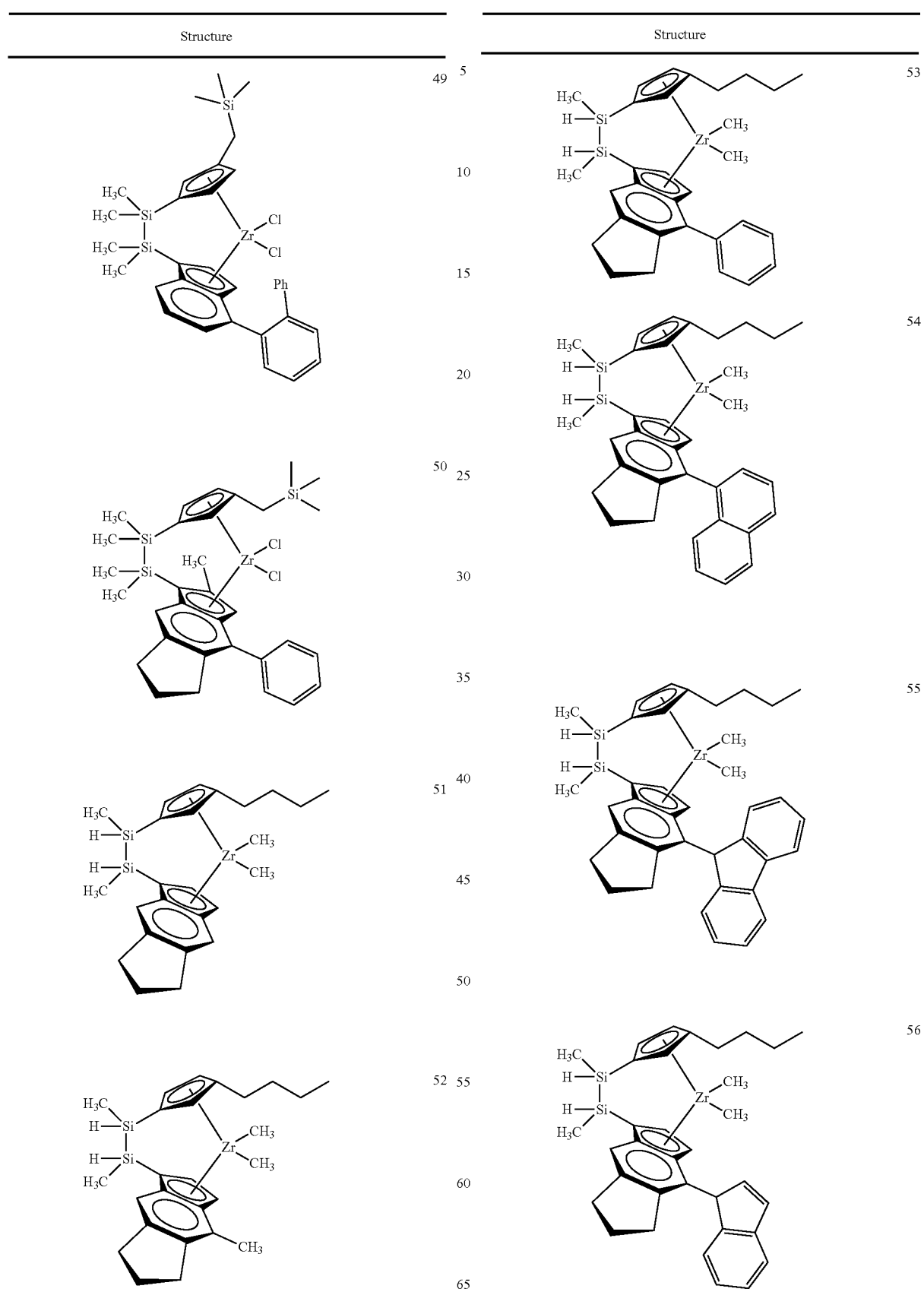

| Structure | |
|---|---|
| 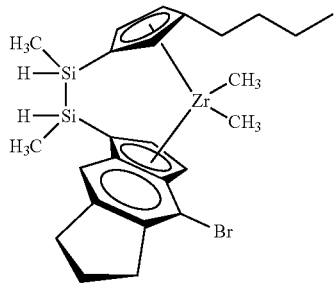 | 57 |
| 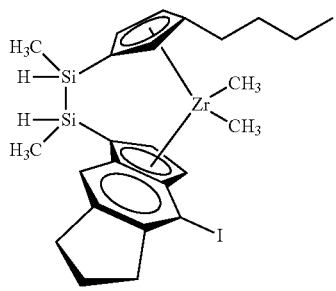 | 58 |
| 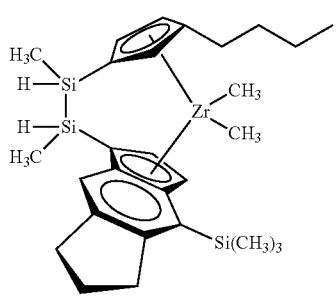 | 59 |
| 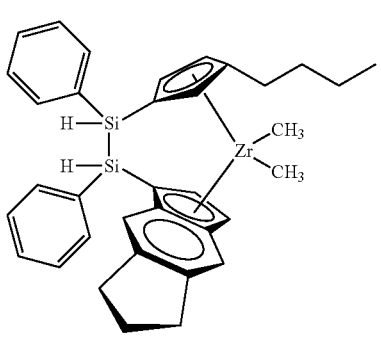 | 60 |
| 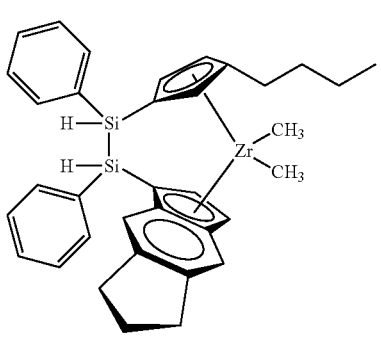 | 61 |
| 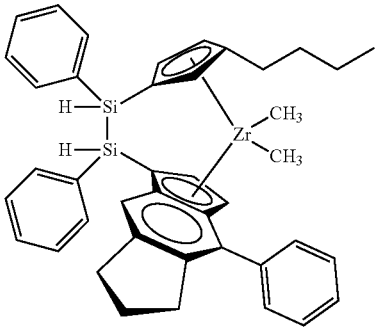 | 62 |
| 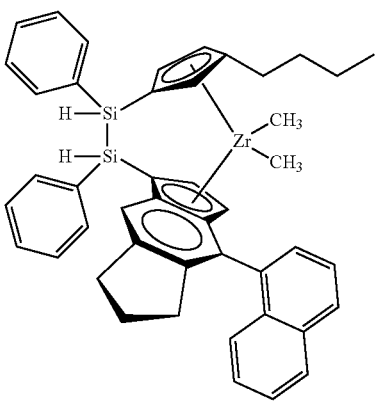 | 63 |
| 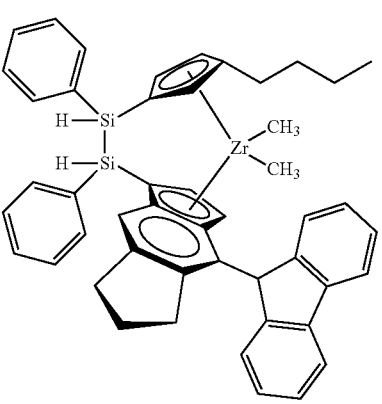 | 64 |
| 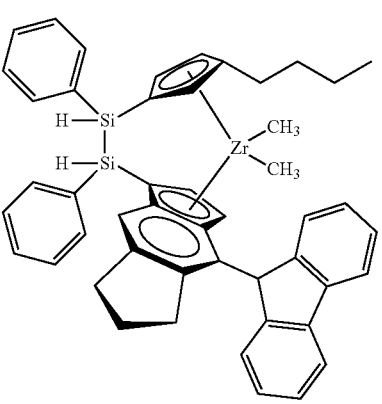 | 65 |

-continued
| Structure |
|---|
| 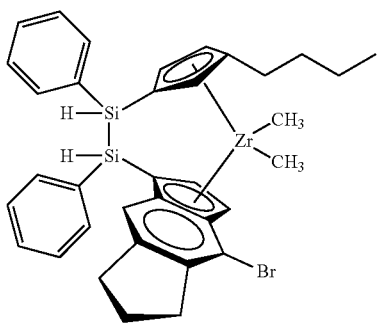 66 |
| 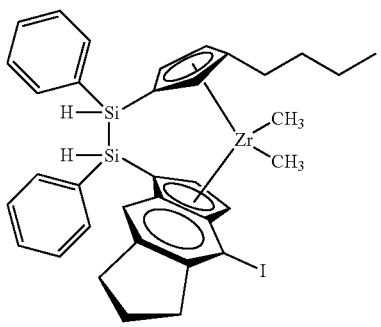 67 |
| 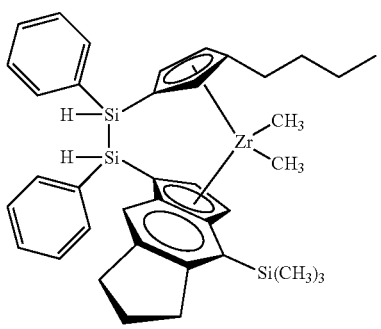 68 |
| 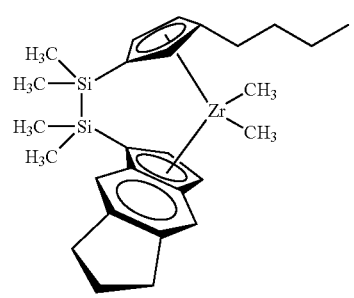 69 |
| 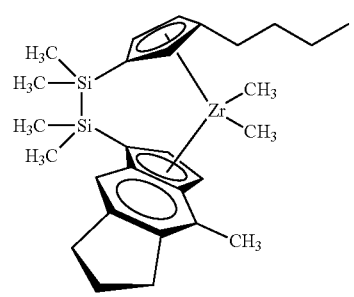 70 |
-continued
| Structure |
|---|
| 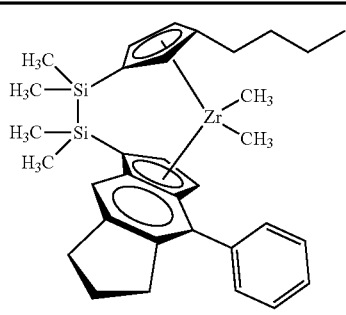 71 |
| 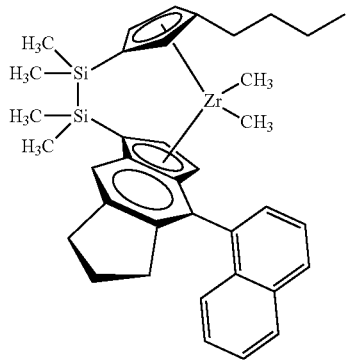 72 |
| 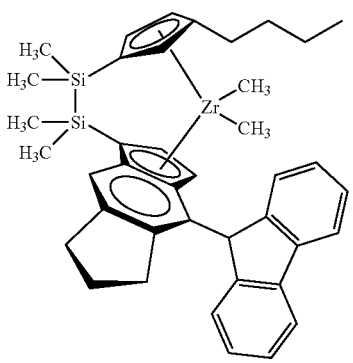 73 |
| 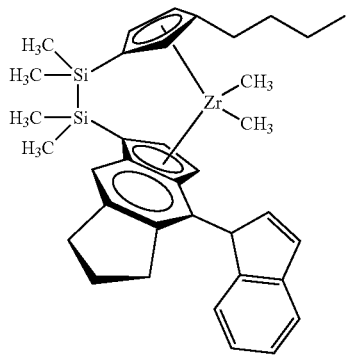 74 |

| | |
|---|---|
| 75 | 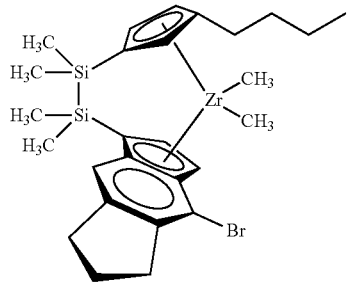 |
| 76 | 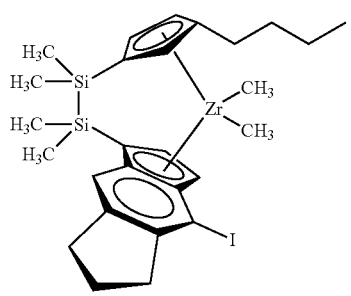 |
| 77 | 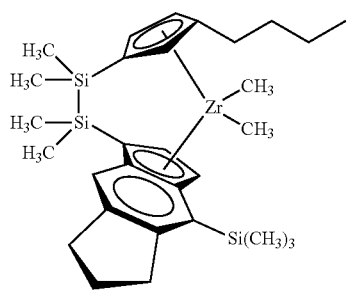 |
| 78 | 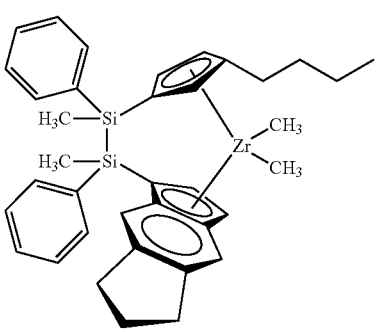 |
| 79 | 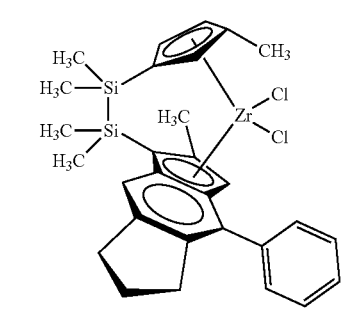 |
| 80 | 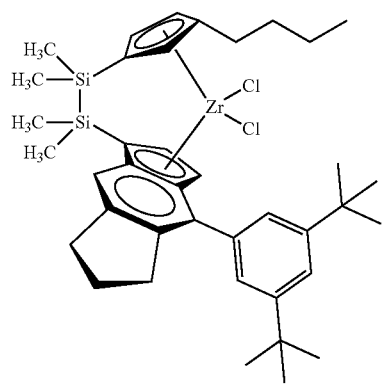 |
| 81 | 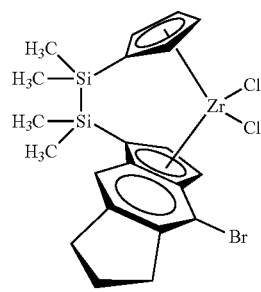 |
| 82 | 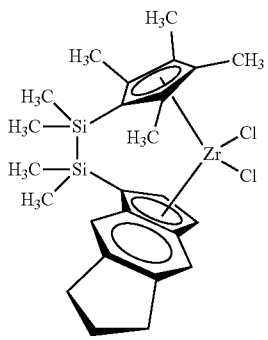 |
| 83 | 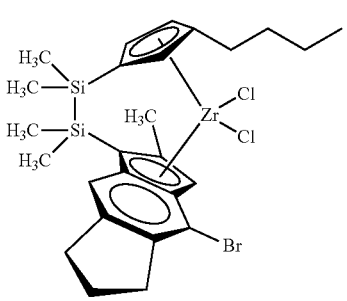 |
| 84 | 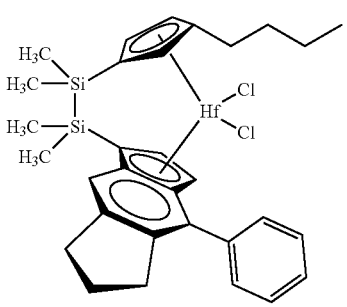 |

| Structure | |
|---|---|
| 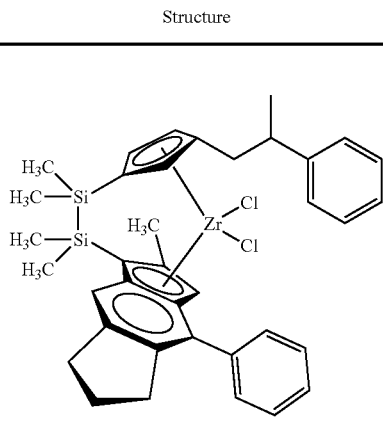 | 85 |
| 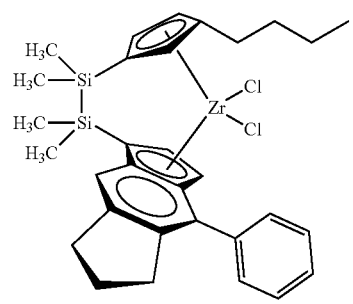 | 86 |
| 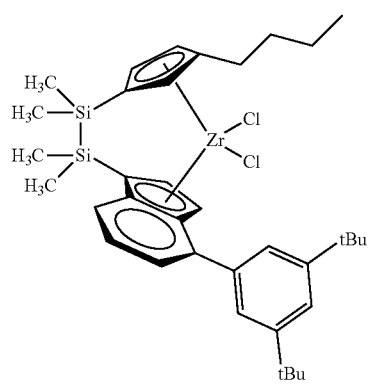 | 87 |
| 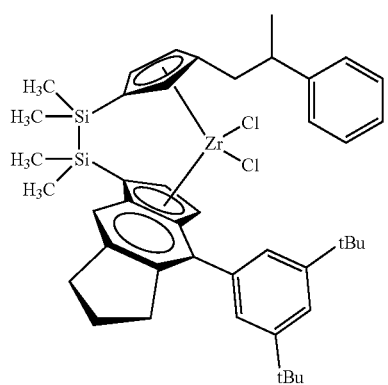 | 88 |
| Structure | |
|---|---|
| 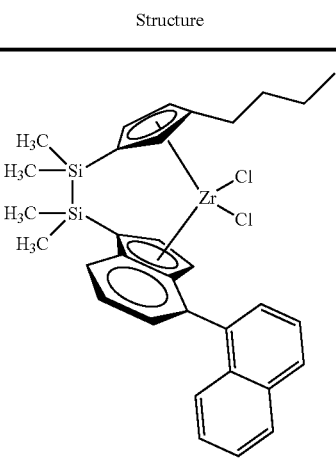 | 89 |
| 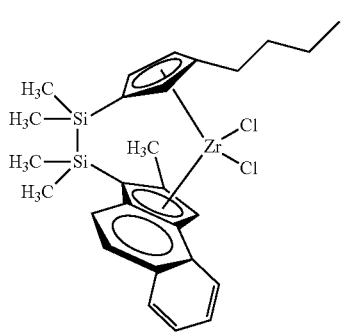 | 90 |
| 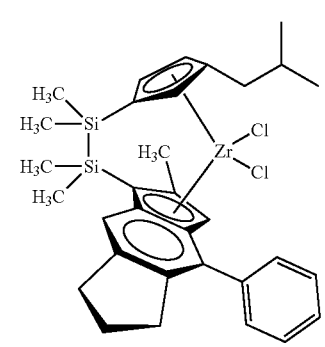 | 91 |
| 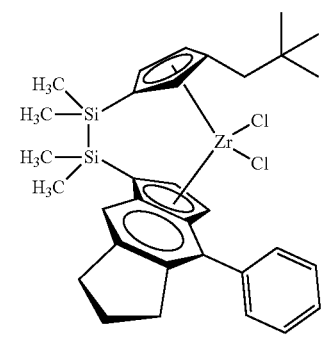 | 92 |

-continued
| Structure | |
|---|---|
| 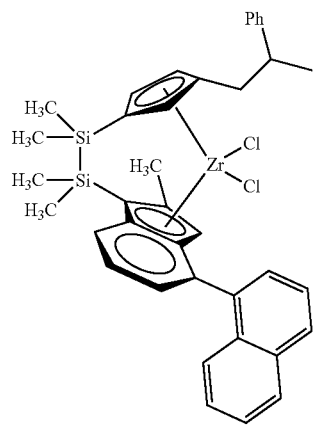 | 93 |
| 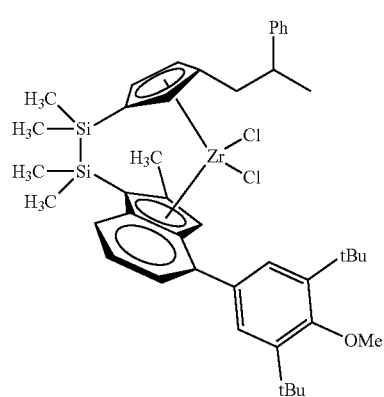 | 94 |
| 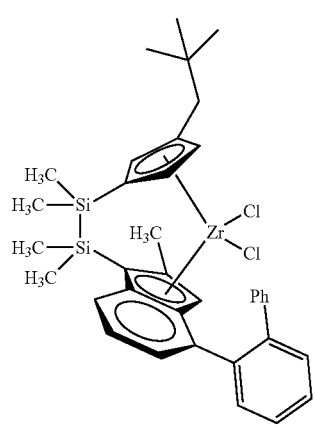 | 95 |
-continued
| Structure | |
|---|---|
| 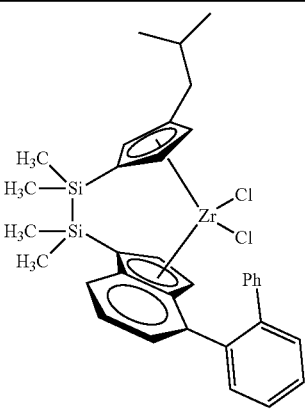 | 96 |
| 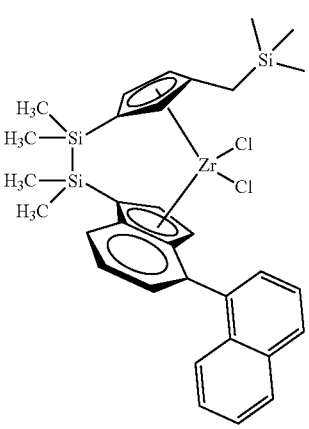 | 97 |
| 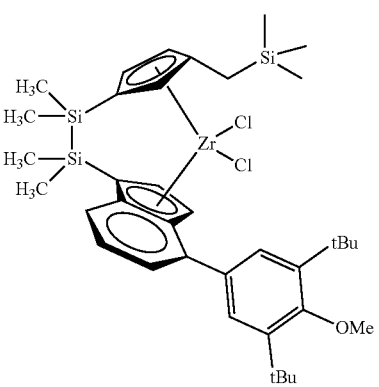 | 98 |
| 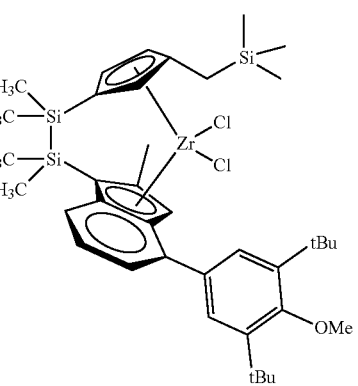 | 99 |

| Structure | |
|---|---|
| 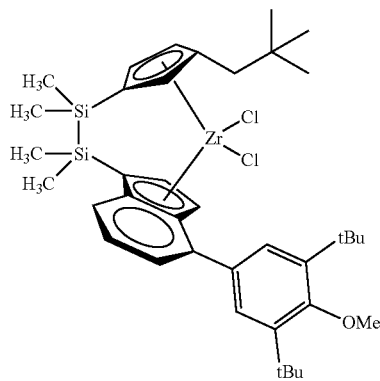 | 100 |
| 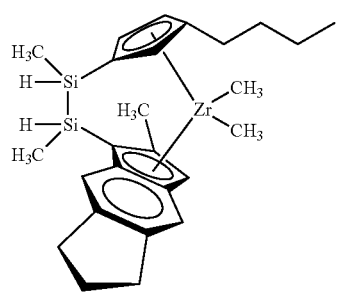 | 101 |
| 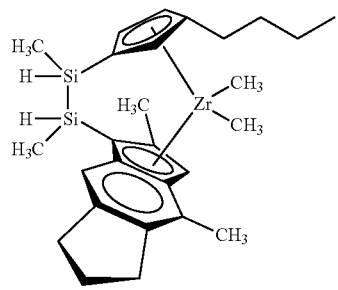 | 102 |
| 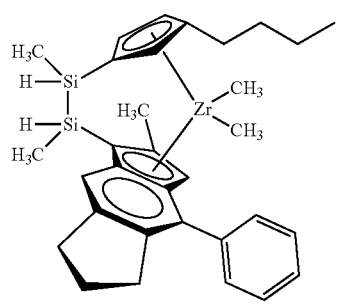 | 103 |
| 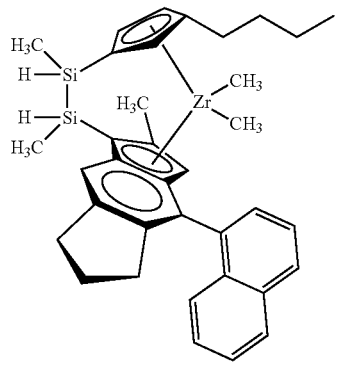 | 104 |
| 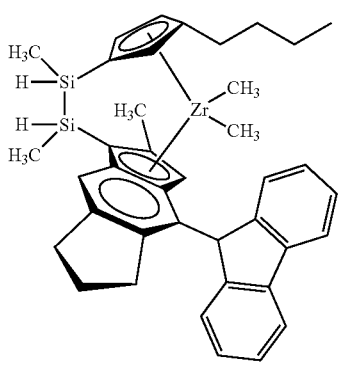 | 105 |
| 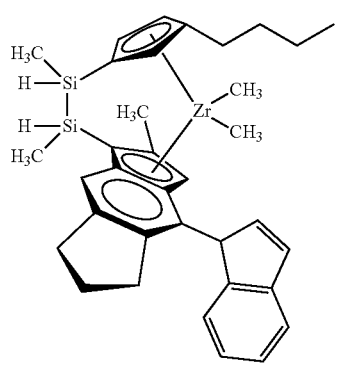 | 106 |
| 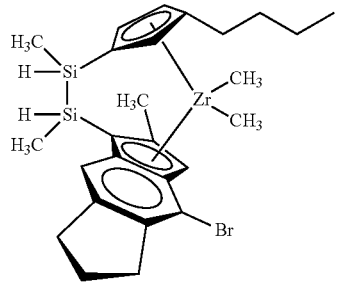 | 107 |

-continued
| Structure | |
|---|---|
| 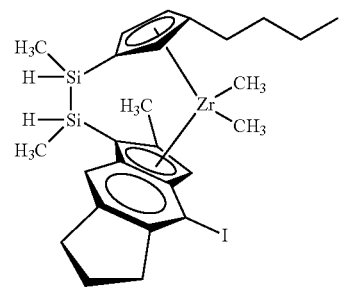 | 108 |
| 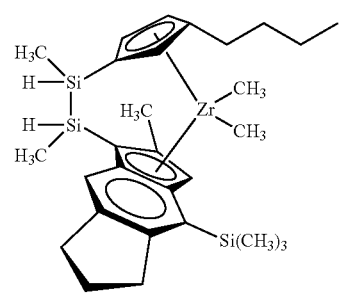 | 109 |
| 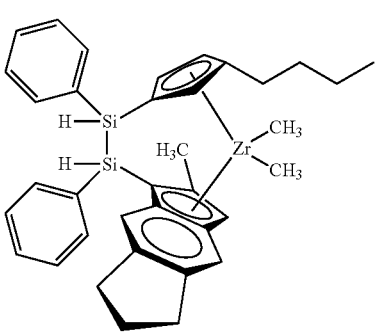 | 110 |
| 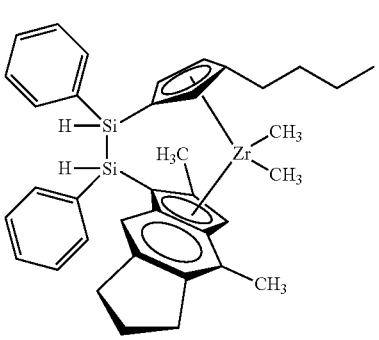 | 111 |
| 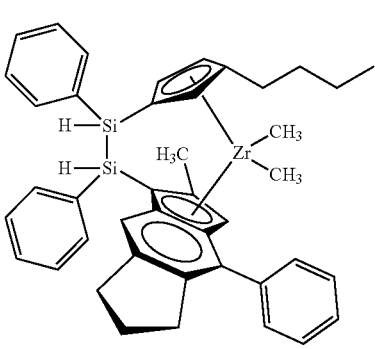 | 112 |
-continued
| Structure | |
|---|---|
| 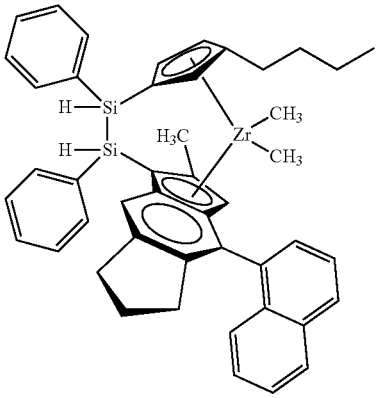 | 113 |
| 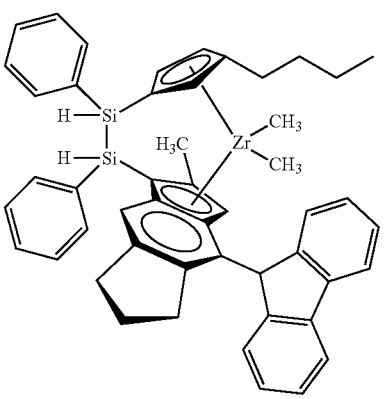 | 114 |
| 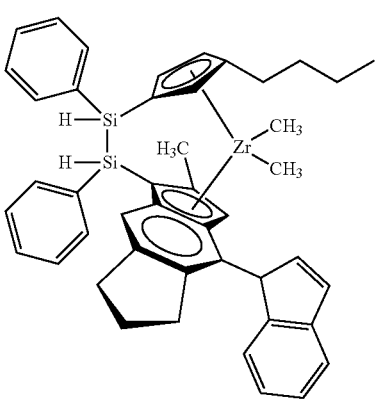 | 115 |
| 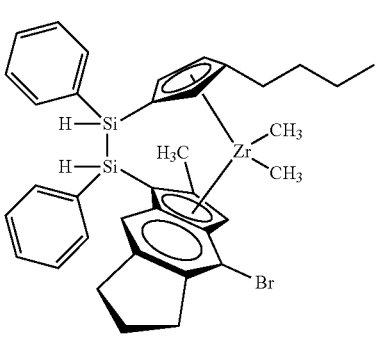 | 116 |

-continued
| Structure | |
|---|---|
| 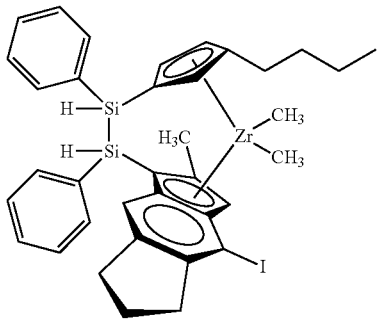 | 117 |
| 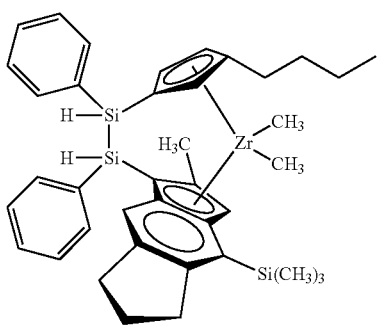 | 118 |
| 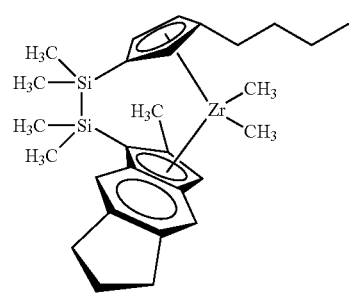 | 119 |
| 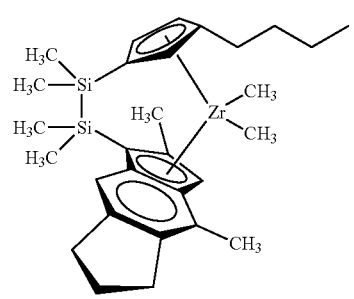 | 120 |
| 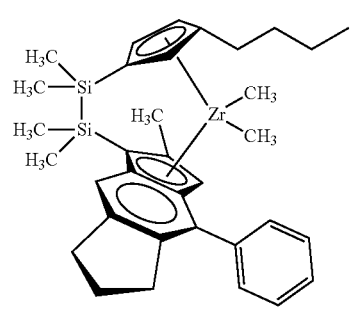 | 121 |
-continued
| Structure | |
|---|---|
| 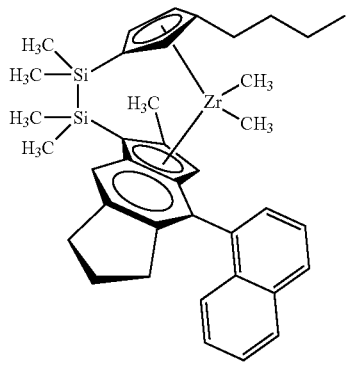 | 122 |
| 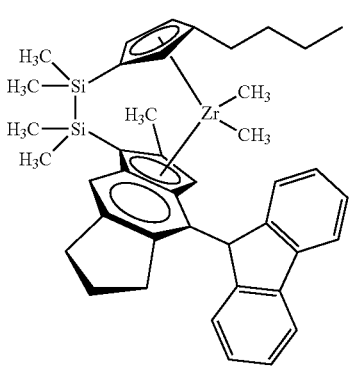 | 123 |
| 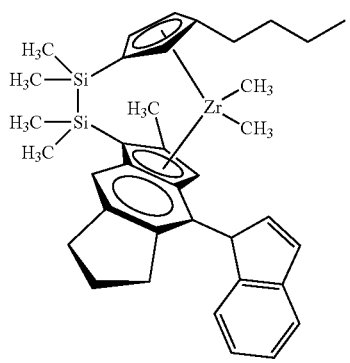 | 124 |
| 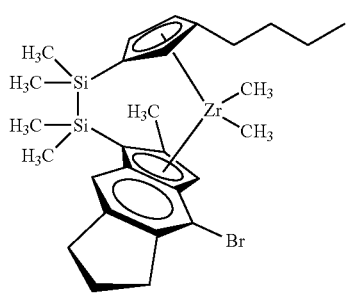 | 125 |

-continued
| Structure | |
|---|---|
| 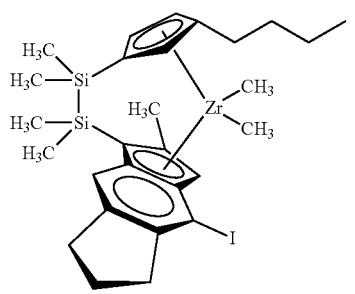 | 126 |
| 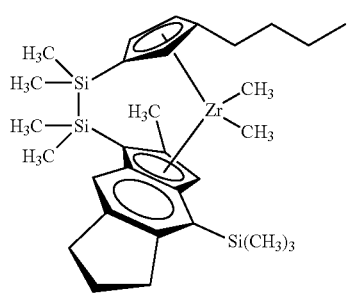 | 127 |
| 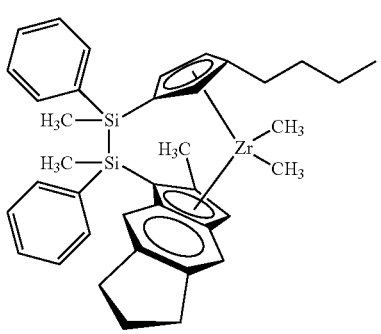 | 128 |
| 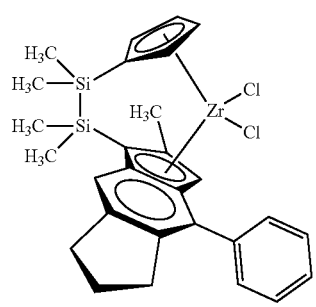 | 129 |
| 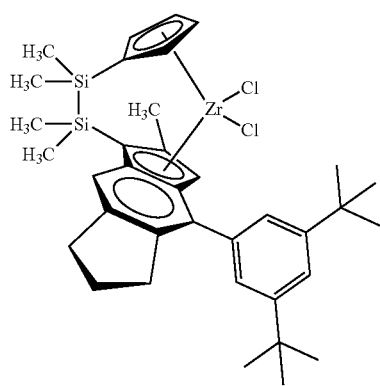 | 130 |
-continued
| Structure | |
|---|---|
| 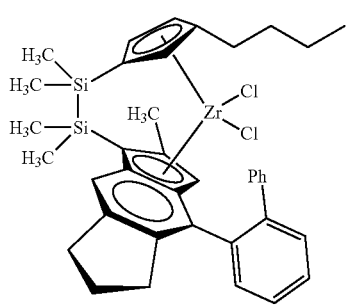 | 131 |
| 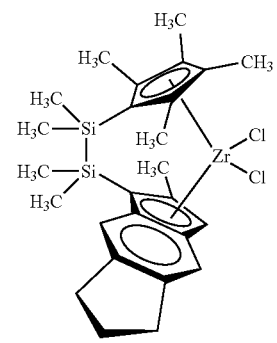 | 132 |
| 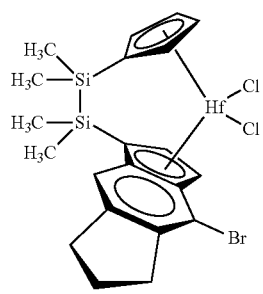 | 133 |
| 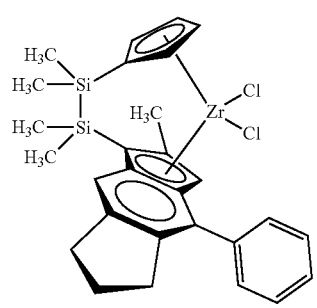 | 134 |
| 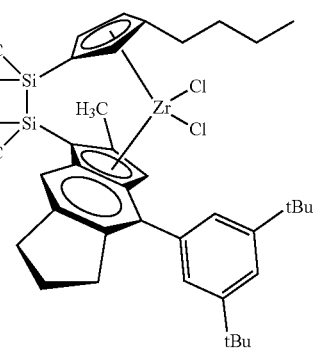 | 135 |

| Structure | |
|---|---|
| 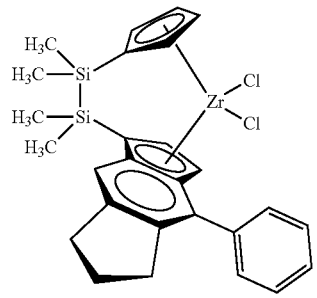 | 136 |
| 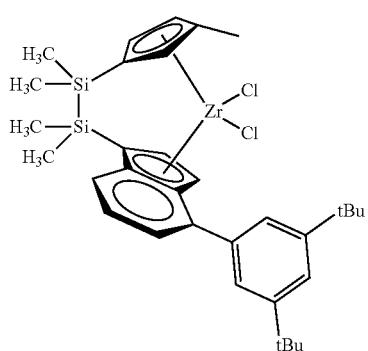 | 137 |
| 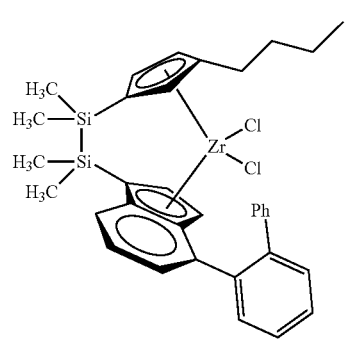 | 138 |
| 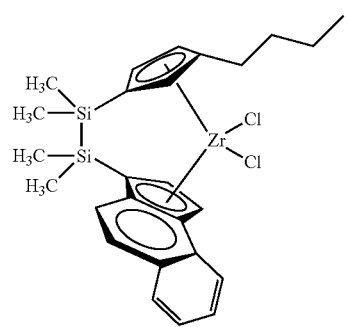 | 139 |
| Structure | |
|---|---|
| 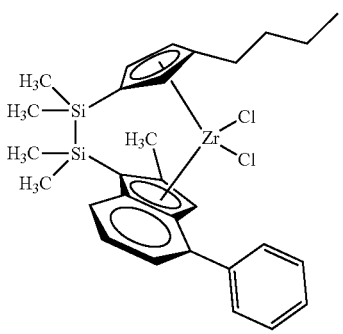 | 140 |
| 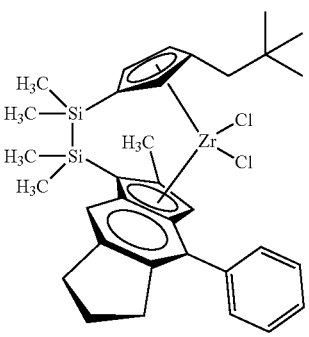 | 141 |
| 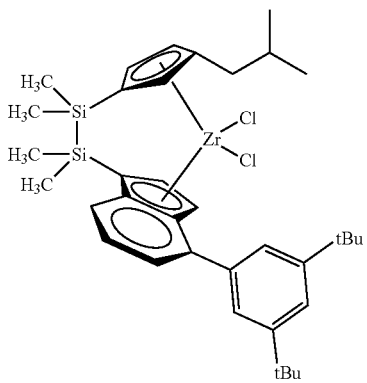 | 142 |
| 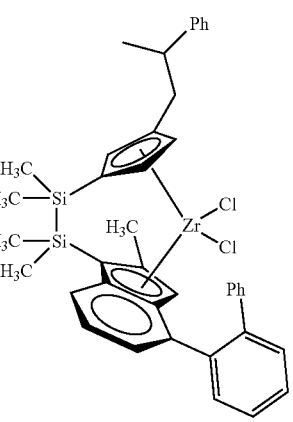 | 143 |

TABLE-continued
| Structure | |
|---|---|
| 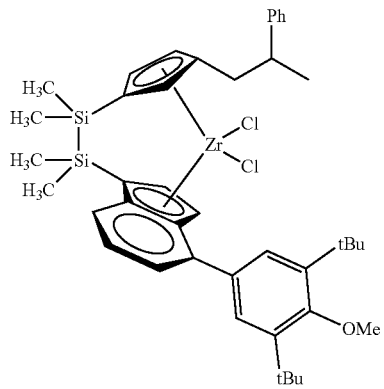 | 144 |
| 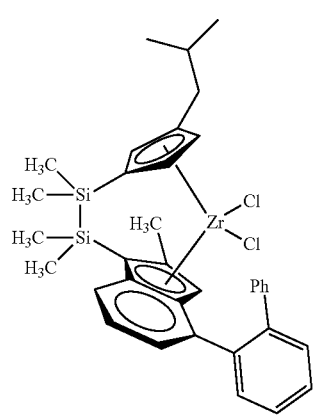 | 145 |
| 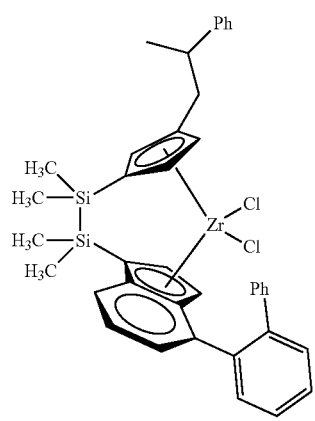 | 146 |
| 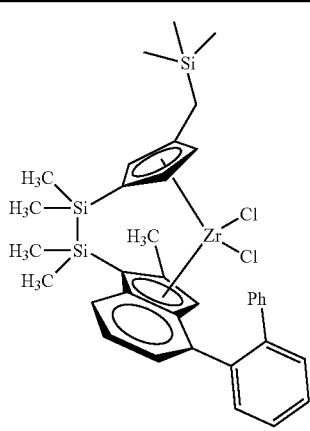 | 147 |
| 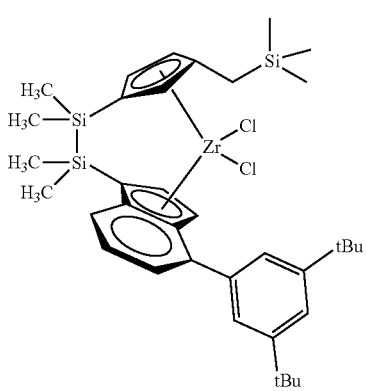 | 148 |
| 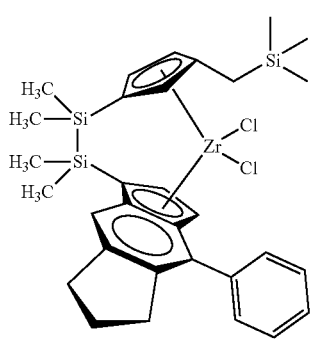 | 149 |
| 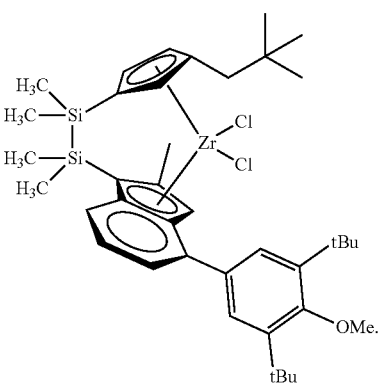 | 150 |

| Structure | |
|---|---|
| 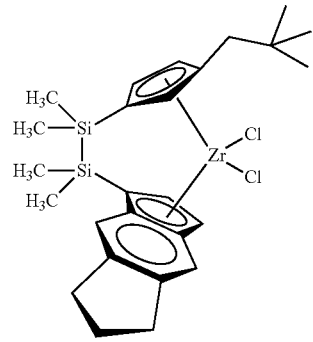 | 151 |
| 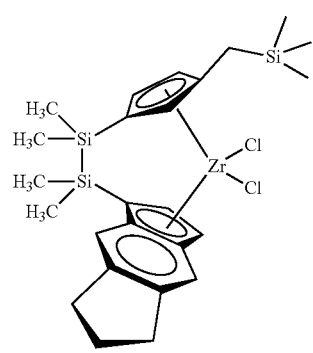 | 152 |
| 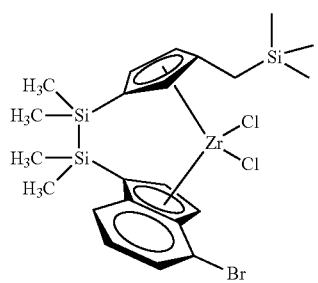 | 153 |
| 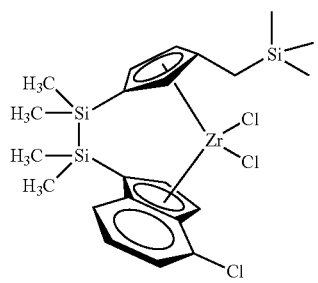 | 154 |
| 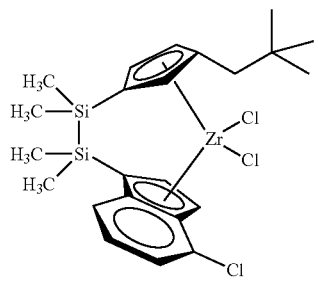 | 155 |
| Structure | |
|---|---|
| 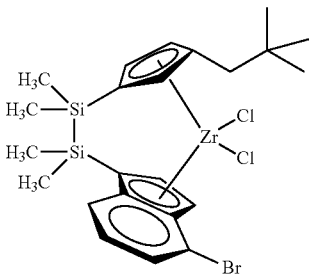 | 156 |
| 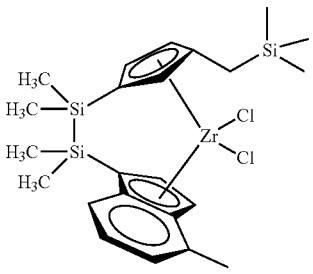 | 157 |
| 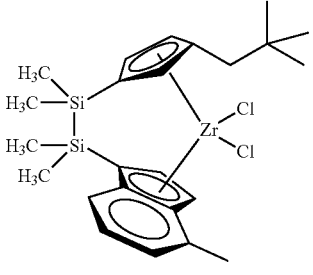 | 158 |
| 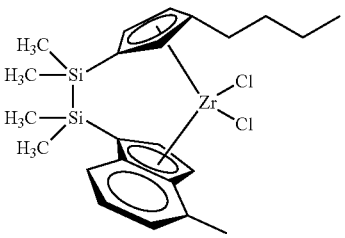 | 159 |
| 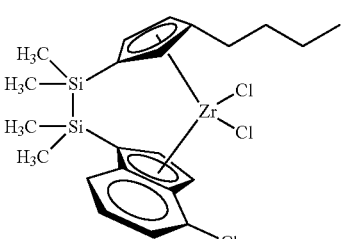 | 160 |

In another embodiment of the invention, the catalyst compound is represented by the formula:

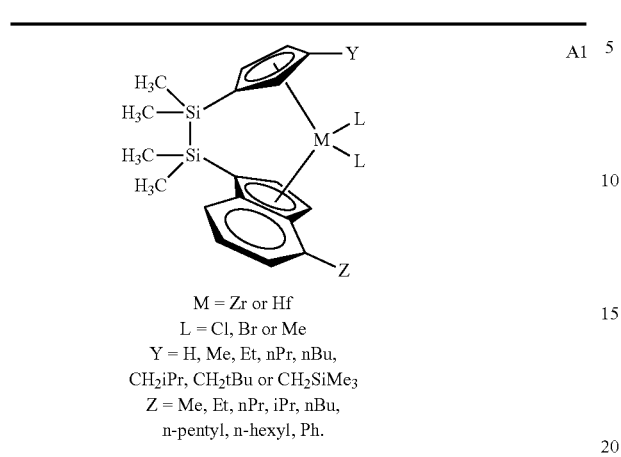

A1

M = Zr or Hf
L = Cl, Br or Me
Y = H, Me, Et, nPr, nBu,
CH₂iPr, CH₂tBu or CH₂SiMe₃
Z = Me, Et, nPr, iPr, nBu,
n-pentyl, n-hexyl, Ph.

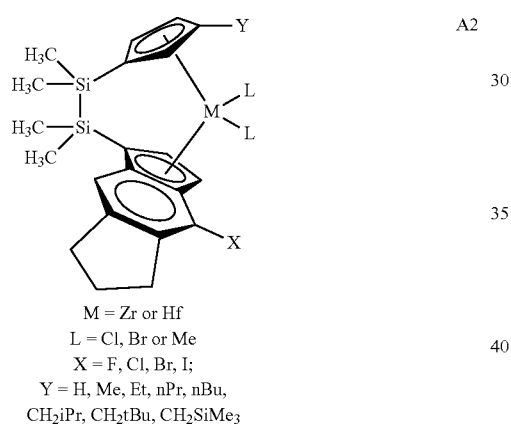

A2

M = Zr or Hf
L = Cl, Br or Me
X = F, Cl, Br, I;
Y = H, Me, Et, nPr, nBu,
CH₂iPr, CH₂tBu, CH₂SiMe₃

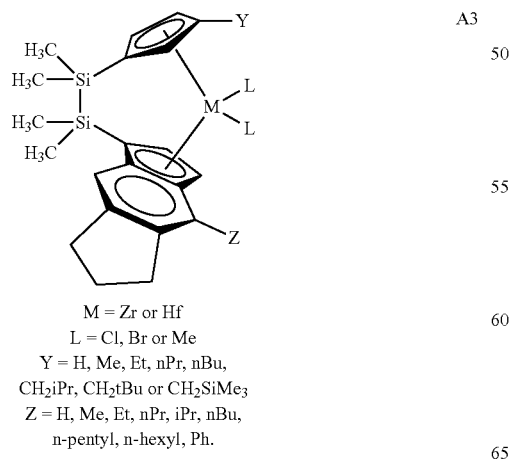

A3

M = Zr or Hf
L = Cl, Br or Me
Y = H, Me, Et, nPr, nBu,
CH₂iPr, CH₂tBu or CH₂SiMe₃
Z = H, Me, Et, nPr, iPr, nBu,
n-pentyl, n-hexyl, Ph.

-continued

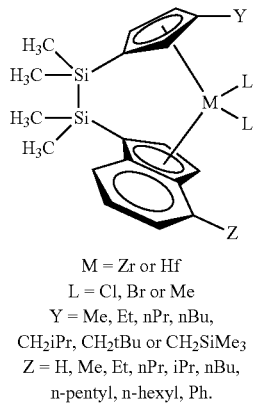

A4

M = Zr or Hf
L = Cl, Br or Me
Y = Me, Et, nPr, nBu,
CH₂iPr, CH₂tBu or CH₂SiMe₃
Z = H, Me, Et, nPr, iPr, nBu,
n-pentyl, n-hexyl, Ph.

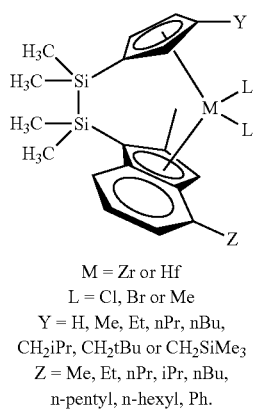

A5

M = Zr or Hf
L = Cl, Br or Me
Y = H, Me, Et, nPr, nBu,
CH₂iPr, CH₂tBu or CH₂SiMe₃
Z = Me, Et, nPr, iPr, nBu,
n-pentyl, n-hexyl, Ph.

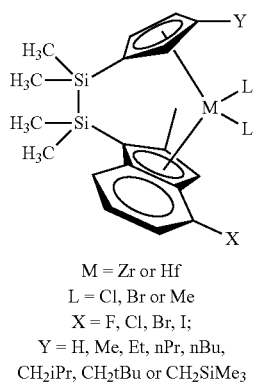

A6

M = Zr or Hf
L = Cl, Br or Me
X = F, Cl, Br, I;
Y = H, Me, Et, nPr, nBu,
CH₂iPr, CH₂tBu or CH₂SiMe₃

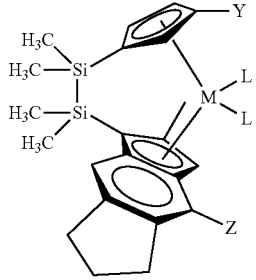

A7

M = Zr or Hf
L = Cl, Br or Me
Y = H, Me, Et, nPr, nBu,
CH₂iPr, CH₂tBu or CH₂SiMe₃
Z = H, Me, Et, nPr, iPr, nBu,
n-pentyl, n-hexyl, Ph.

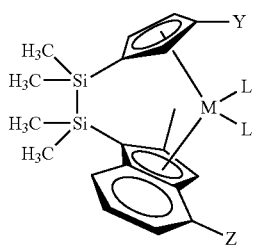

A8

M = Zr or Hf
L = Cl, Br or Me
Y = Me, Et, nPr, nBu,
CH₂iPr, CH₂tBu or CH₂SiMe₃
Z = H, Me, Et, nPr, iPr, nBu,
n-pentyl, n-hexyl, Ph.

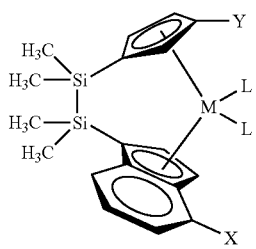

A9

M = Zr or Hf
L = Cl, Br or Me
X = F, Cl, Br, I;
Y = H, Me, Et, nPr, nBu,
Ch₂iPr, CH₂tBu, CH₂SiMe₃

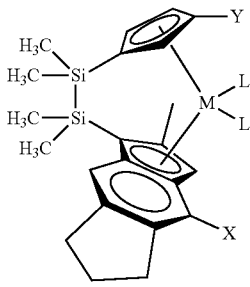

A10

M = Zr or Hf
L = Cl, Br or Me
X = F, Cl, Br, I;
Y = H, Me, Et, nPr, nBu,
CH₂iPr, CH₂tBu or CH₂SiMe₃

In a preferred embodiment, the catalyst compounds represented by the formulas above are rac, meso, or a mixture of isomers (such as diastereomers). In embodiments, the catalyst compound is a rac/meso mixture.

In embodiments the metallocene catalyst compound represented by formula (I) comprises at least two (such as two, three, four, five, six, seven, eight, etc.) or more isomers (such as diastereomers). In embodiments the metallocene catalyst compound represented by formula (I) comprises two isomers (such as diastereomers) where the ratio of the two isomers is from 1:100 to 100:1 or greater, preferably 10:1 to 1:10, more preferably 2.5:1 to 1:2.5, or preferably 1.5:1 to 1:1.5, preferably about 1: about 1, preferably 1:1.

In embodiments, the metallocene catalyst compound comprises rac and meso isomers, preferably at a ratio of from 1:100 to 100:1 or greater, preferably 1:1 to 50:1, preferably 10:1 to 1:10, more preferably 2.5:1 to 1:2.5, or preferably 1.5:1 to 1:1.5, preferably about 1: about 1, preferably 1:1.

Unless otherwise indicated, amounts of isomers are determined by proton NMR, as follows: $^1$H NMR data are collected at 23° C. in a 5 mm probe using a 400 MHz Bruker spectrometer with deuterated benzene or deuterated methylene chloride. Data is recorded using a maximum pulse width of 45°, 8 sec between pulses and signal averaging 16 transients. The spectrum is normalized to protonated benzene in the deuterated benzene, which is expected to show a peak at 7.16 ppm. The spectrum is normalized to protonated methylene chloride in the deuterated methylene chloride, which is expected to show at 5.32 ppm.

In at least one embodiment, one catalyst compound is used, e.g., the catalyst compounds are not different. As used herein, one metallocene catalyst compound is considered different from another if they differ by at least one atom. Catalyst compounds that differ only by isomer are considered the same for purposes as used herein.

Methods to Prepare the Catalyst Compounds

The following is a generic scheme to prepare the catalysts described herein and further exemplified in the examples. Generally, metallocenes of this type are synthesized as shown below where (i) is a deprotonation via a metal salt of alkyl anion (e.g., n-BuLi) to form a substituted indenide (Ind*Li); (ii) reaction of indenide with an appropriate bridging precursor (e.g., ClMe₂SiSiMe₂Cl); (iii) reaction of the Ind*Me₂SiSiMe₂Cl with another substituted (or unsubstituted) CpLi (iv) double deprotonation via an alkyl anion (e.g., n-BuLi) to form a dianion; (v) reaction of the dianion with a metal halide (e.g., ZrCl₄) to get the metal complex.

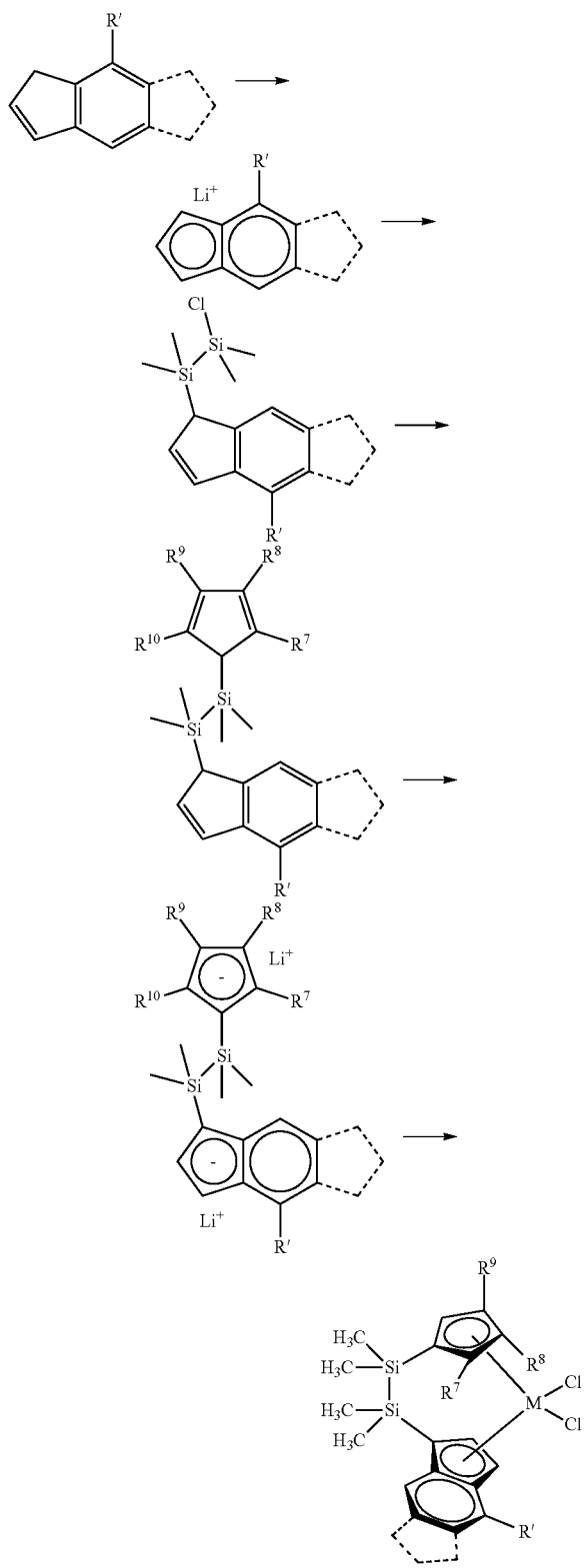

If two transition metal compounds are used, then the two transition metal compounds may be used in any ratio. Preferred molar ratios of a first compound (A) to a second compound (B) fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalysts chosen, the method of activation, and the end product desired. In a particular embodiment, when using the two catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

In alternate embodiments, two transition metal compounds (one represented by formula (I) above (A) and one and one not represented by formula (I), such as those compounds represented by formula X below (B) may be used in the polymerization. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact transition metal compounds chosen, the method of activation, and the end product desired. In a particular embodiment, when using the two transition metal compound, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Useful olefin polymerization catalysts include metallocene catalyst compounds represented by the formula (X):

$$T_y Cp_m M^6 G_n X^5_q \qquad (X),$$

wherein each Cp is, independently, a cyclopentadienyl group (such as cyclopentadiene, indene or fluorene) which may be substituted or unsubstituted, $M^6$ is a Group 4 transition metal, for example, titanium, zirconium, hafnium, G is a heteroatom group represented by the formula JR*z where J is N, P, O, or S and R* is a $C_1$ to $C_{20}$ hydrocarbyl group and z is 1 or 2, T is a bridging group, and y is 0 or 1, $X^5$ is a leaving group (such as a halide, a hydride, an alkyl group, an alkenyl group or an arylalkyl group), and m=1 or 2, n=0, 1, 2, or 3, q=0, 1, 2, or 3, and the sum of m+n+q is equal to the oxidation state of the transition metal. See, for example, WO 2016/094843. A substituted cyclopentadienyl group is a cyclopentadienyl group that has had a hydrogen replaced by a hydrocarbyl group, a heteroatom, or a heteroatom containing group; or has had a carbon atom in the ring structure replaced by a heteroatom. Methyl-indene is an example of a substituted cyclopentadienyl group.

In an embodiment, each Cp is a cyclopentadiene, indene or fluorene, which may be substituted or unsubstituted, and each $M^6$ is titanium, zirconium or hafnium, and each $X^5$ is, independently, a halide, a hydride, an alkyl group, an alkenyl group or an arylalkyl group. In any of the embodiments described herein, y may be 1, m may be one, n may be 1, J may be N, and R* may be methyl, ethyl, propyl, butyl, pentyl, hexyl, heptyl, octyl, nonyl, cyclooctyl, cyclododecyl, decyl, undecyl, dodecyl, adamantyl or an isomer thereof.

In embodiments, for bis Cp metallocenes, n=0 and m=2. In embodiments for mono Cp metallocenes, n=1 and m=1.

In a preferred embodiment of the invention, each Cp is, independently, an indenyl group which may be substituted or unsubstituted, preferably each Cp is independently substituted with a $C_1$ to $C_{40}$ hydrocarbyl group or an unsubstituted $C_1$ to $C_{40}$ hydrocarbyl group, preferably Cp is an indenyl group substituted with a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Preferably, T is present (e.g., y=1) and is a bridging group containing at least one Group 13, 14, 15, or 16 element, in particular boron or a Group 14, 15 or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR' CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, $Me_2SiOSiMe_2$, and cyclopentasilylene ($Si(CH_2)_4$).

In a preferred embodiment of the invention, $M^6$ is Zr.

In a preferred embodiment of the invention, G is an alkyl amido group, preferably t-butyl amido or do-decyl amido.

In a preferred embodiment of the invention, each $X^5$ is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two $X^5$'s may form a part of a fused ring or a ring system), preferably each $X^5$ is independently selected from halides, aryls and $C_1$ to $C_5$ alkyl groups, preferably each $X^5$ is a phenyl, methyl, ethyl, propyl, butyl, pentyl, bromo, or chloro group. Preferably, each $X^5$ is, independently, a halide, a hydride, an alkyl group, an alkenyl group or an arylalkyl group.

In an embodiment, each Cp is independently an indene, which may be substituted or unsubstituted, each $M^6$ is zirconium, and each $X^5$ is, independently, a halide, a hydride, an alkyl group, an alkenyl group or an arylalkyl group. In any of the embodiments described herein, y may be 1, m may be one, n may be 1, J may be N, and R* may be methyl, ethyl, propyl, butyl, pentyl, hexyl, heptyl, octyl, nonyl, cyclooctyl, cyclododecyl, decyl, undecyl, dodecyl, adamantyl or an isomer thereof.

Activators

The catalyst compositions may be combined with activators in any manner in the art including by supporting them for use in slurry or gas phase polymerization. Activators are generally compounds that can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst compositions described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In a class of embodiments, little or no (zero %) alumoxane is used in the polymerization processes described herein. Alternatively, the alumoxane is present at a molar ratio of aluminum to catalyst compound transition metal less than 500:1, preferably less than 300:1, preferably less than 100:1, and preferably less than 1:1.

In another class of embodiments, the at least one activator comprises aluminum and the aluminum to transition metal, for example, hafnium or zirconium, ratio is at least 150 to 1; the at least one activator comprises aluminum and the aluminum to transition metal, for example, hafnium or zirconium, ratio is at least 250 to 1; or the at least one activator comprises aluminum and the aluminum to transition metal, for example, hafnium or zirconium, ratio is at least 1,000 to 1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, trimethylammonium tetrakis(perfluorophenyl)borate; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Support Materials

The catalyst composition comprises at least one "support" or sometimes also referred to as a "carrier". The terms may be interchangeable unless otherwise distinguished. Suitable supports, include but are not limited to silica, alumina, silica-alumina, zirconia, titania, silica-alumina, cerium oxide, magnesium oxide, or combinations thereof. The catalyst may optionally comprise a support or be disposed on at least one support. Suitable supports, include but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the support may be silica-alumina, alumina and/or a zeolite, particularly alumina. Silica-alumina may be either naturally occurring or in the form of gelatinous precipitates or gels including mixtures of silica and metal oxides.

In class of embodiments, the at least one support may comprise an organosilica material. The organosilica material supports may be a polymer formed of at least one monomer. In certain embodiments, the organosilica material may be a polymer formed of multiple distinct monomers. Methods and materials for producing the organosilica materials as well as a characterization description may be found in, for example, WO 2016/094770 and WO 2016/094774.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$ Scavengers, Chain Transfer Agents and/or Co-Activators Scavengers, chain transfer agents, or co-activators may also be used. Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

Useful chain transfer agents that may also be used herein are typically a compound represented by the formula $AlR^{20}{}_3$, $ZnR^{20}{}_2$ (where each $R^{20}$ is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Polymerization Processes

In embodiments herein, the invention relates to polymerization processes where monomer (such as propylene and or ethylene), and optionally comonomer, are contacted with a catalyst system comprising at least one activator, at least one support and at least two catalyst compounds, such as the metallocene compounds described above. The support, catalyst compounds, and activator may be combined in any order, and are combined typically prior to contacting with the monomers.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof.

In an embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the present disclosure can be carried out in any manner known in the art. Any suspension, slurry, high pressure tubular or autoclave process, or gas phase polymerization process known in the art can be used under polymerizable conditions. Such processes can be run in a batch, semi-batch, or continuous mode. Heterogeneous polymerization processes (such as gas phase and slurry phase processes) are useful. A heterogeneous process is defined to be a process where the catalyst system is not soluble in the reaction media. Alternatively, in other embodiments, the polymerization process is not homogeneous.

A homogeneous polymerization process is defined to be a process where preferably at least 90 wt % of the product is soluble in the reaction media. Alternatively, the polymerization process is not a bulk process. In a class of embodiments, a bulk process is defined to be a process where monomer concentration in all feeds to the reactor is preferably 70 vol % or more. Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers and as described above. Typical pressures include pressures in the range of from about 0.35 MPa to about 10 MPa, preferably from about 0.45 MPa to about 6 MPa, or preferably from about 0.5 MPa to about 4 MPa in some embodiments.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a class of embodiments, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

In another embodiment of the invention, the polymerization is performed in the slurry phase. A slurry polymerization process generally operates between 1 to about 50 atmosphere pressure range (15 psi to 735 psi, 103 kPa to 5068 kPa) or even greater and temperatures as described above. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In a preferred embodiment, the catalyst system used in the polymerization comprises no more than two catalyst compounds. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Useful reactor types and/or processes for the production of polyolefin polymers include, but are not limited to, UNIPOL™ Gas Phase Reactors (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals)); BORSTAR™ Process and Reactors (slurry combined with gas phase); and Multi-Zone Circulating Reactors (MZCR) such as SPHERIZONE™ Reactors and Process available from Lyondell Basell.

Unless otherwise indicated, "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Catalyst productivity is typically measured for batch polymerizations. Unless otherwise indicated, "catalyst activity" is a measure of how active the catalyst is and is reported as the mass of product polymer (P) produced per mole of catalyst (cat) used (kgP/molcat) or as the mass of product polymer (P) produced per mass of catalyst (cat) used (gP/gcat). Catalyst activity is typically measured for continuous polymerizations. Unless otherwise indicated, "conversion" is the amount of monomer that is converted to polymer product, and is reported as mol % and is calculated based on the polymer yield and the amount of monomer fed into the reactor.

In embodiments herein, the catalyst activity of the polymerization reaction is at least 1,500 g/gcat, or at least 2,000 g/gcat, or at least 2,500 g/gcat, or at least 4,000 g/gcat, or at least 5,000 g/gcat, or at least 5,500 g/gcat, or at least 6,000 g/gcat, or at least 8,500 g/gcat, or at least 9,000 g/gcat, or at least 9,500 g/gcat, or at least 9,700 g/gcat.

In embodiments herein, the productivity of the catalyst compound is at least 1,500 g/gcat, or great, at least 2,000 g/gcat, or at least 2,500 g/gcat, or at least 4,000 g/gcat, or at least 5,000 g/gcat, or at least 5,500 g/gcat, or at least 6,000 g/gcat, or at least 8,500 g/gcat, or at least 9,000 g/gcat, or at least 9,500 g/gcat, or at least 9,700 g/gcat.

In a preferred embodiment, the polymerization:

1) is conducted at temperatures of 0 to 300° C. (preferably 25 to 150° C., preferably 40 to 120° C., preferably 45 to 80° C.);

2) is conducted at a pressure of atmospheric pressure to 10 MPa (preferably 0.35 to 10 MPa, preferably from 0.45 to 6 MPa, preferably from 0.5 to 4 MPa);

3) is conducted in an aliphatic hydrocarbon solvent (such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics (such as toluene) are preferably present in the solvent at less than 1 wt %, preferably less than 0.5 wt %, preferably at 0 wt % based upon the weight of the solvents);

4) wherein the catalyst system used in the polymerization preferably comprises a di-silyl bridged catalyst complex (such as those represented by formula (I), i.e., Me2Si—SiMe$_2$(n-BuCp)(4-Ph-Indacenyl)ZrCl$_2$, SiMe$_2$(n-BuCp)(4-Br-Ind)ZrCl$_2$, or SiMe$_2$(n-BuCp)(Indacenyl)ZrCl$_2$), a support such as silica, and an activator (such as methylalumoxane, N,N-dimethylanilinium tetrakis(pentafluorophenyl)borate, or N,N-dimethylanilinium tetrakis (perfluoronaphthyl)borate);

5) the polymerization preferably occurs in one reaction zone;

6) is preferably continuous;

7) the productivity of the catalyst compound is at least 1,500 g/gcat/hr or great, at least 2,000 g/gcat/hr, at least 2,500 g/gcat/hr, at least 4,000 g/gcat/hr or greater, at least 5,000 g/gcat/hr or greater, at least 5,500 g/gcat/hr or greater, at least 6,000 g/gcat/hr or greater, at least 8,500 g/gcat/hr or greater, at least 9,000 g/gcat/hr or greater, at least 9,500 g/gcat/hr or greater, or at least 9,700 g/gcat/hr or greater;

8) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 9) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

Polyolefin Products

In an embodiment, the process described herein produces polyethylene compositions including homopolymers and copolymers of one, two, three, four or more C$_2$ to C$_{40}$ olefin monomers, for example, C$_2$ to C$_{20}$ α-olefin monomers.

For example, the polyethylene compositions include copolymers of a C$_2$ to C$_{40}$ olefin and one, two or three or more different C$_2$ to C$_{40}$ olefins, (where the C$_2$ to C$_{40}$ olefins are preferably C$_3$ to C$_{20}$ olefins, preferably are C$_3$ to C$_{12}$ α-olefin, preferably are propylene, butene, hexene, octene, decene, dodecene, preferably propylene, butene, hexene, octene, or a mixture thereof).

The polyethylene composition may comprise from 99.9 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 0.1 to 35 wt %, about 1.0 to about 20.0 wt %, 1.0 to 15.0 wt %, 0.5 to 12.5 wt %, 1.0 to 10.0 wt %, 1.0 to 7.5 wt %, 1.0 to 5.0 wt %, or 1.0 to 3.0 wt % of polymer units derived from one or more C$_3$ to C$_{20}$ α-olefin comonomers, preferably C$_3$ to Cm α-olefins, and more preferably C$_4$ to C$_8$ α-olefins, such as hexene and octene. The α-olefin comonomer may be linear or branched, and two or more comonomers may be used, if desired.

Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, and mixtures thereof.

The polyethylene composition may have a melt index, I2.16, according to the test method listed below, of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28 g/10 min, or ≥about 0.30 g/10 min and, also, a melt index (I2.16)≤about 3.00 g/10 min, e.g., ≤about 2.00 g/10 min, ≤about 1.00 g/10 min, ≤about 0.70 g/10 min, ≤about 0.50 g/10 min, ≤about 0.40 g/10 min, or ≤about 0.30 g/10 min. Ranges expressly disclosed include, but are not limited to, ranges formed by combinations any of the above-enumerated values, e.g., about 0.10 to about 0.30, about 0.15 to about 0.25, about 0.18 to about 0.22 g/10 min, etc. The polyethylene composition may have a melt index, I2.16, according to the test method listed below, of about 0.1 g/10 min to about 30 g/10 min, such as about 20 g/10 min to about 30 g/10 min.

The polyethylene composition may have a high load melt index (HLMI) (I$_{21.6}$) in accordance with the test method listed below of from 1 to 60 g/10 min, 5 to 40 g/10 min, 5 to 50 g/10 min, 15 to 50 g/10 min, or 20 to 50 g/10 min.

The polyethylene composition may have a melt index ratio (MIR), from 12 to 90, or 14 to 55, or 15 to 45, or 15 to 35. MIR is defined as I$_{21.6}$/I$_{2.16}$.

The polyethylene composition may have a density of about 0.920 g/cm$^3$, or about 0.918 g/cm$^3$, or about 0.910 g/cm$^3$ or more, or about 0.919 g/cm$^3$ or more, or about 0.92 g/cm$^3$ or more, or about 0.930 g/cm$^3$ or more, or about 0.932 g/cm$^3$ or more. Additionally, the polyethylene composition may have a density of 0.945 g/cm$^3$ or less, or about 0.940 g/cm$^3$ or less, or about 0.937 g/cm$^3$ or less, or about 0.935 g/cm$^3$ or less, or about 0.933 g/cm$^3$ or less, or about 0.930 g/cm$^3$ or less. Ranges expressly disclosed include, but are not limited to, ranges formed by combinations any of the above-enumerated values, e.g., about 0.910 to about 0.945 g/cm$^3$, 0.915 to 0.940 g/cm$^3$, 0.920 to 0.935 g/cm$^3$, 0.925 to 0.930 g/cm$^3$, etc. Density is determined in accordance with the test method listed below.

The polyethylene composition may have a molecular weight distribution (MWD, defined as $M_w/M_n$) of about 2 to about 10, or about 2 to about 8, or about 2.5 to about 6, or about 2.5 to about 5.5, or 2.8 to 4).

The polyethylene composition may have an $M_w$ of 50,000 g/mol or more, alternately 75,000 to 500,000 g/mol, alternately 90,000 to 250,000 g/mol.

The polyethylene composition may have an $M_n$ of 10,000 g/mol or more, alternately 20,000 to 300,000 g/mol, alternately 25,000 to 200,000 g/mol.

The polyethylene composition may have an Mz of 50,000 g/mol or more, alternately 150,000 to 500,000 g/mol, alternately 175,000 to 500,000 g/mol, alternately 150,000 to 400,000 g/mol.

The polyethylene composition may have an $Mw_1/Mw_2$ of 1.5 or less, or 1.4 or less, or 1.3 or less or 1.2 or less, alternately from 0.3 to 1.5, alternately from 0.5 to 1.3, alternately from 0.6 to 1.2.

The polyethylene composition may have an Tw (TREF) of 60° C. or more, alternately 65 to 100° C., alternately 70 to 85° C.

The polyethylene composition may have an $Tw_1$-$Tw_2$ of 50° C. or less, alternately 40° C. or less, alternately 30° C. or less, such as from −100 to 50° C., or −75 to 30° C.

The polyethylene composition may have an RCI,m of 85 kg/mol or less, or 50 kg/mol or less, or 40 kg/mol or less, or 35 kg/mol or less, such as from −90 to 85 kg/mol, or from −80 to 50 kg/mol.

The polyethylene composition may have a g'(vis) of 0.90 or greater (such as 0.93 or greater, such as 0.94 or greater, such as 0.995 or greater, or 0.95 or greater).

In a class of embodiments, the invention provides for a polyethylene composition comprising at least 65 wt % ethylene derived units and from 0.1 to 35 wt % (or 1 to 30 wt %, or 5 to 25 wt %) of $C_3$-$C_{12}$ olefin comonomer derived units (such as propylene, butene, pentene, hexene, heptene, octene, nonene, decene, undecene, or dodecene), based upon the total weight of the polyethylene composition; wherein the polyethylene composition has:
 a) an RCI,m of less than 85 kg/mol;
 b) a $Tw_1$-$Tw_2$ value of from −15 to −40° C.; and
 c) an $Mw_1/Mw_2$ value of less than 1.5, such as 0.6 to 1.2;
 d) a density of from 0.890 g/cm³ to 0.940 g/cm³;
 e) a melt index (MI) of from 0.1 g/10 min to 30 g/10 min;
 f) a melt index ratio (I21/I2) of from 12 to 90 (such as 14 to 55, or 15 to 45, or 15 to 35);
 g) an $M_w/M_n$ of from 2 to 10 (such as 2 to 8, or 2.5 to 6, or 2.5 to 5, or 2.8 to 4);
 h) an $M_z/M_w$ of from 1.5 to 5.0 (such as 1.8 to 5.0, or 2.0 to 5.0);
 i) an $M_z/M_n$ of from 3 to 50 (such as 3.5 to 30, 3.8 to 20, or 4.0 to 16); and
 j) a g'(vis) of 0.90 or greater (such as 0.94 or greater or 0.95 or greater).

In a class of embodiments, the polyethylene composition comprises at least 65 wt % ethylene derived units and from 0.1 to 35 wt % (or 1 to 30 wt %, or 5 to 25 wt %) of $C_3$-$C_{12}$ olefin comonomer derived units (such as propylene, butene, pentene, hexene, heptene, octene, nonene, decene, undecene, or dodecene), based upon the total weight of the polyethylene composition; wherein the polyethylene composition has:
 a) an RCI,m of less than 85 kg/mol, or 50 kg/mol or less, or 40 kg/mol or less, or 35 kg/mol or less;
 b) a $Tw_1$-$Tw_2$ value of from −15 to −40° C., or from −20 to −35° C.; and
 c) an $Mw_1/Mw_2$ value of less than 1.5, or less than 1.4, or less than 1.3 or less than 1.2 or from 0.1 to 1.5, or 0.3 to 1.3, or 0.6 to 1.2;
 and one, two three, four, five, six, or seven of the following:
 d) a density of from 0.890 g/cm³ to 0.940 g/cm³, such as 0.910 to 0.914 g/g/cm³;
 e) a melt index (MI) of from 0.1 to 30 g/10 min, or from 0.5 to 20 g/10 min, or 0.5 to 10 g/10 min, or from 0.5 to 6 g/10 min, or from 0.75 to 4 g/10 min;
 f) a melt index ratio (I21/I2) of from 12 to 90 (such as 14 to 55, or 15 to 45, or 15 to 35);
 g) an $M_w/M_n$ of from 2 to 10 (such as 2 to 8, or 2.5 to 6, or 2.5 to 5, or 2.8 to 4);
 h) an $M_z/M_w$ of from 1.5 to 5.0 (such as 1.8 to 5.0, or 2.0 to 5.0, or 2.2 to 4.0 or 2.2 to 3.0);
 i) an $M_z/M_n$ of from 3 to 50 (such as 3.5 to 30, 3.8 to 20, or 4.0 to 16); and
 j) a g'(vis) of 0.900 or greater, alternatively, 0.930 or greater, alternatively, 0.940 or greater, alternatively 0.994 or greater, alternatively 0.95 or greater.

This invention also relates to polyethylene compositions comprising at least 65 wt % ethylene derived units and from 1 to 35 wt % of $C_3$-$C_{12}$ olefin comonomer derived units (such as propylene, butene, pentene, hexene, heptene, octene, nonene, decene, undecene, or dodecene), based upon the total weight of the polyethylene composition; wherein the polyethylene composition has:
 a) an RCI,m of 40 kg/mol or less;
 b) a $Tw_1$-$Tw_2$ value of from −15 to −40° C.; and
 c) an $Mw_1/Mw_2$ value of less than 1.2;
 and one, two three, four, five, six, or seven of the following:
 d) a density of from 0.910 to 0.940 g/cm³;
 e) a melt index (MI) of from 0.1 to 30 g/10 min;
 f) a melt index ratio (I21/I2) of from 12 to 90;
 g) an $M_w/M_n$ of from 2 to 10;
 h) an $M_z/M_w$ of from 2.0 to 5.0;
 i) an $M_z/M_n$ of from 3 to 50; and
 j) a g'(vis) of 0.900 or greater.

This invention also relates to polyethylene compositions comprising at least 65 wt % ethylene derived units and from 1 to 35 wt % of $C_3$-$C_{12}$ olefin comonomer derived units (such as propylene, butene, pentene, hexene, heptene, octene, nonene, decene, undecene, or dodecene), based upon the total weight of the polyethylene composition; wherein the polyethylene composition has:
 a) an RCI,m of 40 kg/mol or less;
 b) a $Tw_1$-$Tw_2$ value of from −15 to −40° C.; and
 c) an $Mw_1/Mw_2$ value of less than 1.2;
 e) a melt index (MI) of from 0.1 g/10 min to 5 g/10 min;
 f) a melt index ratio ($I_{21}/I_2$) of from 12 to 30;
 g) an $M_w/M_n$ of from 2 to 6;
 h) an $M_z/M_w$ of from 1.8 to 4.0; and
 i) an $M_z/M_n$ of from 3.5 to 16.

In any of the embodiments described herein, the polyethylene composition may be a multimodal polyethylene composition such as a bimodal polyethylene composition. As used herein, "multimodal" means that there are at least two distinguishable peaks in a molecular weight distribution curve (as determined using gel permeation chromatography (GPC) or other recognized analytical technique) of a polyethylene composition. For example, if there are two distinguishable peaks in the molecular weight distribution curve such composition may be referred to as bimodal composition. Typically, if there is only one peak (e.g., monomodal), no obvious valley between the peaks, either one of the peaks is not considered as a distinguishable peak, or both peaks are not considered as distinguishable peaks, then such a composition may be referred to as non-bimodal. For example, in U.S. Pat. Nos. 8,846,841 and 8,691,715, FIGS. 1-5 illustrate representative bimodal molecular weight distribution curves. In these figures, there is a valley between the peaks, and the peaks can be separated or deconvoluted. Often, a bimodal molecular weight distribution is characterized as having an identifiable high molecular weight component (or distribution) and an identifiable low molecular weight component (or distribution). In contrast, in U.S. Pat. Nos. 8,846,841 and 8,691,715, FIGS. 6-11 illustrate representative non-bimodal molecular weight distribution curves. These include unimodal molecular weight distributions as well as distribution curves containing two peaks that cannot be easily distinguished, separated, or deconvoluted.

In any of the embodiments described herein, the polyethylene composition may have a total unsaturation/1000 carbon atoms of 1.0 or less, as measured by $^1$H NMR (see below for the test method), alternately 0.8 or less, alternately 0.6 or less, alternately 0.4 or less, alternately 0.3 or less.

Blends

In another embodiment, the polymer (preferably the polyethylene or polypropylene) or polyethylene composition produced herein is combined with one or more additional polymers in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

Useful additional polymers include other polyethylenes, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

End Uses

Any of the foregoing polymers and compositions in combination with optional additives (see, for example, US Patent Application Publication No. 2016/0060430, paragraphs [0082]-[0093] may be used in a variety of end-use applications. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

Films

Films include monolayer or multilayer films. Films include those film structures and film applications known to those skilled in the art. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any conventional technique known to those skilled in the art, such as for example, techniques utilized to prepare blown, extruded, and/or cast stretch and/or shrink films (including shrink-on-shrink applications).

In one embodiment, multilayer films or multiple-layer films may be formed by methods well known in the art. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

To facilitate discussion of different film structures, the following notation is used herein. Each layer of a film is denoted "A" or "B". Where a film includes more than one A layer or more than one B layer, one or more prime symbols (', ", "', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

The thickness of each layer of the film, and of the overall film, is not particularly limited, but is determined according to the desired properties of the film. Typical film layers have a thickness of from about 1 to about 1000 μm, more typically from about 5 to about 100 μm, and typical films have an overall thickness of from about 10 to about 100 μm.

In some embodiments, and using the nomenclature described above, the present invention provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B"'; (d) five-layer films, such as A/A'/A"/A"'/B, A/A'/A"/B/A"', A/A'/B/A"/A"', A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/N, B/A/A'/B'/B", B/A/B'/A'/B", B/A/B'/B"/N, A/B/B'/B"/B"', B/A/B'/B"/B"', B/B'/A/B"/B"', and B/B'/B"/B"'/B"'; and similar structures for films having six, seven, eight, nine, twenty-four, forty-eight, sixty-four, one hundred, or any other number of layers. It should be appreciated that films having still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and other materials capable of accepting a coating.

The films can further be embossed, or produced or processed according to other known film processes. The films can be tailored to specific applications by adjusting the thickness, materials and order of the various layers, as well as the additives in or modifiers applied to each layer.

This invention also relates to films, preferably prepared from the polyethylene composition above, having:
 a) a heat seal initiation temperature of X ° C. or less at 5 N of force, where X=0.0015×Y(psi)+62.6 (where Y is the average 1% Secant modulus ((MD+TD)/2)) of the film (or X=0.0015×Y(psi)+59.5 (where Y is the average 1% Secant modulus ((MD+TD)/2), or X=0.0015× Y(psi)+57.6 (where Y is the average 1% Secant modulus ((MD+TD)/2), or X=0.0015×Y(psi)+56.3 (where Y is the average 1% Secant modulus ((MD+TD)/2));
 b) a dart drop impact of 300 g/mil or more, or 400 g/mil or more;
 c) an MD Elmendorf tear of 230 g or more, or 250 g or more, or 300 g/mil or more;
 d) average 1% Secant modulus ((MD+TD)/2) of 20,000 psi or more, or 21,000 psi or more, or 23,000 psi or more.

Preferably the films produced herein have a heat seal initiation temperature of X° C. or less at 5 N of force, where X=0.0015×Y(psi)+59.5 (where Y is the average 1% Secant modulus ((MD+TD)/2), or X=0.0015×Y(psi)+56.3 (where Y is the average 1% Secant modulus ((MD+TD)/2)).

Preferably the films produced herein have a heat seal initiation temperature of X° C. or less at 5 N of force, where X=0.0015×Y(psi)+56.3 (where Y is the average 1% Secant modulus ((MD+TD)/2)).

Preferably, the films produced herein have a 1% Secant modulus (MD) of greater than 15,000 psi, or 20,000 psi or more, or between 21,000 psi and 40,000 psi.

Preferably, the films produced herein have a 1% Secant modulus (TD) of greater than 20,000 psi, or 22,000 psi or more, or between 21,000 psi and 40,000 psi.

Preferably, the articles (preferably films) produced herein have an average 1% Secant MD/TD modulus of greater than 20,000 psi, or 21,000 psi or more, or 23,000 psi or more, preferably between 21,000 psi and 40,000 psi (average 1% Secant modulus=(MD+TD)/2).

Preferably, the articles (preferably films) produced herein have a dart drop impact resistance of 300 g/mil or greater, preferably 400 g/mil or greater.

Preferably, the films produced herein have an Elmendorf tear resistance of 230 g/mil or greater in the machine direction (MD), preferably 250 g/mil or more, preferably 300 g/mil or more.

Preferably, the films produced herein have an Elmendorf tear resistance of 500 g/mil or greater in the transverse direction (TD), preferably 550 g/mil or more.

Preferably, the ethylene polymers produced herein have an MIR of 15 to 55, and a film produced therefrom has an Elmendorf tear resistance of 230 g/mil (or at least 250 g/mil or greater) in the machine direction (MD), and/or a dart drop impact resistance of at least 300 g/mil or greater (or at least 400 g/mil or greater, or at least 500 g/mil or greater).

Preferably, the films produced herein have a Puncture Peak Force of 8 lbs/mil or greater, such as 9 lbs/mil or greater, such as 10 lbs/mil or greater.

Preferably, the films produced herein have a Puncture Break Energy of 30 in-lbs/mil or greater, such as 32 in-lbs/mil or greater, such as 34 in-lbs/mil or greater.

Additionally, the films preferably have a seal initiation temperature so that it is suitable for packaging applications, such as food packaging. The desired seal initiation temperature ("SIT") may depend on the end use application of the film, for example, for chocolate bars the SIT may be the temperature at which the seal strength is 200 g/inch (80 g/cm), for potato chips in the United States the desired SIT may be the temperature at which the seal strength is 500 g/inch (20 g/cm), and for potato chips in Asia the SIT may be the temperature at which the seal strength is 1000 g/inch (400 g/cm). The SIT may also depend on the type of seal used, for example, a fin seal as compared to a crimp seal. The films described herein preferably have a SIT of 105° C. or less, more preferably 95° C. or less, more preferably 90° C. or less, or even more preferably 85° C. or less at 5 N force.

The polyethylene composition may have a tensile yield strength (MD) of 900 psi or more, alternately 1,000 to 1,600 psi, alternately 1,050 to 1,500 psi.

The polyethylene composition may have a tensile yield strength (TD) of 900 psi or more, alternately 1,000 to 1,800 psi, alternately 1,050 to 1,700 psi.

The polyethylene composition may have a tensile strain (MD) of 350% or more, alternately 400 to 700%, alternately 440 to 600%.

The polyethylene composition may have a tensile strain (TD) of 500% or more, alternately 550 to 850%, alternately 600 to 800%.

The polyethylene composition may have an Elmendorf Tear (MD) of 200 g or more, alternately 215 to 500 g, alternately 230 to 450 g.

The polyethylene composition may have an Elmendorf Tear (TD) of 500 g or more, alternately 550 to 800 g, alternately 650 to 750 g.

The polyethylene composition may have a dart drop of 280 g or more, alternately 280 to 900 g, alternately 300 to 800 g.

The polyethylene composition may have a seal initiation temperature at 1N force of 100° C. or less, alternately 96° C. or less, alternately 94° C. or less.

The polyethylene composition may have a seal initiation temperature at 5N force of 105° C. or less, alternately 100° C. or less, alternately 98° C. or less.

The polyethylene composition may have a maximum seal force a of 8 N or more, alternately 9 N or more, alternately 10 N or more.

The polyethylene composition may have a hot tack initiation temperature at 1N force of 100° C. or less, alternately 96° C. or less, alternately 94° C. or less.

The polyethylene composition may have a hot tack initiation temperature at 5N force of 110° C. or less, alternately 108° C. or less, alternately 106° C. or less.

The polyethylene composition may have a maximum hot tack force a of 5 N or more, alternately 7 N or more, alternately 8 N or more.

Stretch Films

The polymers and compositions as described above may be utilized to prepare stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

The polymers and compositions as described above may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films are commonly used for bundling articles on pallets. Typical industrial shrink films are formed in a single bubble blown extrusion process to a thickness of about 80 to 200 µm, and provide shrinkage in two directions, typically at a machine direction (MD) to transverse direction (TD) ratio of about 60:40.

Retail films are commonly used for packaging and/or bundling articles for consumer use, such as, for example, in supermarket goods. Such films are typically formed in a single bubble blown extrusion process to a thickness of about 35 to 80, µm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

The polymers and compositions as described above may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Bags include those bag structures and bag applications known to those skilled in the art. Exemplary bags include shipping sacks, trash bags and liners, industrial liners, produce bags, and heavy duty bags.

Packaging

Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

The polymers and compositions described above may also be used in blow molding processes and applications. Such processes are well known in the art, and involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

The polymers and compositions described above may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

The polymers and compositions described above may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls.

Extrusion coating materials are typically used in food and non-food packaging, pharmaceutical packaging, and manufacturing of goods for the construction (insulation elements) and photographic industries (paper).

Foamed Articles

The polymers and compositions described above may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising the polymers and compositions described above. Such devices include, for example, electronic cables, computer and computer-related equipment, marine cables, power cables, telecommunications cables or data transmission cables, and combined power/telecommunications cables.

Electrical devices described herein can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

This invention also relates to:

1. A polyethylene composition comprising at least 65 wt % ethylene derived units and from 0.1 to 35 wt % of $C_3$-$C_{12}$ olefin comonomer derived units, based upon the total weight of the polyethylene composition; wherein the polyethylene composition has:
    a) an RCI,m of less than 85 kg/mol;
    b) a $Tw_1$-$Tw_2$ value of from −15 to −40° C.; and
    c) an $Mw_1/Mw_2$ value of less than 1.5;
    and one or more of the following:
    d) a density of from 0.890 to 0.940 g/cm$^3$;
    e) a melt index (MI) of from 0.1 to 30 g/10 min;
    f) a melt index ratio (121/12) of from 12 to 90;
    g) an $M_w/M_n$ of from 2 to 10;
    h) an $M_z/M_w$ of from 1.5 to 5.0;
    i) an $M_z/M_n$ of from 3 to 50; and
    j) a g'(vis) of 0.90 or greater.

2. The polyethylene composition of paragraph 1, wherein the $C_3$-$C_{12}$ olefin comonomer derived units are $C_4$-$C_8$ α-olefin comonomer derived units.

3. The polyethylene composition of any one of the preceding paragraphs, wherein the polyethylene composition comprises from 0.5 to 20 wt % of ethylene, propylene, butene, pentene, hexene, heptene, octene, nonene, decene, undecene, and dodecene comonomer derived units, based upon the total weight of the polyethylene composition.

4. The polyethylene composition of any one of the preceding paragraphs, wherein the polyethylene composition comprises from 1 to 10 wt % of $C_4$-$C_8$ α-olefin comonomer derived units, based upon the total weight of the polyethylene composition.

5. The polyethylene composition of any one of the preceding paragraphs, wherein the polyethylene composition has a $Tw_1$-$Tw_2$ value of from −20 to −35° C.

6. The polyethylene composition of any one of the preceding paragraphs, wherein the polyethylene composition has a $Tw_1$-$Tw_2$ value of from −23 to −35° C.

7. The polyethylene composition of any one of the preceding paragraphs, wherein the polyethylene composition has an $Mw_1/Mw_2$ value of from 0.3 to 1.3.

8. The polyethylene composition of any one of the preceding paragraphs, wherein the polyethylene composition has an $Mw_1/Mw_2$ value of from 0.6 to 1.2.

9. The polyethylene composition of any one of the preceding paragraphs, wherein the polyethylene composition has a melt index (MI) of from 0.1 g/10 min to 6 g/10 min.

10. The polyethylene composition of any one of the preceding paragraphs, wherein the polyethylene composition has a melt index ratio ($I_{21}/I_2$) of from 15 to 45.

11. The polyethylene composition of any one of the preceding paragraphs, wherein the polyethylene composition has a high load melt index ($I_{21}$) of from 5 to 60 g/10 min.

12. The polyethylene composition of any one of the preceding paragraphs, wherein the polyethylene composition has an $M_w/M_n$ of from 2 to 8.

13. The polyethylene composition of any of paragraphs 1 to 4, wherein the polyethylene composition has:
    a) an RCI,m of less than 40 kg/mol;
    b) a $Tw_1$-$Tw_2$ value of from −20 to −40° C.; and
    c) an $Mw_1/Mw_2$ value of less than 1.3;
    d) a density of from 0.910 to 0.940 g/cm$^3$;
    e) a melt index (MI) of from 0.1 to 10 g/10 min;
    f) a melt index ratio ($I_{21}/I_2$) of from 15 to 35;
    g) an $M_w/M_n$ of from 2 to 8;
    h) an $M_z/M_w$ of from 1.8 to 5.0;
    i) an $M_z/M_n$ of from 4.0 to 16; and
    j) a g'(vis) of 0.95 or greater.

14. The polyethylene composition of any one of the preceding paragraphs, wherein the polyethylene composition has a density of from 0.900 g/cm$^3$ to 0.930 g/cm$^3$.

15. The polyethylene composition of any one of the preceding paragraphs, wherein the polyethylene composition an RCI,m of 40 or less.

16. The polyethylene composition of any one of the preceding paragraphs, wherein the polyethylene composition has, as measured by $^1$H NM, a total unsaturations/1000 C if 1.0 or less (alternately 0.8 or less, alternately 0.6 or less, alternately 0.4 or less, alternately 0.3 or less).

17. An article made from the polyethylene composition of any one of paragraphs 1-16, wherein the article is optionally a blown film or cast film.

18. A film made from the polyethylene composition of any one of paragraphs 1-16, wherein the film has a heat seal initiation temperature of X° C. or less at 5 N of force, where X=0.0015×Y(psi)+62.6 (where Y is the average 1% Secant modulus ((MD+TD)/2)) of the film.

19. The article of paragraph 17 or paragraph 18, wherein the film exhibits an average MD/TD modulus of between 20,000 psi and 40,000 psi.

20. The article of any one of paragraphs 17-19, wherein the film has a dart drop impact resistance of 300 g/mil or greater.

21. The article of any one of paragraphs 17-19, wherein the film has a dart drop impact resistance of 350 g/mil or greater.
22. The article of any one of paragraphs 17-21, wherein the film has an Elmendorf tear resistance of 250 g/mil or greater in the machine direction (MD).
23. The article of any one of paragraphs 17-21, wherein the film has an Elmendorf tear resistance of 300 g/mil or greater in the machine direction (MD).
24. The article of any one of paragraphs 17-23, wherein the film has:
   a) a heat seal initiation temperature of X° C. or less at 5 N of force, where X=0.0015×Y(psi)+62.6 (where Y is the average 1% Secant modulus ((MD+TD)/2)) of the film;
   b) a dart drop impact of 300 g/mil or more;
   c) an MD Elmendorf tear of 230 g or more; and
   d) average 1% Secant modulus ((MD+TD)/2) of 20,000 psi or more.
25. The article of any one of paragraphs 17-24, wherein the polymer composition has an MIR of 15 to 55, and, wherein the film has an Elmendorf tear resistance of 230 g/mil or more in the machine direction (MD), and/or a dart drop impact resistance of at least 300 g/mil or more.
26 A process to make the article of any one of paragraphs 17-25 comprising forming the polyethylene composition into film.
27. A process to make the polyethylene composition of any of paragraphs 1 to 16 comprising contacting ethylene and optional comonomer with a catalyst system comprising support, activator, and a catalyst compound represented by formula (I):

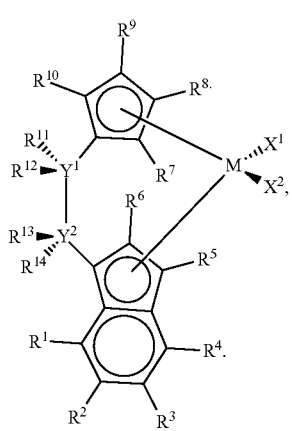

wherein:
M is a group 4 metal;
$Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si;
$X^1$ and $X^2$ are independently hydrogen, halide, hydroxyl, or $C_1$-$C_{50}$ substituted or unsubstituted hydrocarbyl, amide, alkoxide, sulfide, phosphide, halide, or a combination thereof, or $X^1$ and $X^2$ are joined together to form a metallocycle ring, or $X^1$ and $X^2$ are joined to form a chelating ligand, or an alkylidene;
each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I).
28. The process of paragraph 27, wherein the polyethylene composition comprises at least 65 wt % ethylene derived units and from 0.1 to 35 wt % of $C_3$-$C_{12}$ olefin comonomer derived units, based upon the total weight of the polyethylene composition; and the polyethylene composition has:
   a) an RCI,m of less than 85 kg/mol;
   b) a $Tw_1$-$Tw_2$ value of from −15 to −40° C.; and
   c) an $Mw_1/Mw_2$ value of less than 1.5;
   and one or more of the following:
   d) a density of from 0.890 to 0.940 g/cm$^3$;
   e) a melt index (MI) of from 0.1 to 30 g/10 min;
   f) a melt index ratio (I21/I2) of from 12 to 90;
   g) an $M_w/M_n$ of from 2 to 10;
   h) an $M_z/M_w$ of from 1.8 to 5.0;
   i) an $M_z/M_n$ of from 3 to 50; and
   j) a g'(vis) of 0.90 or greater.
29. The process of paragraph 27 or 28 wherein the polyethylene composition is formed into a film and the film has:
   a) a heat seal initiation temperature of X° C. or less at 5 N of force, where X=0.0015×Y(psi)+62.6 (where Y is the average 1% Secant modulus ((MD+TD)/2)) of the film;
   b) a dart drop impact of 300 g/mil or more;
   c) an MD Elmendorf tear of 230 g or more; and
   d) average 1% Secant modulus ((MD+TD)/2) of 20,000 psi or more.
30. The process of any of paragraphs 27 to 29 wherein the catalyst compound represented by formula (I) comprises at least two isomers.

31. The process of any of paragraphs 27 to 29 wherein the catalyst compound represented by formula (I) comprises at rac and meso isomers.

Test Methods $^1$H NMR $^1$H NMR data of polymers are recorded in a 5 mm probe on a 500 MHz-Bruker NMR spectrometer at 120° C. using a d$_2$-1,1,2,2-tetrachloroethane solution. Samples are prepared with a concentration of 30 mg polymer per mL solvent at 140° C. Unless stated otherwise, data is recorded using a 30° flip angle RF pulse, 512 transients, with a delay of 5 seconds between pulses. Vinylenes are measured as the number of vinylenes per 1000 carbon atoms using the resonances between 5.55-5.31 ppm. Trisubstituted end-groups ("trisubs") are measured as the number of trisubstituted groups per 1000 carbon atoms using the resonances between 5.30-5.11 ppm. Vinyl end-groups are measured as the number of vinyls per 1000 carbon atoms using the resonances between 5.13-4.98 ppm. Vinylidene end-groups are measured as the number of vinylidenes per 1000 carbon atoms using the resonances between 4.88-4.69 ppm. Methyl branches/1000 carbons are calculated as follows: aliphatic region is between 0-2 ppm and methyl region is between 0.85-1.05 ppm. Methyl groups/1000 carbons=(CH$_3$ region/3*1000)/(aliphatic region/2).

TREF Method

Unless otherwise indicated, the TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2857 cm$^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

GPC 4D Procedure: Molecular Weight, Comonomer Composition and Long Chain Branching Determination by GPC-IR Hyphenated with Multiple Detectors The distribution and the moments of molecular weight ($M_w$, $M_n$, $M_w/M_n$, etc.), the comonomer content ($C_2$, $C_3$, $C_6$, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C.

The polymer sample is weighed and sealed in a standard vial with 80 µL flow marker (Heptane) added to it. After loading the vial in the autosampler, polymer is automatically dissolved in the instrument with 8 ml added TCB solvent. The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. *Macromolecules* 2001, 34, 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1-0.0087*w2b+0.000018*(w2b)^2) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, and a is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1000 total carbons (CH$_3$/1000 TC) as a function of molecular weight. The short-chain branch (SCB) content per 1000 TC (SCB/1000 TC) is then computed as a function of molecular weight by applying a chain-end correction to the CH$_3$/1000 TC function, assuming each chain to be linear and terminated by a methyl group at each end. The wt % comonomer is then obtained from the following expression in which f is 0.3, 0.4, 0.6, 0.8, and so on for C3, C4, C6, C8, and so on co-monomers, respectively:

$w2=f*SCB/1000TC.$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk IR ratio} = \frac{\text{Area of CH}_3 \text{ signal within integration limits}}{\text{Area of CH}_2 \text{ signal within integration limits}}.$$

Then the same calibration of the CH$_3$ and CH$_2$ signal ratio, as mentioned previously in obtaining the CH$_3$/1000 TC as a function of molecular weight, is applied to obtain the bulk CH3/1000 TC. A bulk methyl chain ends per 1000 TC (bulk CH$_3$end/1000 TC) is obtained by weight-averaging the chain-end correction over the molecular-weight range. Then w2b=f*bulk CH3/1000TC bulk SCB/1000TC=bulk CH3/1000TC−bulk CH3end/1000TC and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, A2 is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where NA is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and A2=0.0015; for analyzing ethylene-butene copolymers, dn/dc=0.1048*(1-0.00126*w2) ml/mg and A2=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the equation $[\eta]=\eta s/c$, where c is concentration and is determined from the IR5 broadband channel output. The viscosity MW at each point is calculated as $M=K_{PS} M^{\alpha_{PS}+1}/[\eta]$, where $\alpha_{ps}$ is 0.67 and $K_{ps}$ is 0.000175.

The branching index (g'vis) is calculated using the output of the GPC-IR5-LS-VIS method as follows. The average intrinsic viscosity, $[\eta]$avg, of the sample is calculated by:

$$[\eta]_{avg} = \frac{\Sigma c_i [\eta]_i}{\Sigma c_i},$$

where the summations are over the chromatographic slices, i, between the integration limits. The branching index g'vis is defined as $$g'_{vis} = \frac{[\eta]_{avg}}{K M_v^\alpha},$$

where Mv is the viscosity-average molecular weight based on molecular weights determined by LS analysis and the K and $\alpha$ are for the reference linear polymer, which are, for purposes of this invention and claims thereto, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1-0.0087*w2b+0.000018*(w2b)-2) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, and a is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer C$_3$, C$_4$, C$_6$, C$_8$, etc.), as a function of molecular weight, where x2 is obtained from the following expression in which n is the number of carbon atoms in the comonomer (3 for C$_3$, 4 for C$_4$, 6 for C$_6$, etc.):

$$x2 = -\frac{200 \, w2}{-100 \, n - 2 \, w2 + nw2}.$$

Then the molecular-weight distribution, W(z) where z=log$_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $1=\int_{-\infty}^{\infty} W' dz,$ and a modified weight-average molecular weight (M$_w$') is calculated over the effectively reduced range of molecular weights as follows:

$M_w' = \int_{-\infty}^{\infty} 10^z * W' dz.$

The RCI,m is then computed as $RCI,m = \int_{-\infty}^{\infty} x2 (10^z - M_w') W' dz.$ A reversed-co-monomer index (RCI,w) is also defined on the basis of the weight fraction co-monomer signal (w2/100) and is computed as follows:

$$RCI, w = \int_{-\infty}^{\infty} \frac{w2}{100}(100^2 - M'_w)W'dz.$$

In the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw+Mn}{2}\right)},$$

$$CDR\text{-}3, w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw+Mn}{2}\right)},$$

$$CDR\text{-}3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

Cross-Fractionation Chromatography (CFC)

Cross-fractionation chromatography (CFC) analysis was done using a CFC-2 instrument from Polymer Char, S.A., Valencia, Spain. The principles of CFC analysis and a general description of the particular apparatus used are given in the article by Ortin, A.; Monrabal, B.; Sancho-Tello, 257 J. MACROMOL. SYMP. 13 (2007). A general schematic of the apparatus used is shown in FIG. 1 of this article. Pertinent details of the analysis method and features of the apparatus used are as follows.

The solvent used for preparing the sample solution and for elution was 1,2-dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 µm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography*; Springer, 1999. For polystyrene K=1.38×10$^{-4}$ dl/g and α=0.7; and for polyethylene K=5.05×10' dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

Measuring Tw1, Tw2, Mw1 and Mw2 from CFC

A new technique has been developed for determining both MWD and short chain branching distribution compositional information, using cryogenic cross fractionation (cryo CFC), to compare the experimental polymers to competitive products on the market. The procedures for the determination of CFC data are discussed in more detail below.

Figure 5:
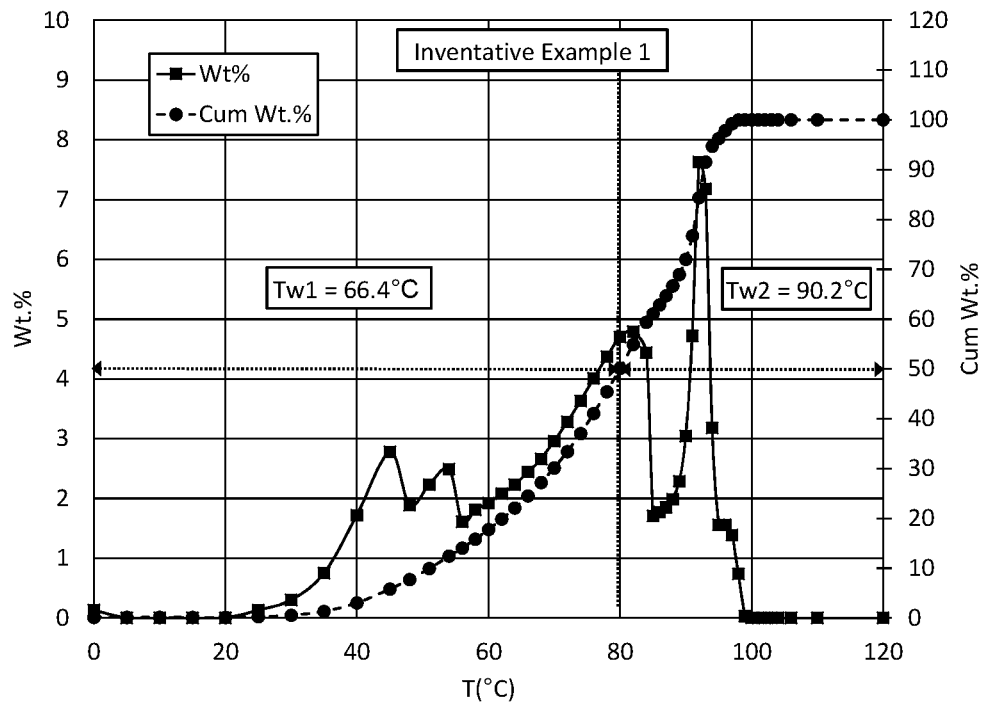
FIG. 5 is a plot illustrating the calculations used to determine CFC results where, the x-axis represents the elution temperature in centigrade, while the right hand y-axis represents the value of the integral of the weights of polymer that have been eluted up to an elution temperature.
Figure 6:
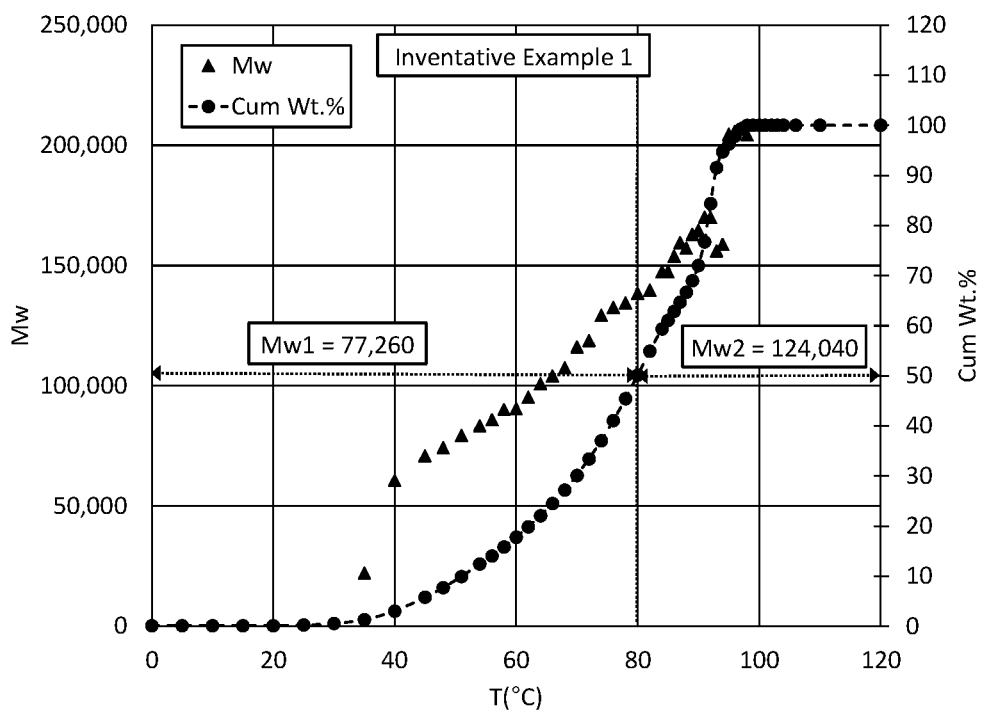
FIG. 6 is a plot illustrating the calculations used to determine CFC results where, the x-axis represents the elution temperature in centigrade, while the right hand y-axis represents the value of the integral of the weights of polymer that have been eluted up to an elution temperature.

In the section of "Fraction summary" in the CFC data file, each fraction is listed by its fractionation temperature (Ti) along with its normalized wt. % value (Wi), cumulative wt. %, i.e., see Cum wt. % on FIG. 5 and FIG. 6, and various moments of molecular weight averages (including weight average molecular weight, Mwi).

FIG. 5 and FIG. 6 are plots that graphically illustrate the calculations used to determine the CFC result. Only fractions having MWD data are considered. In both FIG. 5 and FIG. 6, the x-axis represents the elution temperature in centigrade, while the right hand y-axis represents the value of the integral of the weights of polymer that have been eluted up to an elution temperature. The temperature at which 100% of the material has eluted in this example is about 100° C. The closest point at which 50% of the polymer has eluted is determined by the integral, which is used then to divide each of the plots into a $1^{st}$-half and a $2^{nd}$-half.

To calculate values of Tw1, Tw2, Mw1 and Mw2, the data in "Fraction summary" was divided into two roughly equal halves. Weight averages of Ti and Mwi; for each half were calculated according to the conventional definition of weight average. Fractions which did not have sufficient quantity (i.e., <0.5 wt. %) to be processed for molecular weight averages in the original data file were excluded from the calculation of Tw1, Tw2, Mw1 and Mw2.

The first part of the process is illustrated by FIG. 5. From the section of fraction summary in the CFC data file, the fraction whose cumulative wt. % (i.e., Sum wt) is closest to 50 is identified (e.g., the fraction at 80° C. on FIG. 5). The Fraction summary data is divided into two halves, e.g., Ti<=80° C. as the 1st half and Ti>80° C. as the 2nd half on FIG. 5.

In FIG. 5, the left hand y-axis represents the wt % of the eluted fraction. Using the procedure above to divide the curves into two halves, these values are used to calculate the weight average elution temperature for each half using the formula shown in Eqn. 1.

$$Tw = \frac{\Sigma TiWi}{\Sigma Wi} \qquad \text{Eqn. 1}$$

In Eqn. 1, Ti represents the elution temperature for each eluted fraction, and Wi represents the normalized weight % (polymer amount) of each eluted fraction. For the example shown in FIG. 5, this provides a weight average elution temperature of 66.4° C. for the first half, and 90.2° C. for the second half.

Equation 1 can also be applied to data obtained from the TREF method described above to obtain the average Tw of the entire sample. The results are reported as Tw (TREF) in Tables B and C.

In FIG. 6, the left hand axis represents the weight average molecular weight (Mwj) of each eluted fraction. These values are used to calculate the weight average molecular weight for each half using the formula shown in Eqn. 2.

$$Mw = \frac{\Sigma MwiWi}{\Sigma Wi} \qquad \text{Eqn. 2}$$

In Eqn. 2, Mw; represents the weight average molecular weight of each eluted fraction, and Wj represents the normalized weight % (polymer amount) of each eluted fraction. For the example shown in FIG. 5, this provides a weight average molecular weight of 124,040 g/mole for the first half, and 77,260 g/mole for the second half.

FIG. 1 is a semi-log plot of $(Mw_1/Mw_2)$ vs. $(Tw_1-Tw_2)$ designed to show the important differences in property combinations among inventive examples vs. commercial benchmarks. Such differences are believed to play a key role in determining the trade-off pattern and/or balance of various performance attributes such as stiffness, toughness and processability.

Additional test methods include the following. Tests performed on one mil thick film unless otherwise indicated.

| Test Name | Method or description |
| --- | --- |
| Melt Index (MI), $I_2$, (dg/min) | ASTM D-1238 2.16 kg, 190° C. |
| High Load Melt Index (HLMI), $I_{21}$, (dg/min) | ASTM D-1238 21.6 kg, 190° C. |
| Melt Index Ratio | $I_{21}/I_2$ |
| Density (g/cc) | ASTM D1505, column density. Samples were molded under ASTM D4703-10a, Procedure C, then conditioned under ASTM D618-08 (23° ± 2° C. and 50 ± 10% Relative Humidity) for 40 hours before testing |
| 1% Secant Modulus (psi) | ASTM D-882, 1 inch width strip, 1 mil gauge samples conditioned ASTM D618-08 for 40 hours at 23° ± 2° C. and 50 ± 10% Relative Humidity |
| Yield Strength (psi) | ASTM D-882, 15 mm width strip, 1 mil gauge |
| Tensile Strength (psi) | ASTM D-882, 15 mm width strip, 1 mil gauge |
| Tensile Strain (%) | ASTM D-882, 15 mm width strip, 1 mil gauge |

| Test Name | Method or description |
| --- | --- |
| Elongation at Break | ASTM D-882, 15 mm width strip, 1 mil gauge |
| Elongation at Yield | ASTM D-882, 15 mm width strip, 1 mil gauge |
| Dart Drop (g/mil) | ASTM D-1709, Phenolic, Method A, samples conditioned under ASTM D618-08 (23° ± 2° C. and 50 ± 10% Relative Humidity) for 40 hours before testing, calculation uses last 10 passes and 10 fails. |
| Elmendorf Tear (g) | ASTM D1922 with ASTM D618-08 conditioning for 40 Hours at 23° ± 2° C. and 50 ± 10% Relative Humidity |
| Puncture properties<br>Peak force (lbs) or (lbs/mil)<br>Break Energy (in-lbs) or (in-lbs/mil) | ASTM D5748: A modified ASTM probe with a 3/8" radius semi-spherical tip in stainless steel was used with two 0.25 mil HDPE slip sheets. Machine Model: United SFM-1. Testing speed: 10 in/min |
| HOT TACK PROPERTIES<br>Hot Tack, also referred to as Hot Tack Strength or Maximum Hot Tack Force (N)<br>Hot Tack (Initiation) Temperature at 1 N force (° C.)<br>Hot Tack (Initiation) Temperature at 5 N force (° C.) | After conditioning the 1 mil gauge film samples for 40 hours (minimum) at 23° C. ± 2° C. and 50 ± 10% relative humidity, 2.5 mil 3M/854 polyester film tape is applied to the back (or outside) of the film specimen as a backing, to test the "Inside to Inside" tack. The film sample with tape backing is cut into 1" wide and at least 16" long specimens, then sealed on J&B Hot Tack Testers 4000 under the standard conditions of 73 psi (0.5 MPa) Seal Pressure for 0.5 second, followed by a 0.4 second delay, then the sealed specimens were pulled at 200 mm/speed in T-joint peel mode. Four test specimens are measured at each temperature point and the average hot tack strength is recorded for each temperature point to generate a hot tack strength curve. From that curve, the temperatures to reach 1 N and 5 N tack forces are determined, as well as the maximum hot tack force. |
| SEAL PROPERTIES<br>Heat Seal (N)<br>Seal Initiation Temperature at 1 N force (° C.)<br>Seal Initiation Temperature at 5 N force (° C.)<br>Maximum seal force (N) | Seal properties are determined following the steps below. Two layers of films, 1 mil gauge, were sealed on HSX-1 Heat Sealer in the TD direction at various temperatures under 73 psi (0.5 MPa or N/mm$^2$) for 1 second. Once sealed film samples have cooled to room temp, test strips of 1 inch wide were cut then conditioned at 23° ± 2° C. and 50 ± 10% Relative Humidity for approximately 24 hours prior to testing on a United 6 Station. The testing is done in T-peel mode at 20 inch/min tensile speed. Three to five test specimens were tested for each sealed specimen and the average seal force was recorded and used to generate a seal force vs. temperature curve. From that curve, the temperatures to reach 1 N and 5 N seal forces were determined as seal initiation temperatures, and the maximum seal force is also recorded as seal strength. |
| Bulk Density (g/cm$^3$) | is measured as follows; the resin is poured via a 7/8" diameter funnel into a fixed volume cylinder of 400 cc; the bulk density is measured as the weight of resin in the cylinder divided by the 400 cc to give a value in g/cc. |
| Comonomer content (wt %) | GPC-4D |

MD = machine direction,
TD = transverse direction

Unless otherwise indicated, room/ambient temperature is approximately 23° C.

Examples

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

MAO is methylalumoxane-30 wt % in toluene, Albemarle. "ES70" is ES70™ silica obtained from PQ Corporation, Conshohocken, Pa.

ES70-875 silica is ES70™ silica (PQ Corporation, Conshohocken, Pa.) that has been calcined at approx. 875° C. and stored under nitrogen. Specifically, the ES70™ silica is calcined at 880° C. for four hours after being ramped to 880° C. according to the following ramp rates:

| ° C. | ° C./h | ° C. |
| --- | --- | --- |
| ambient | 100 | 200 |
| 200 | 50 | 300 |
| 300 | 133 | 400 |
| 400 | 200 | 800 |
| 800 | 50 | 880 |

TABLE 1

Metallocenes for Cat-1, Cat-6 and Cat-5

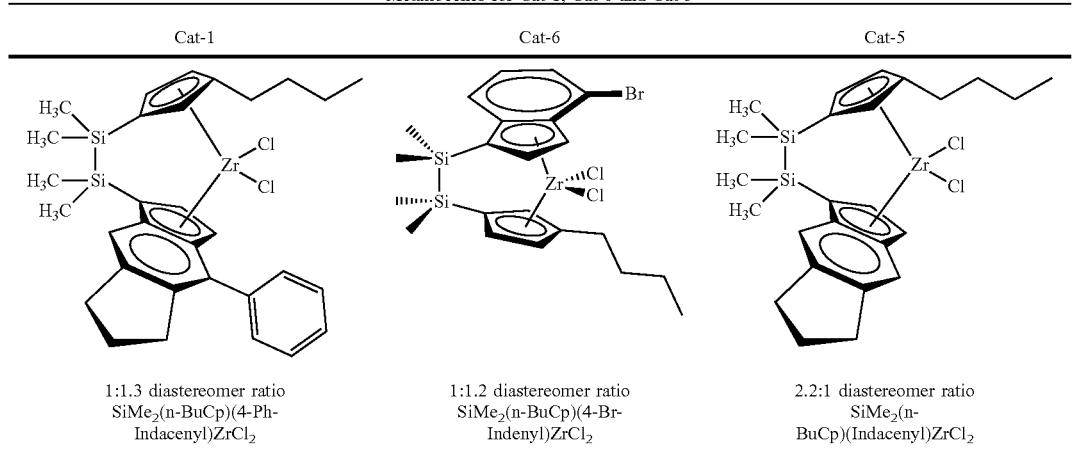

| Cat-1 | Cat-6 | Cat-5 |
|---|---|---|
| 1:1.3 diastereomer ratio SiMe₂(n-BuCp)(4-Ph-Indacenyl)ZrCl₂ | 1:1.2 diastereomer ratio SiMe₂(n-BuCp)(4-Br-Indenyl)ZrCl₂ | 2.2:1 diastereomer ratio SiMe₂(n-BuCp)(Indacenyl)ZrCl₂ |

Synthesis of Tetramethyldisilylene (3-butyl-cyclopentadienyl) (4-phenyl-1,5,6,7-tetrahydro-s-indacenyl) zirconium dichloride

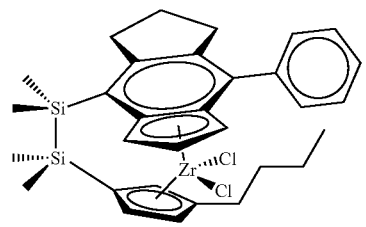

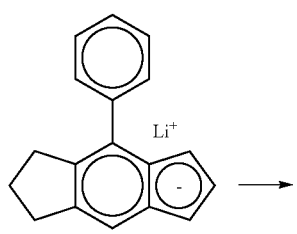

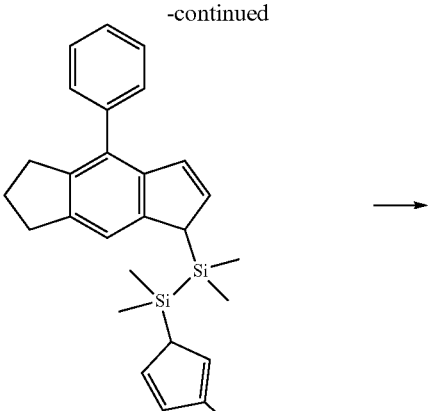

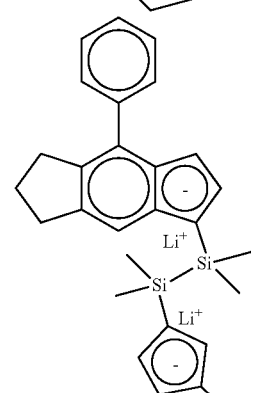

1-Chloro-1,1,2,2-tetramethyl-2-(4-phenyl-1,5,6,7-tetrahydro-s-indacen-1-yl)disilane To a precooled, stirring solution of 1,2-dichlorotetramethyldisilane (33.41 g, 178.5 mmol, 1.5 equiv.) in diethyl ether (500 mL), a solution of lithium 4-phenyl-1,5,6,7-tetrahydro-s-indacenide (30.10 g, 118.9 mmol) in diethyl ether (100 mL) was added slowly over the course of approximately 1 hour. The reaction was then stirred at room temperature for 18 hours. The reaction was concentrated under a stream of nitrogen and then under high vacuum. The residue was extracted with hexane (3×100 mL) and filtered over Celite. The combined hexane extracts were concentrated under a stream of nitrogen and then under high vacuum at 70° C. to afford the product as a pale yellow oil (42.959 g).

1-(3-Butylcyclopenta-2,4-dien-1-yl)-1,1,2,2-tetramethyl-2-(4-phenyl-1,5,6,7-tetrahydro-s-indacen-1-yl) disilane To a precooled, stirring solution of 1-chloro-1,1,2,2-tetramethyl-2-(4-phenyl-1,5,6,7-tetrahydro-s-indacen-1-yl)disilane (42.959 g, 112.1 mmol) in tetrahydrofuran (400 mL), a solution of lithium butylcyclopentadienide (14.44 g, 112.7 mmol, 1.01 equiv.) in tetrahydrofuran (50 mL) was added. The reaction was stirred at room temperature for 16.5 hours. The reaction was concentrated under a stream of nitrogen and then under high vacuum. The residue was extracted with hexane (3×100 mL) and filtered over Celite. The combined hexane extracts were concentrated under a stream of nitrogen and then under high vacuum to afford the product as a dark, amber oil, containing hexane (0.56 equiv.) (54.18 g).

Lithium 1-(2-(3-butylcyclopenta-2,4-dien-1-ide-1-yl)-1,1,2,2-tetramethyldisilaneyl)-4-phenyl-1,5,6,7-tetrahydro-s-indacen-1-ide To a precooled, stirring solution of 1-(3-butylcyclopenta-2,4-dien-1-yl)-1,1,2,2-tetramethyl-2-(4-phenyl-1,5,6,7-tetrahydro-s-indacen-1-yl)disilane (54.18 g, 104.9 mmol) in diethyl ether (400 mL), n-butyllithium (2.5M in hexanes, 90.0 mL, 225.0 mmol, 2.15 equiv.) was added. The reaction was stirred at room temperature for 2 hours. The reaction was concentrated under a stream of nitrogen and then under high vacuum. The residue was washed with hexane (5×50 mL) and concentrated under high vacuum to afford the product as a light purple solid, containing diethyl ether (0.03 equiv.), tetrahydrofuran (0.02 equiv.), and hexane (0.58 equiv.) (54.18 g).

Tetramethyldisilylene (3-butyl-cyclopentadienyl) (4-phenyl-1,5,6,7-tetrahydro-s-indacenyl) zirconium dichloride To a precooled, stirring suspension of zirconium(IV) chloride (23.71 g, 101.7 mmol, 1.00 equiv.) in diethyl ether (600 mL), a solution of lithium 1-(2-(3-butylcyclopenta-2,4-dien-1-ide-1-yl)-1,1,2,2-tetramethyldisilaneyl)-4-phenyl-1,5,6,7-tetrahydro-s-indacen-1-ide (54.18 g, 101.5 mmol) in diethyl ether (100 mL) was added. The reaction, a yellow-brown suspension, was stirred at room temperature for 20 hours. The reaction was concentrated under a stream of nitrogen and then under high vacuum. The residue was extracted with hexane (3×100 mL) and filtered over Celite. The combined hexane extracts were concentrated under a stream of nitrogen and then under high vacuum. The hexane extracts were then dissolved in hexane (100 mL) and cooled to −35° C. The resulting precipitate was collected and concentrated under high vacuum to afford a fraction of the product as an orange foam (41.1 g). The cold hexane extract of the hexane extract was concentrated under a stream of nitrogen and then under high vacuum. The cold hexane extract was then dissolved in minimal hexane and cooled to −35° C. overnight. The cold hexane supernatant was removed, and the cold hexane washed cold hexane extract of the hexane extract was concentrated under high vacuum to afford a fraction of the product as a light orange foam (3.5 g). The hexane washed reaction residue was extracted with dichloromethane (3×50 mL) and filtered over Celite. The combined dichloromethane extracts were concentrated under a stream of nitrogen and then under high vacuum. The dichloromethane extract was further extracted with hexane (3×50 mL) and filtered over Celite. The combined hexane extracts were concentrated under a stream of nitrogen and then under high vacuum to afford a fraction of the product as an orange foam (2.4 g). The hexane washed dichloromethane extract was dissolved in minimal dichloromethane (40 mL) and diluted with hexane (100 mL) and stirred overnight. The mixture was filtered over Celite. The filtrate was concentrated under a stream of nitrogen and then under high vacuum. The dichloromethane-hexane extract was further extracted with refluxing hexane. The hot hexane extract was concentrated under a stream of nitrogen and then under high vacuum to afford a fraction of the product. All of the product fractions were combined and concentrated under high vacuum to afford the product as a yellow-orange solid (48.18 g, 75%, 1:1.3 ratio of diastereomers A and B). $^1$H NMR (400 MHz, CD$_2$Cl$_2$): δ 7.56-7.32 (m, 6H each isomer), 6.90 (d, 1H, J=6.5 Hz, diastereomer A, used for diastereomer ratio), 6.85 (d, 1H, J=6.5 Hz, diastereomer B, used for diastereomer ratio), 6.71-6.65 (m, 2H diastereomer A, 1H diastereomer B), 6.44-6.40 (m, 1H, diastereomer B), 6.22 (t, 1H, J=2.7 Hz, diastereomer B), 6.09 (t, 1H, J=2.1 Hz, diastereomer A), 6.07 (t, 1H, J=2.6 Hz, diastereomer A), 5.94 (t, 1H, J=2.6 Hz, diastereomer B), 3.20-2.96 (m), 2.71-2.61 (m), 2.54-2.33 (m), 2.24-2.08 (m), 2.00-1.86 (m), 1.54-1.19 (m), 0.92-0.81 (m), 0.65 (s, 3H, diastereomer A), 0.64 (s, 3H, diastereomer B), 0.54 (s, 3H, diastereomer B), 0.53 (s, 3H, diastereomer B), 0.52 (s, 6H, diastereomer A), 0.49 (s, 3H, diastereomer A), 0.47 (s, 3H, diastereomer B).

Supportation of Tetramethyldisilylene (3-butyl-cyclopentadienyl) (4-phenyl-1,5,6,7-tetrahydro-s-indacenyl) zirconium dichloride (Cat-1)

To a 6 L conical mixing vessel, methylalumoxane solution (867 g, 30 wt % in toluene) was added. Tetramethyldisilylene (3-butyl-cyclopentadienyl) (4-phenyl-1,5,6,7-tetrahydro-s-indacenyl) zirconium dichloride (23.101 g) was dissolved in toluene. Additional toluene (total 1794 g) was added to the conical mixing vessel. Then, catalyst solution was added to the mixer. The mixer was operated at 120 rpm for 1 hour. Then, ES-70 silica (718 g) was added to the mixer. The mixer was operated at 120 rpm for 1 hour. Then, the contents of the mixer were subjected to high vacuum, the mixer was lowered to 30 rpm, and the temperature of the mixer was increased to 60° C.; these conditions were kept for 24 hours. The supported catalyst was then sieved into a storage container for later use (981 g supported catalyst).

Synthesis of Tetramethyldisilylene (4-bromo-indenyl) (3-butyl-cyclopentadienyl) zirconium dichloride

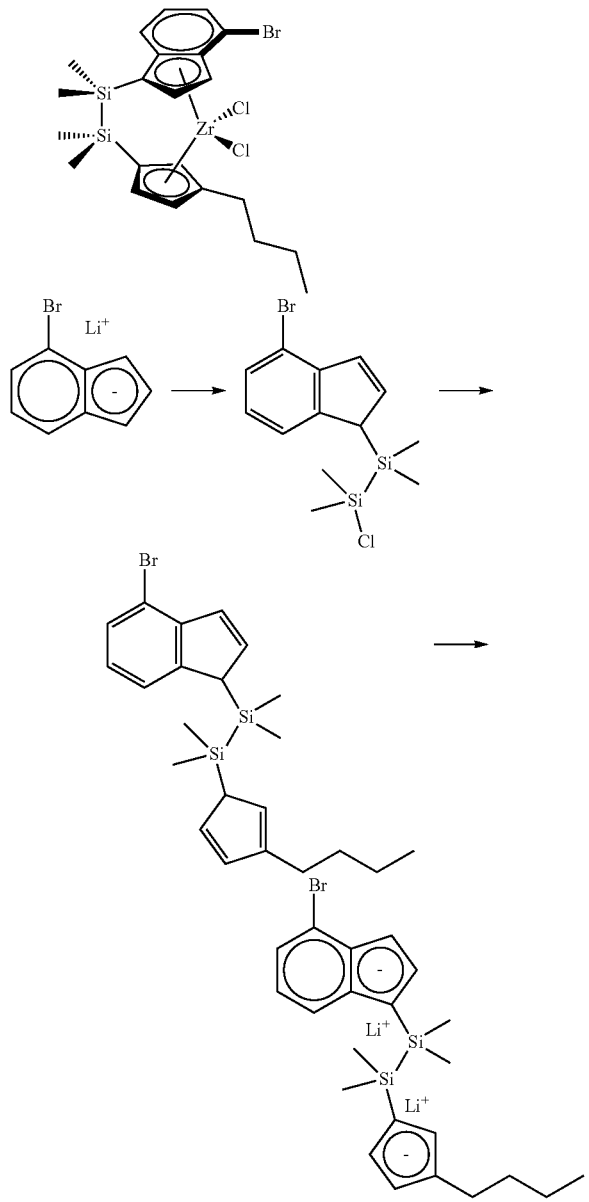

1-(4-bromo-1H-inden-1-yl)-2-chloro-1,1,2,2-tetramethyldisilane

To a precooled, stirring solution of 1,2-dichlorotetramethyldisilane (39.80 g, 212.6 mmol, 2.52 equiv.) in diethyl ether (1000 mL), a suspension of lithium 4-bromoindenide (25.00 g, 84.4 mmol) in diethyl ether (200 mL) was added. The reaction was stirred at room temperature for 2 hours. The reaction was concentrated under a stream of nitrogen and then under high vacuum. The residue was extracted with pentane (2×150 mL) and filtered over Celite. The combined pentane extracts were concentrated under a stream of nitrogen and then under high vacuum at 70° C. to afford the product as an orange oil (29.95 g).

1-(4-bromo-1H-inden-1-yl)-2-(3-butylcyclopenta-2,4-dien-1-yl)-1,1,2,2-tetramethyldisilane To a precooled, stirring solution of 1-(4-bromo-1H-inden-1-yl)-2-chloro-1,1,2,2-tetramethyldisilane (29.95 g, 86.6 mmol) in tetrahydrofuran (300 mL), a solution of lithium butylcyclopentadienide (11.18 g, 87.25 mmol) in tetrahydrofuran (100 mL) was added. The reaction was stirred at room temperature for 1 hour. The reaction was concentrated under a stream of nitrogen and then under high vacuum. The residue was stirred in hexane (100 mL) and then concentrated under high vacuum. The residue was then extracted with pentane (2×200 mL) and filtered over Celite. The combined pentane extracts were concentrated under a stream of nitrogen and then under high vacuum to afford the product as a purple oil (37.52 g).

Tetramethyldisilylene (4-bromo-indenyl) (3-butyl-cyclopentadienyl) zirconium dichloride To a precooled, stirring solution of 1-(4-bromo-1H-inden-1-yl)-2-(3-butylcyclopenta-2,4-dien-1-yl)-1,1,2,2-tetramethyldisilane (37.52 g, 86.94 mmol) in diethyl ether (400 mL), n-butyllithium (2.5M in hexanes) was added slowly over the course of 30 minutes. The reaction was stirred at room temperature for 13 hours. The reaction was concentrated under a stream of nitrogen and then under high vacuum to give a solid. In a separate flask, zirconium(IV) chloride (20.26 g, 86.94 mmol, 1 equiv.) in diethyl ether (200 mL) were cooled. The solid previously obtained was dissolved in diethyl ether (200 mL). This solution was added to a stirring, cooled suspension of zirconium(IV) chloride in diethyl ether. The reaction was stirred at room temperature for 15 hours. The reaction was then concentrated under a stream of nitrogen and then under high vacuum. The residue was stirred in dichloromethane (200 mL). The resulting suspension was filtered over Celite. The filtered solid was washed with dichloromethane (2×50 mL). The combined dichloromethane filtrate was concentrated under a stream of nitrogen and then under high vacuum to give a yellow-orange foam. To the foam, hexane (250 mL) was added. The mixture was stirred and heated to reflux. The resulting mixture was allowed to settle, and the hot supernatant was filtered on a fritted funnel. The hot hexane washed residue was extracted twice more with hot hexane (100 mL hexane each), and the hot hexane supernatants were similarly filtered on a fritted funnel. The combined hot hexane filtrates had begun to precipitate solid; the mixture was heated to redissolve the solids, and the solution was allowed to slowly cool to room temperature, and then to −35° C. overnight. The cold hexane supernatant was decanted away, and the remaining precipitate was concentrated under high vacuum to afford a fraction of the product. The hot hexane washed solid was separately concentrated under high vacuum to give an orange foam. This foam was dissolved in dichloromethane (50 mL) and stirred. To the stirring solution, hexane (200 mL) was added. A thick, red oil precipitated, with an orange suspension above the oil. The orange suspension was filtered over Celite. The thick red oil precipitate was redissolved in dichloromethane (50 mL) and stirred, precipitating again with hexane (200 mL). A red oil precipitated again, with an orange suspension above the oil. The suspension was filtered over Celite. The combined dichloromethane-hexane filtrates were concentrated under a stream of nitrogen and then under high vacuum. The residue was stirred in hexane and heated to reflux. The hot hexane supernatant was filtered over a fritted funnel. The filtrate was concentrated under a stream of nitrogen and then under high vacuum. The residue was washed with hexane to give a fraction of the product. The two fractions of the product were combined. The combined fractions were washed with hexane and concentrated under high vacuum to afford the product as a yellow solid (17.87 g, 1:1.2 ratio of diastereomers A and B). $^1$H NMR (400 MHz, CD$_2$Cl$_2$): δ 7.69 (dt, 1H, J=8.5, 0.8 Hz, diastereomer A, used for diastereomer ratio), 7.64 (dt, 1H, J=8.5, 0.8 Hz, diastereomer B, used for diastereomer ratio), 7.48 (dd, 1H, J=3.4, 0.7 Hz), 7.46 (dd, 1H, J=3.4, 0.7 Hz), 7.18-7.13 (m, 2H), 7.05-7.01 (m, 2H), 6.85-6.81 (m, 2H), 6.71 (dd, 1H, J=3.1, 2.3 Hz), 6.52 (t, 1H, J=2.2 Hz), 6.33 (dd, 1H, J=3.1, 2.3 Hz), 6.24 (t, 1H, J=2.2 Hz), 6.20 (dd, 1H, J=3.0, 2.1 Hz), 6.05 (dd, 1H, J=3.1, 2.1 Hz), 2.64-2.42 (m, 3H), 2.34-2.25 (m, 1H), 1.59-1.20 (m, 8H), 0.90 (t, 3H, J=7.4 Hz), 0.86 (t, 3H, J=7.3 Hz), 0.64 (s, 3H), 0.62 (s, 3H), 0.54 (s, 3H), 0.53 (s, 3H), 0.52-0.50 (m, 9H), 0.48 (s, 3H).

Supportation of Tetramethyldisilylene (4-bromo-indenyl) (3-butyl-cyclopentadienyl) zirconium dichloride (Cat-6)

To a 6 L conical mixing vessel, methylalumoxane solution (871 g, 30 wt % in toluene) was added. Tetramethyldisilylene (4-bromo-indenyl) (3-butyl-cyclopentadienyl) zirconium dichloride (17.865 g) was dissolved in toluene. Additional toluene (total 1864 g) was added to the conical mixing vessel. Then, catalyst solution as added to the mixer. The mixer as operated at 120 rpm for 1 hour. Then, ES70 silica (722 g) was added to the mixer. The mixer was operated at 120 rpm for 1 h. Then, the contents of the mixer were subjected to high vacuum, the mixer was lowered to 30 rpm, and the temperature of the mixer was increased to 60° C.; these conditions were kept for 24 hours. The supported catalyst was then sieved into a storage container for later use (940 g supported catalyst).

Synthesis of Tetramethyldisilylene (3-butyl-cyclopentadienyl) (1,5,6,7-tetrahydro-s-indacenyl) zirconium dichloride

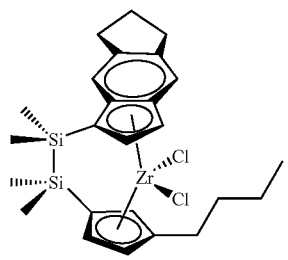

Tetramethyldisilylene (3-butyl-cyclopentadienyl) (1,5,6,7-tetrahydro-s-indacenyl) zirconium dichloride To a stirring suspension of zirconium(IV) chloride (2.284 g, 9.80 mmol, 1.02 equiv.) in diethyl ether (20 mL), a suspension of lithium 1-(2-(3-butylcyclopenta-2,4-dien-1-ide-1-yl)-1,1,2,2-tetramethyldisilaneyl)-1,5,6,7-tetrahydro-s-indacen-1-ide (4.060 g, 9.65 mmol) in diethyl ether (20 mL) was added. The reaction was stirred at room temperature for 2.5 hours. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. The residue was stirred in hexane (30 mL) overnight. The resulting suspension was filtered over Celite. The hexane extract was concentrated under a stream of nitrogen and then under high vacuum to give a yellow foam. The foam was washed with cold hexane (2×10 mL) and concentrated under high vacuum to give a bright yellow solid. The solid was completely dissolved in minimal dichloromethane (1 mL) and diluted with hexane (5 mL). The mixture was cooled to −35° C. overnight. The mixture had formed a precipitate; the supernatant, while cold, was decanted away. The precipitate was concentrated under high vacuum to afford a fraction of the product as a bright yellow solid (1.239 g, 23%, 1:1.8 ratio of diastereomers A and B). The hexane washed dichloromethane extract was extracted with hot hexane in 10 mL portions; extraction continued until the most recent portion was colorless. The combined hot hexane extracts were concentrated under a stream of nitrogen and then under high vacuum. The residue was dissolved in minimal dichloromethane (2 mL). Then, hexane (5 mL) was added. The mixture was cooled to −35° C. overnight. The mixture had formed a precipitate; the supernatant, while cold, was decanted away. The precipitate was concentrated under high vacuum to afford a fraction of the product as a bright, yellow solid (0.489 g, 9%, 5:1 ratio of diastereomers A and B). The product fractions were combined for use in supportation (2.2:1 ratio of diastereomers A and B in the combined fraction). $^1$H NMR (400 MHz, CD$_2$Cl$_2$): δ 7.58 (s, 1H, diastereomer A, used for diastereomers ratio), 7.57 (s, 1H, diastereomer B, used for diastereomer ratio), 7.53-7.49 (m, 2H), 2.95-2.91 (m, 2H), 6.70 (dd, 1H, J=3.1, 2.3 Hz), 6.62-6.58 (m, 2H), 6.48 (t, 1H, J=2.2 Hz), 6.13 (dd, 1H, J=3.0, 2.1 Hz), 5.93 (dd, 1H, J=3.1, 2.3 Hz), 5.89 (t, 1H, J=2.2 Hz), 5.85 (dd, 1H, J=3.1, 2.0 Hz), 3.13-2.88 (m, 8H), 2.61-2.44 (m, 2H), 2.37-2.27 (m, 1H), 2.19-2.00 (m, 5H), 1.58-1.13 (m, 8H), 0.88 (t, 3H, J=7.3 Hz), 0.84 (t, 3H, J=7.1 Hz), 0.60 (s, 3H), 0.58 (s, 3H), 0.54 (s, 3H), 0.52 (s, 3H), 0.51 (s, 3H), 0.50 (s, 3H), 0.49 (s, 3H), 0.46 (s, 3H).

Supportation of Tetramethyldisilylene (3-butyl-cyclopentadienyl) (1,5,6,7-tetrahydro-s-indacenyl) zirconium dichloride (Cat-5)

Methylalumoxane treated silica, SMAO-ES70-875, was prepared in a manner similar to the following:

In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

Thereafter, 72 g of SMAO-ES70-875 was added to a 500 mL CelStir. Tetramethyldisilylene (3-butyl-cyclopentadienyl) (1,5,6,7-tetrahydro-s-indacenyl) zirconium dichloride (1.589 g) was dissolved in toluene. The remaining toluene for the procedure (total toluene 279 g) was added to the SMAO-ES70-875 (72 g). The SMAO-ES70-875-toluene mixture was stirred to form a slurry. To the stirring slurry, the catalyst solution was added. The mixture was stirred for 92 minutes. The slurry was then filtered on a plastic, fritted funnel. The collected solid was stirred in toluene (100 mL) and filtered again. The solid was washed with pentane (100 mL), then stirred in pentane (100 mL) and filtered again, washing with additional portions of pentane (10×20 mL). The solid was transferred to a separate flask and concentrated under high vacuum to afford the supported catalyst (71.887 g). The supported catalyst was stored in a freezer until use.

Polymerization Process

Runs 1-7 using Cat-1 or Cat-6

Ethylene-hexene polymerization was performed in an 18.5 foot tall gas-phase fluidized bed reactor with a 10 foot body and an 8.5 foot expanded section. Cycle and feed gases were fed into the reactor body through a perforated distributor plate, and the reactor was controlled by gas composition through adjusting gas feed rates and fixed pressure. The reactor temperature was controlled during polymerization by controlling the temperature of the cycle gas loop. Polymer was collected from the reactor as necessary to maintain the desired bed weight. Polymerization process conditions are reported in Table A below.

Run 8 using Cat-5

Ethylene-hexene polymerization was performed in a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. The reactor temperature was controlled during polymerization by controlling the temperature of the cycle gas loop. Polymer was collected from the reactor as necessary to maintain the desired bed weight. Polymerization process conditions are reported in Table A below.

LL3001™ Polyethylene is a Ziegler-Natta linear low density ethylene-hexene copolymer available from Exxon-Mobil Chemical Company, Houston Tex.

Elite™ 5400 Polyethylene Resin is a polyethylene resin available from The Dow Chemical Company, Lake Jackson Tex.

The ethylene copolymer granules from Table A were dry-blended in a tumble mixer with the following additives: 500 ppm Irganox™-1076, 1000 ppm Irgafos™ 168 and 600 ppm Dynamar™ FX5920A, then melt-homogenized into pellets on twin screw extruders (Leistritz 27 or ZSK57). Leistritz 27 extruder (Model ZSE 27) by American Leistritz Extruder Corporation is a Co-Rotating Twin Screw Extruder with a screw diameter of 27 mm and L/D ratio of 40. An extruder speed of 250 rpm was used, the typical throughputs were about 50 pounds/hr and the resulting melt temperatures were around 227° C. The extruded strands of PE materials were cooled in a circulating water bath, then cut into approximately 5 mm size pellets using a pelletizer. ZSK57 extruder by Coperion GmbH is a Co-Rotating Twin Screw Extruder with a screw diameter of 57 mm and L/D ratio of 25.6. An extruder speed of 160 RPM was used, the typical throughputs were between 160 and 170 lb/hr and the resulting melt temperatures were between 410 and 440° F. (210 to 227° C.). The melt was cooled then pelletized into 5 to 7 mm sized pellets by a underwater pelletizer, with a circulating water temperature of 90° F. (~32° C.).

TABLE A

| | Run # | | | | | | | |
|---|---|---|---|---|---|---|---|---|
| | Run 1 | Run 2 | Run 3 | Run 4 | Run 5 | Run 6 | Run 7 | Run 8 |
| | | | | Catalyst # | | | | |
| | Cat-1 | Cat-1 | Cat-1 | Cat-1 | Cat-6 | Cat-6 | Cat-6 | Cat-5 |
| Process conditions | | | | | | | | |
| $H_2$ conc. (molppm) | 123 | 136 | 127 | 149 | 147 | 154 | 156 | 169 |
| Hexene conc. (mol %) | 1.79 | 1.90 | 2.13 | 2.21 | 2.35 | 2.55 | 2.79 | 2.93 |
| ethylene conc. (mol %) | 66.9 | 67.1 | 67.0 | 67.0 | 66.9 | 66.3 | 66.8 | 70.0 |
| hexene/ethylene Flow Ratio (lb/lb) | 0.105 | 0.122 | 0.137 | 0.147 | 0.118 | 0.136 | 0.153 | 0.103 |
| Rx. Pressure (psig) | 290 | 290 | 290 | 290 | 290 | 290 | 290 | 300 |
| Reactor Temp (° F.) | 185 | 176 | 176 | 176 | 176 | 176 | 176 | 176 |
| Residence Time (hr) | 4.1 | 6.8 | 6.3 | 5.3 | 6.5 | 6.8 | 6.7 | 5.2 |
| Catalyst Feed (g/hr) | 4.390 | 4.249 | 4.181 | 4.181 | 5.431 | 5.696 | 5.696 | 0.172 |
| Cat Activity (g poly/g cat) | 8945 | 5580 | 6167 | 6183 | 4280 | 4122 | 4185 | 2640 |
| Product Data | | | | | | | | |
| Bulk Density (g/cm$^3$) | 0.4288 | 0.4237 | 0.4313 | 0.4250 | 0.4368 | 0.4435 | 0.4409 | 0.4209 |

Film Production

Exceed™ 1012 Polyethylene is a metallocene linear low density ethylene-hexene copolymer available from Exxon-Mobil Chemical Company, Houston Tex.

Exceed™ 1018 Polyethylene is a metallocene linear low density ethylene-hexene copolymer available from Exxon-Mobil Chemical Company, Houston Tex.

All comparative PE materials and inventive examples were fabricated into nominal 1 mil blown films on either a small or a large blown film line. The small blown film line was made by Cyber Plastic Machinery Inc. It has a 2" general purpose screw with an L/D ratio of 30, and a 2" monolayer die. There are total nine heating zones: four on the extruder, two on the die and one each for the screen changer, adapter and the block zone before the die. Typical temperature (° F.) settings are given below.

| Barrel 1 | Barrel 2 | Barrel 3 | Barrel 4 | Screen Changer | Adapter | Block Zone | Die Zone 1 | Die Zone 2 |
|---|---|---|---|---|---|---|---|---|
| 300 | 350 | 355 | 340 | 350 | 355 | 360 | 370 | 370 |

The large blown film line was made by Battenfield Gloucester line. It has a 2.5" general purpose screw with an L/D ratio of 30 and equipped with a 6" monolayer die and a Saturn II air ring. There are seven heating zones. Typical temperature (° F.) settings are given below.

| Zone 1 | Zone 2 | Zone 3 | Zone 4 | Zone 5 | Adapter | Die |
|---|---|---|---|---|---|---|
| 310 | 400 | 380 | 350 | 350 | 390 | 390 |

Processing conditions and characterization data are reported in Tables B and C.

TABLE B

Small Blown Film Line

| | Exceed 1012 ™ mPE | Exceed 1018 ™ mPE | PE from Run 8 |
|---|---|---|---|
| Processing Conditions | | | |
| Film Line | Small | Small | Small |
| Extruder Speed (RPM) | 30 | 30 | 30 |
| Line Speed (fpm) | 105 | 94 | 102 |
| Throughput (lb/hr) | 48.2 | 46.7 | — |
| % motor load | 58 | 55 | 46 |
| Head Pressure (psi) | 3935 | 4450 | 3565 |
| Melt temperature (° F.) | 351 | 353 | 347 |
| Chilled air temperature (° F.) | 58 | 58 | 57 |
| Die Gap (mil) | 60 | 60 | 60 |
| Lay Flat (in) | 7.9 | 7.8 | 7.9 |
| Blow up ratio | 2.53 | 2.47 | 2.51 |
| (in) Frost line height (in) | 15.3 | 13.3 | 10.3 |
| PE Properties | | | |
| Hexene comonomer content (wt %) | 9.8 | 6.3 | 9.2 |
| I2 (g/10 min) | 1.00 | 0.99 | 1.20 |
| I21 (g/10 min) | 16.0 | 15.1 | 26.0 |
| MIR | 16.0 | 15.2 | 21.6 |
| density (g/cm$^3$) | 0.9120 | 0.9187 | 0.9183 |
| $M_n$ (g/mol) | 44,150 | 42,690 | 28,990 |
| $M_w$ (g/mol) | 112,990 | 115,630 | 112,220 |
| $M_z$ (g/mol) | 197,170 | 207,754 | 424,610 |
| $M_w/M_n$ | 2.56 | 2.71 | 3.87 |
| $M_z/M_w$ | 1.8 | 1.8 | 3.8 |
| Mz/Mn | 4.5 | 4.9 | 14.6 |
| $T_w$ (TREF)(° C.) | 73.2 | 82.0 | 76.3 |
| $M_{w1}/M_{w2}$ (CFC) | 1.06 | 1.09 | 1.03 |
| $T_{w1} - Tw2$ (° C.) (CFC) | -13.9 | -9.5 | -25.5 |
| RCI, m | 19.07 | 11.96 | 33.3 |
| g'(vis) | | | 0.99 |
| Film Properties | | | |
| Film Gauge (mil) | 1.131 | 1.19 | 1.32 |
| 1% Secant (psi), MD | 15366 | 26140 | 25154 |
| 1% Secant (psi), TD | 16041 | 30123 | 28502 |
| 1% Secant (psi), Ave. | 15704 | 28131 | 26828 |
| Tensile Yield Strength(psi)__MD | 991 | 1333 | 1319 |
| Tensile Yield Strength(psi)__TD | 962 | 1364 | 1353 |
| Tensile Strength(psi)__MD | 9589 | 9328 | 8996 |
| Tensile Strength(psi)__TD | 9235 | 7659 | 7152 |
| Tensile Strain (%)__MD | 474 | 495 | 455 |
| Tensile Strain (%)__TD | 612 | 664 | 733 |
| Elmendorf Tear (g), MD | 179.4 | 297.8 | 214.6 |
| Elmendorf Tear (g), TD | 325.9 | 500.1 | 749.8 |
| Elmendorf Tear (g/mil), MD | 158.8 | 250.4 | 177.4 |
| Elmendorf Tear (g/mil), TD | 285.9 | 420.1 | 675.5 |

TABLE B-continued

Small Blown Film Line

| | Exceed 1012 ™ mPE | Exceed 1018 ™ mPE | PE from Run 8 |
|---|---|---|---|
| Dart Drop, Phenolic (g) | >1382 | 601 | 305 |
| Seal Initiation Temperature at 1 N force (° C.) | 85.5 | 100.3 | 90.3 |
| Seal Initiation Temperature at 5 N force (° C.) | 89.1 | 103.2 | 96.1 |
| Maximum Seal force (N) | 11.5 | 13.2 | 14.7 |
| Hot Tack Initiation Temperature at 1 N force (° C.) | 90.5 | 103.5 | 93.1 |
| Hot Tack Initiation Temperature at 5 N force (° C.) | 93.6 | 110.2 | 102.6 |
| Maximum Hot Tack force (N) | 12.7 | 13.8 | 9.2 |
| Puncture peak Force (lbs) | 14.1 | 15.2 | 14.6 |
| Puncture peak Force (lbs/mil) | 12.5 | 12.8 | 13.3 |
| Puncture break Energy (in-lbs) | 47.4 | 47.4 | 49.3 |
| Puncture break Energy (in-lbs/mil) | 41.9 | 40.0 | 44.8 |

TABLE C

Processing Conditions and Resin/Film Properties From Large Blown Film Line

| | Exceed ™ 1012 mLLDPE Comp#1 | Exceed ™ 1018 mLLDPE Comp#2 | LL3001 ™ PE Comp#3 | Elite ™ 5400 PE Comp#4 | PE from Run 1 Inv. Ex 1 |
|---|---|---|---|---|---|
| PE Properties | | | | | |
| Hexene comonomer content (wt %) | 9.8 | 6.3 | 9.6 | | 8.4 |
| I2 (g/10 min) | 1.1 | 0.99 | 1.07 | 1.06 | 0.85 |
| I21 (g/10 min) | 17.7 | 15.1 | 29.7 | 33.8 | 17.21 |
| MIR | 16.3 | 15.2 | 27.7 | 32.1 | 20.2 |
| density (g/cm$^3$) | 0.9134 | 0.9187 | 0.9176 | 0.9176 | 0.9195 |
| $M_n$ (g/mol) | 44,150 | 42,690 | 28,662 | 26340 | 35,290 |
| $M_w$ (g/mol) | 112,990 | 115,630 | 127,287 | 100170 | 123,670 |
| $M_z$ (g/mol) | 197170 | 207,754 | 459,315 | 255700 | 279,980 |
| $M_w/M_n$ | 2.56 | 2.71 | 4.4 | 3.8 | 3.50 |
| $M_z/M_w$ | 1.75 | 1.8 | 3.6 | 2.6 | 2.3 |
| $M_z/M_n$ | 4.5 | 4.9 | 16.0 | 9.7 | 7.9 |
| $T_w$ (TREF) (° C.) | 73.2 | 82 | 77.9 | 78.3 | 78.8 |
| $M_{w1}/M_{w2}$ (CFC) | 1.06 | 1.09 | 0.52 | 1.83 | 0.622 |
| $T_{w1}$-Tw2 (° C.) (CFC) | -13.9 | -9.5 | -33.5 | -21.3 | -23.8 |
| RCI, m | 19.07 | 11.96 | -92.75 | | -48.21 |
| g'(vis) | | | | | 1.02 |
| Processing Conditions | | | | | |
| Film Line | Large | Large | Large | Large | Large |
| Extruder Speed (RPM) | 62.3 | 59.6 | 46.4 | 63.25 | 66.8 |
| Line Speed (fpm) | 166.5 | 166.3 | — | — | 166.5 |
| Throughput (lb/hr) | 189 | 189 | 150 | 150 | 189 |
| % motor load | 54.2 | 69.7 | 47 | 30 | 55 |
| Head Pressure (psi) | 4280 | 4620 | 3120 | 29.85 | 4390 |
| Melt temperature (° F.) | 404 | 407 | 391 | 392 | 405 |
| Chilled air temperature (° F.) | 52 | 52 | — | — | 50 |
| Die Gap (mil) | 60 | 60 | 60 | 60 | 60 |
| Lay Flat (in) | 23.5 | 23.5 | 23.5 | 23.5 | 23.5 |
| Blow up ratio | 2.5 | 2.5 | 2.5 | 2.5 | 2.5 |
| Frost line height (in) | 27 | 24 | — | — | 26 |
| Film Properties | | | | | |
| Film Gauge (mil) | 1.04 | 0.96 | 0.99 | 1 | 1.06 |
| 1% Secant (psi), MD | 20993 | 24202 | 28418 | 25218 | 28077 |
| 1% Secant (psi), TD | 22910 | 26929 | 32736 | 30388 | 32695 |
| 1% Secant (psi), Ave. | 21952 | 25566 | 30577 | 27803 | 30386 |
| Tensile Yield Strength (psi)_MD | 1141 | 1271 | 1386 | 1269 | 1382 |
| Tensile Yield Strength (psi)_TD | 1186 | 1285 | 1479 | 1361 | 1457 |
| Tensile Strength (psi)_MD | 7963 | 10412 | 9259 | 8393 | 7689 |
| Tensile Strength (psi)_TD | 8795 | 8580 | 6965 | 8057 | 8277 |
| Tensile Strain (%)_MD | 477 | 520 | 548 | 412 | 526 |

TABLE C-continued

Processing Conditions and Resin/Film Properties From Large Blown Film Line

| | | | | | |
|---|---|---|---|---|---|
| Tensile Strain (%)_TD | 652 | 654 | 794 | 720 | 745 |
| Elmendorf Tear (g), MD | 250.4 | 247.4 | 372.2 | 225.0 | 413 |
| Elmendorf Tear (g), TD | 367.2 | 395.2 | 699.8 | 640.0 | 636.2 |
| Elmendorf Tear (g/mil), MD | 250.4 | 251 | 375 | 225 | 386.0 |
| Elmendorf Tear (g/mil), TD | 356.5 | 400 | 677 | 640 | 623.7 |
| Dart Drop, Phenolic (g) | >1310 | 643 | 167 | 307 | 516 |
| Seal Initiation Temperature at 1 N force (° C.) | 89.6 | 100.3 | 96.7 | 94.5 | 92.98 |
| Seal Temperature at 5 N force (° C.) | 93.5 | 103.1 | 106.7 | 97.6 | 97.42 |
| Maximum Seal force (N) | 11.0 | 9.3 | 9.3 | 11.6 | 12.35 |
| Hot Tack Initiation Temperature at 1 N force (° C.) | 91.2 | 97.1 | 107.2 | 89.3 | 90.6 |
| Hot Tack Temperature at 5 N force (° C.) | 96.9 | 102.2 | 113.9 | 98.0 | 103.6 |
| Maximum Hot Tack force (N) | 14.1 | 9.0 | 6.0 | 8.9 | 8.0 |
| Puncture peak Force (lbs) | 13.9 | 10.8 | 7.9 | 10.2 | 12.0 |
| Puncture peak Force (lbs/mil) | 13.4 | 11.3 | 8.0 | 10.3 | 11.3 |
| Puncture break Energy (in-lbs) | 49.5 | 36.1 | 24.2 | 29.9 | 40.9 |
| Puncture break Energy (in-lbs/mil) | 47.6 | 37.6 | 24.4 | 30.2 | 38.6 |

| | PE from Run 2 Inv. Ex 2 | PE from Run 3 Inv. Ex 3 | PE from Run 5 Inv. Ex 4 | PE from Run 6 Inv. Ex 5 | PE from Run 7 Inv. Ex 6 |
|---|---|---|---|---|---|
| PE Properties | | | | | |
| Hexene comonomer content (wt %) | 10.4 | 11.4 | 9.3 | 10.4 | 11.5 |
| I2 (g/10 min) | 1.23 | 1.02 | 1.21 | 1.43 | 1.45 |
| I21 (g/10 min) | 24.99 | 21.28 | 24.6 | 29.78 | 30.61 |
| MIR | 20.3 | 20.9 | 20.3 | 20.8 | 21.1 |
| density (g/cm$^3$) | 0.9151 | 0.9119 | 0.918 | 0.9153 | 0.913 |
| $M_n$ (g/mol) | 33,210 | 34,480 | 33,800 | 30,840 | 31,150 |
| $M_w$ (g/mol) | 114,520 | 119,290 | 111,500 | 104,770 | 105,900 |
| $M_z$ (g/mol) | 263,420 | 272,600 | 289,040 | 243,280 | 269,190 |
| $M_w/M_n$ | 3.45 | 3.46 | 3.30 | 3.40 | 3.40 |
| $M_z/M_w$ | 2.3 | 2.3 | 2.6 | 2.3 | 2.5 |
| $M_z/M_n$ | 7.9 | 7.9 | 8.6 | 7.9 | 8.6 |
| $T_w$ (TREF) (° C.) | 74.1 | 72.1 | 76.4 | 74.0 | 71.6 |
| $M_{w1}/M_{w2}$ (CFC) | 0.73 | 0.75 | 0.98 | 0.99 | 1.00 |
| $T_{w1}$-$T_{w2}$ (° C.) (CFC) | −30.2 | −32.6 | −27.5 | −30.4 | −31.9 |
| RCI, m | −34.66 | −44.94 | 11.91 | 13.57 | 11.05 |
| g'(vis) | 1.00 | 1.00 | 0.97 | 0.95 | 0.95 |
| Processing Conditions | | | | | |
| Film Line | Large | Large | Large | Large | Large |
| Extruder Speed (RPM) | 64.8 | 68.7 | 60.8 | 60.8 | 62.8 |
| Line Speed (fpm) | 166.6 | 166.6 | 166.5 | 166.5 | 166.5 |
| Throughput (lb/hr) | 189 | 191 | 185 | 186 | 188 |
| % motor load | 47 | 46.4 | 51.5 | 52 | 45.6 |
| Head Pressure (psi) | 3700 | 4110 | 3690 | 3400 | 3310 |
| Melt temperature (° F.) | 400 | 402 | 400 | 397 | 397 |
| Chilled air temperature (° F.) | 50 | 50 | 50 | 50 | 50 |
| Die Gap (mil) | 60 | 60 | 60 | 60 | 60 |
| Lay Flat (in) | 23.5 | 23.5 | 23.5 | 23.5 | 23.5 |
| Blow up ratio | 2.5 | 2.5 | 2.5 | 2.5 | 2.5 |
| Frost line height (in) | 26 | 26 | 22 | 25 | 25 |
| Film Properties | | | | | |
| Film Gauge (mil) | 1.02 | 1.04 | 1.006 | 1.012 | 1.007 |
| 1% Secant (psi), MD | 23069 | 20117 | 26064 | 23550 | 20852 |
| 1% Secant (psi), TD | 27075 | 22120 | 30009 | 27946 | 25517 |

TABLE C-continued

Processing Conditions and Resin/Film Properties From Large Blown Film Line

| | | | | | |
|---|---|---|---|---|---|
| 1% Secant (psi), Ave. | 25072 | 21119 | 28037 | 25748 | 23185 |
| Tensile Yield Strength (psi)_MD | 1199 | 1114 | 1350 | 1247 | 1144 |
| Tensile Yield Strength (psi)_TD | 1308 | 1171 | 1436 | 1352 | 1160 |
| Tensile Strength (psi)_MD | 7838 | 7450 | 7340 | 6998 | 6976 |
| Tensile Strength (psi)_TD | 7855 | 8286 | 7223 | 7635 | 6817 |
| Tensile Strain (%)_MD | 547 | 502 | 492 | 512 | 498 |
| Tensile Strain (%)_TD | 725 | 713 | 699 | 712 | 686 |
| Elmendorf Tear (g), MD | 360.2 | 340.6 | 252.7 | 322.4 | 245.8 |
| Elmendorf Tear (g), TD | 638.4 | 594.1 | 628.3 | 607.8 | 592.3 |
| Elmendorf Tear (g/mil), MD | 360.2 | 344.0 | 247.7 | 316.1 | 250.8 |
| Elmendorf Tear (g/mil), TD | 619.8 | 576.8 | 634.6 | 601.8 | 586.4 |
| Dart Drop, Phenolic (g) | 618 | 756 | 426 | 582 | 654 |
| Seal Initiation Temperature at 1 N force (° C.) | 76.31 | 62.83 | 92.46 | 80.57 | 72.44 |
| Seal Temperature at 5 N force (° C.) | 87.17 | 76.2 | 97.06 | 91.18 | 81.27 |
| Maximum Seal force (N) | 11.28 | 10.68 | 12.87 | 12.35 | 11.85 |
| Hot Tack Initiation Temperature at 1 N force (° C.) | 75.8 | 63.6 | 87 | 76.1 | 68.5 |
| Hot Tack Temperature at 5 N force (° C.) | 105.7 | 74.2 | 102.4 | 105.5 | 103.4 |
| Maximum Hot Tack force (N) | 6.9 | 7.1 | 8.2 | 6.7 | 6.0 |
| Puncture peak Force (lbs) | 10.6 | 11.0 | 11.4 | 11.0 | 11.0 |
| Puncture peak Force (lbs/mil) | 10.3 | 10.5 | 10.8 | 10.8 | 10.9 |
| Puncture break Energy (in-lbs) | 36.9 | 40.9 | 35.9 | 36.2 | 38.9 |
| Puncture break Energy (in-lbs/mil) | 36.2 | 39.3 | 33.8 | 35.8 | 38.6 |

TABLE D $^1$H NMR Characterization of Polyethylenes in Inv. Ex. 1-6.

| Ex. | Methyl/ 1000 C | Vinylenes/ 1000 C | Trisubstituted olefins/1000 C | Vinyls/ 1000 C | Vinylidenes/ 1000 C | total unsaturation/ 1000 C |
|---|---|---|---|---|---|---|
| Inv. Ex 1 | 15.1 | 0.07 | 0.12 | 0.05 | 0.04 | 0.28 |
| Inv. Ex 2 | 18.9 | 0.06 | 0.12 | 0.03 | 0.05 | 0.26 |
| Inv. Ex 3 | 20.6 | 0.07 | 0.13 | 0.03 | 0.05 | 0.28 |
| Inv. Ex 4 | 16.7 | 0.07 | 0.13 | 0.04 | 0.07 | 0.31 |
| Inv. Ex 5 | 18.7 | 0.06 | 0.10 | 0.03 | 0.06 | 0.25 |
| Inv. Ex 6 | 20.2 | 0.13 | 0.14 | 0.04 | 0.01 | 0.32 |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention. Likewise, the term "comprising" is considered synonymous with the terms "including" and "containing."

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polyethylene composition comprising at least 65 wt % ethylene derived units and from 0.1 to 35 wt % of $C_3$-$C_{12}$ olefin comonomer derived units, based upon the total weight of the polyethylene composition; wherein the polyethylene composition has:
    a) an RCI,m of less than 85 kg/mol;
    b) a $T_{w1}$-$T_{w2}$ value of from −15 to −40° C.; and
    c) an $M_{w1}/M_{w2}$ value of less than 1.5;
and one or more of the following:
    d) a density of from 0.890 to 0.940 g/cm3;
    e) a melt index (MI) of from 0.1 to 30 g/10 min;
    f) a melt index ratio ($I_{21}/I_2$) of from 12 to 90;
    g) an $M_w/M_n$ of from 2 to 10;
    h) an $M_z/M_w$ of from 1.5 to 5.0;
    i) an $M_z/M_n$ of from 3 to 50; and
    j) a g'(vis) of 0.90 or greater.

2. The polyethylene composition of claim 1, wherein the $C_3$-$C_{12}$ olefin comonomer derived units are $C_4$-$C_8$ α-olefin comonomer derived units.

3. The polyethylene composition of claim 1, wherein the polyethylene composition comprises from 0.5 to 20 wt % of propylene, butene, pentene, hexene, heptene, octene, nonene, decene, undecene, and dodecene comonomer derived units, based upon the total weight of the polyethylene composition.

4. The polyethylene composition of claim 1, wherein the polyethylene composition comprises from 1 to 10 wt % of $C_4$-$C_8$ α-olefin comonomer derived units, based upon the total weight of the polyethylene composition.

5. The polyethylene composition of claim 1, wherein the polyethylene composition has a $T_{w1}$-$T_{w2}$ value of from −20 to −35° C.

6. The polyethylene composition of claim 1, wherein the polyethylene composition has a $T_{w1}$-$T_{w2}$ value of from −23 to −35° C.

7. The polyethylene composition of claim 1, wherein the polyethylene composition has an $M_{w1}/M_{w2}$ value of from 0.3 to 1.3.

8. The polyethylene composition of claim 6, wherein the polyethylene composition has an $M_{w1}/M_{w2}$ value of from 0.6 to 1.2.

9. The polyethylene composition of claim 1, wherein the polyethylene composition has a melt index (MI) of from 0.1 g/10 min to 6 g/10 min.

10. The polyethylene composition of claim 1, wherein the polyethylene composition has a melt index ratio ($I_{21}/I_2$) of from 15 to 45.

11. The polyethylene composition of claim 1, wherein the polyethylene composition has a high load melt index ($I_{21}$) of from 5 to 60 g/10 min.

12. The polyethylene composition of claim 1, wherein the polyethylene composition has an Mw/Mn of from 2 to 8.

13. The polyethylene composition of claim 1, wherein the polyethylene composition has:
    a) an RCI,m of less than 40 kg/mol;
    b) a $T_{w1}$-$T_{w2}$ value of from −20 to −40° C.; and
    c) an $M_{w1}/M_{w2}$ value of less than 1.3;
    d) a density of from 0.910 to 0.940 g/cm3;
    e) a melt index (MI) of from 0.1 to 10 g/10 min;
    f) a melt index ratio ($I_{21}/I_2$) of from 15 to 35;
    g) an $M_w/M_n$ of from 2 to 8;
    h) an $M_z/M_w$ of from 1.8 to 5.0;
    i) an $M_z/M_n$ of from 4.0 to 16; and
    j) a g'(vis) of 0.95 or greater.

14. The polyethylene composition of claim 1, wherein the polyethylene composition has a density of from 0.900 g/cm$^3$ to 0.930 g/cm$^3$.

15. The polyethylene composition of claim 1, wherein the polyethylene composition has an RCI,m of 40 or less.

16. The polyethylene composition of claim 1, wherein the polyethylene composition has a total unsaturation per 1000 C, as measured by $^1$H NMR, of 0.6 or less.

17. An article made from the polyethylene composition of claim 1, wherein the article is a blown film or cast film.

18. A film made from the polyethylene composition of claim 1, wherein the film has a heat seal initiation temperature of X° C. or less at 5 N of force, where X=0.0015×Y (psi)+62.6 (where Y is the average 1% Secant modulus ((MD+TD)/2)) of the film.

19. The article of claim 18, wherein the film exhibits an average MD/TD modulus of between 20,000 psi and 40,000 psi.

20. The article of claim 18, wherein the film has a dart drop impact resistance of 300 g/mil or greater.

21. The article of claim 18, wherein the film has a dart drop impact resistance of 350 g/mil or greater.

22. The article of claim 18, wherein the film has an Elmendorf tear resistance of 250 g/mil or greater in the machine direction (MD).

23. The article of claim 18, wherein the film has an Elmendorf tear resistance of 300 g/mil or greater in the machine direction (MD).

24. The article of claim 17, wherein the film has:
    a) a heat seal initiation temperature of X° C. or less at 5 N of force, where X=0.0015×Y(psi)+62.6 (where Y is the average 1% Secant modulus ((MD+TD)/2)) of the film;
    b) a dart drop impact of 300 g/mil or more;
    c) an MD Elmendorf tear of 230 g or more; and
    d) average 1% Secant modulus ((MD+TD)/2) of 20,000 psi or more.

25. The article of claim 17, wherein the polymer composition has an MIR of 15 to 55, and the film has an Elmendorf tear resistance of 230 g/mil or more in the machine direction (MD), and/or a dart drop impact resistance of at least 300 g/mil or more.

26. The polyethylene composition of claim 1, wherein the polyethylene composition has a $T_{75}$-$T_{25}$ value greater than or equal to 20.0.

* * * * *